US012147187B2

(12) United States Patent
Sato

(10) Patent No.: US 12,147,187 B2
(45) Date of Patent: Nov. 19, 2024

(54) IMAGE FORMING APPARATUS PROVIDED WITH CONTACTING-SEPARATING MEMBER CAPABLE OF MOVING DEVELOPING ROLLER RELATIVE TO PHOTOSENSITIVE DRUM

(71) Applicant: Brother Kogyo Kabushiki Kaisha, Nagoya (JP)

(72) Inventor: Shougo Sato, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/499,483

(22) Filed: Nov. 1, 2023

(65) Prior Publication Data

US 2024/0061370 A1 Feb. 22, 2024

Related U.S. Application Data

(63) Continuation of application No. 17/816,623, filed on Aug. 1, 2022, now Pat. No. 11,846,909, which is a (Continued)

(30) Foreign Application Priority Data

Mar. 16, 2012 (JP) ................................. 2012-060785
Mar. 16, 2012 (JP) ................................. 2012-060786
Mar. 16, 2012 (JP) ................................. 2012-060787

(51) Int. Cl.
*G03G 21/16* (2006.01)
*G03G 21/18* (2006.01)

(52) U.S. Cl.
CPC ..... *G03G 21/1676* (2013.01); *G03G 21/1623* (2013.01); *G03G 21/1633* (2013.01); (Continued)

(58) Field of Classification Search
CPC ........... G03G 21/1623; G03G 21/1633; G03G 21/1647; G03G 21/1666; G03G 21/1676; (Continued)

(56) References Cited

U.S. PATENT DOCUMENTS 4,963,936 A 10/1990 Carter
7,444,103 B2 10/2008 Okabe et al.
(Continued)

FOREIGN PATENT DOCUMENTS

JP H08-262825 A 10/1996
JP H10-153897 A 6/1998
(Continued)

OTHER PUBLICATIONS

Nov. 24, 2014—(US) Notice of Allowance—U.S. Appl. No. 13/800,043.
(Continued)

*Primary Examiner* — Sophia S Chen
(74) *Attorney, Agent, or Firm* — Banner & Witcoff, Ltd.

(57) ABSTRACT

An image forming apparatus includes: a main casing; a drum cartridge; and a developing cartridge. The drum cartridge includes a photosensitive drum having a rotational axis. The drum cartridge is drawable from the main casing in a first direction where the axis of the photosensitive drum extends. The developing cartridge is drawable from the main casing in the first direction. The developing cartridge includes: a developing roller; a front wall; and a first developing-device frame. The front wall is disposed at a downstream end of the developing cartridge in the first direction. The front wall has a first hole. The first developing-device frame supports the developing roller. The first developing-device frame includes a first boss extending in the first direction. The first boss goes through the first hole of the front wall.

18 Claims, 21 Drawing Sheets

Related U.S. Application Data continuation of application No. 17/505,128, filed on Oct. 19, 2021, now Pat. No. 11,429,057, which is a continuation of application No. 17/066,603, filed on Oct. 9, 2020, now Pat. No. 11,163,261, which is a continuation of application No. 16/773,327, filed on Jan. 27, 2020, now Pat. No. 10,838,352, which is a continuation of application No. 16/247,883, filed on Jan. 15, 2019, now Pat. No. 10,585,388, which is a continuation of application No. 15/907,938, filed on Feb. 28, 2018, now Pat. No. 10,216,140, which is a continuation of application No. 15/473,920, filed on Mar. 30, 2017, now Pat. No. 9,933,750, which is a continuation of application No. 15/140,116, filed on Apr. 27, 2016, now Pat. No. 9,625,873, which is a continuation of application No. 14/672,905, filed on Mar. 30, 2015, now Pat. No. 9,335,716, which is a continuation of application No. 13/800,043, filed on Mar. 13, 2013, now Pat. No. 8,995,875.

(52) U.S. Cl.
CPC ..... *G03G 21/1647* (2013.01); *G03G 21/1666* (2013.01); *G03G 21/18* (2013.01); *G03G 2221/163* (2013.01)

(58) Field of Classification Search
CPC ............... G03G 21/18; G03G 21/1817; G03G 2221/163
See application file for complete search history.

(56) References Cited

U.S. PATENT DOCUMENTS

| | | | |
|---|---|---|---|
| 7,555,245 | B2 | 6/2009 | Kamimura |
| 8,280,276 | B2 | 10/2012 | Sameshima et al. |
| 8,305,406 | B2 | 11/2012 | Komatsu et al. |
| 8,428,489 | B2 | 4/2013 | Sameshima et al. |
| 8,554,110 | B2 | 10/2013 | Mushika et al. |
| 8,559,850 | B2 | 10/2013 | Ishikawa et al. |
| 8,688,002 | B2 | 4/2014 | Taba |
| 8,693,917 | B2 | 4/2014 | Sato et al. |
| 8,995,875 | B2 | 3/2015 | Sato |
| 9,026,002 | B2 | 5/2015 | Sato et al. |
| 9,176,466 | B2 | 11/2015 | Taba |
| 9,335,716 | B2 | 5/2016 | Sato |
| 9,625,873 | B2 | 4/2017 | Sato |
| 9,933,750 | B2 | 4/2018 | Sato |
| 10,216,140 | B2 | 2/2019 | Sato |
| 10,585,388 | B2 | 3/2020 | Sato |
| 10,838,352 | B2 | 11/2020 | Sato |
| 11,163,261 | B2 | 11/2021 | Sato |
| 11,429,057 | B2 | 8/2022 | Sato |
| 2003/0053819 | A1 | 3/2003 | Nomura et al. |
| 2003/0161656 | A1 | 8/2003 | Miura et al. |
| 2004/0165910 | A1 | 8/2004 | Sato et al. |
| 2007/0183814 | A1 | 8/2007 | Kamimura |
| 2009/0052938 | A1 | 2/2009 | Sameshima et al. |
| 2009/0142092 | A1 | 6/2009 | Sato |
| 2011/0217080 | A1 | 9/2011 | Kamimura |
| 2011/0236073 | A1 | 9/2011 | Komatsu et al. |
| 2011/0299885 | A1 | 12/2011 | Taba |
| 2012/0269554 | A1 | 10/2012 | Kamimura |
| 2012/0328333 | A1 | 12/2012 | Sameshima et al. |
| 2013/0223878 | A1* | 8/2013 | Sato ................... G03G 21/1817 399/119 |
| 2014/0227004 | A1 | 8/2014 | Taba |
| 2015/0286184 | A1 | 10/2015 | Taba |

FOREIGN PATENT DOCUMENTS

| | | | |
|---|---|---|---|
| JP | 2003-043776 | A | 2/2003 |
| JP | 2003-255805 | A | 9/2003 |
| JP | 2003-287992 | A | 10/2003 |
| JP | 2003-316105 | A | 11/2003 |
| JP | 2004-258138 | A | 9/2004 |
| JP | 2006-285296 | A | 10/2006 |
| JP | 2007-178654 | A | 7/2007 |
| JP | 2009-047992 | A | 3/2009 |
| JP | 2009-139495 | A | 6/2009 |
| JP | 2009-157135 | A | 7/2009 |
| JP | 2010-230754 | A | 10/2010 |
| JP | 2010-271743 | A | 12/2010 |
| JP | 2011-203677 | A | 10/2011 |
| JP | 2011-253048 | A | 12/2011 |

OTHER PUBLICATIONS

Sep. 8, 2014—(US) Ex Parte Quayle—U.S. Appl. No. 13/800,043.
Sep. 9, 2015—(US) Non-Final Office Action—U.S. Appl. No. 14/672,905.
Dec. 7, 2016—(US) Notice of Allowance—U.S. Appl. No. 15/140,116.
Feb. 9, 2016—(JP) Office Action—App 2012-060786.
Feb. 9, 2016—(JP) Office Action—App 2012-060787.
Jan. 13, 2016—(US) Notice of Allowance—U.S. Appl. No. 14/672,905.
Jan. 26, 2016—(JP) Office Action—App 2012-060785.
Sep. 20, 2016—(JP) Office Action—App 2012-060787.
Nov. 29, 2017—(US) Notice of Allowance—U.S. Appl. No. 15/473,920.
Oct. 15, 2018—(US) Notice of Allowance—U.S. Appl. No. 15/907,938.
Jul. 18, 2019—(US) Non-final Office Action—U.S. Appl. No. 16/247,883.
Oct. 28, 2019—(US) Notice of Allowance—U.S. Appl. No. 16/247,883.
Jul. 2, 2020—(US) Notice of Allowance—U.S. Appl. No. 16/773,327.
Jul. 6, 2021—(US) Notice of Allowance—U.S. Appl. No. 17/066,603.
Mar. 25, 2021—(US) Non-final Office Action—U.S. Appl. No. 17/066,603.
Apr. 28, 2022—(US) Notice of Allowance—U.S. Appl. No. 17/505,128.
Apr. 20, 2023—(US)—Non-final Office Action—U.S. Appl. No. 17/816,623.
Aug. 4, 2023—(US)—Notice of Allowance—U.S. Appl. No. 17/816,623.

* cited by examiner

IMAGE FORMING APPARATUS PROVIDED WITH CONTACTING-SEPARATING MEMBER CAPABLE OF MOVING DEVELOPING ROLLER RELATIVE TO PHOTOSENSITIVE DRUM

CROSS REFERENCE TO RELATED APPLICATION

This application is a continuation of U.S. patent application Ser. No. 17/816,623 filed Aug. 1, 2022, which is a continuation of U.S. patent application Ser. No. 17/505,128 filed Oct. 19, 2021, issued as U.S. Pat. No. 11,429,057 on Aug. 30, 2022, which is a continuation of U.S. patent application Ser. No. 17/066,603 filed Oct. 9, 2020, issued as U.S. Pat. No. 11,163,261 on Nov. 2, 2021, which is a continuation of U.S. patent application Ser. No. 16/773,327 filed Jan. 27, 2020, issued as U.S. Pat. No. 10,838,352 on Nov. 17, 2020, which is a continuation of U.S. patent application Ser. No. 16/247,883 filed Jan. 15, 2019, issued as U.S. Pat. No. 10,585,388 on Mar. 10, 2020, which is a continuation of U.S. patent application Ser. No. 15/907,938 filed Feb. 28, 2018, issued as U.S. Pat. No. 10,216,140_on Feb. 26, 2019, which is a continuation of U.S. patent application Ser. No. 15/473,920 filed Mar. 30, 2017, issued as U.S. Pat. No. 9,933,750 on Apr. 3, 2018, which is a continuation of U.S. patent application Ser. No. 15/140,116 filed Apr. 27, 2016, issued as U.S. Pat. No. 9,625,873 on Apr. 18, 2017, which is a continuation of U.S. patent application Ser. No. 14/672,905 filed Mar. 30, 2015, issued as U.S. Pat. No. 9,335,716 on May 10, 2016, which is a continuation of U.S. patent application Ser. No. 13/800,043 filed Mar. 13, 2013, issued as U.S. Pat. No. 8,995,875 on Mar. 31, 2015, which claims priority from Japanese Patent Application Nos. 2012-060785 filed Mar. 16, 2012, 2012-060786 filed Mar. 16, 2012, and 2012-060787 filed Mar. 16, 2012. The entire content of each of these priority applications is incorporated herein by reference.

TECHNICAL FIELD

The present invention relates to an image forming apparatus employing an electrophotographic system.

BACKGROUND

One electrophotographic image forming apparatus known in the art is a color printer that includes a main casing, a drum unit that can be mounted in and removed from the main casing along a front-rear direction, and a plurality of developer cartridges that are detachably mounted in the drum unit. The drum unit is provided with a plurality of photosensitive drums corresponding to a plurality of colors (yellow, magenta, cyan, and black, for example). The photosensitive drums are arranged parallel to one another and juxtaposed in the front-rear direction. The plurality of developer cartridges corresponds to the plurality of photosensitive drums. Each developer cartridge includes a developing roller for supplying toner to the corresponding photosensitive drum.

This type of color printer may also have another well-known structure that brings the developing roller of each developer cartridge into contact with the corresponding photosensitive drum in order to supply toner to the photosensitive drum during an image-forming operation, and to separate the developing roller from the photosensitive drum in order to prevent the supply of toner when not forming images.

One of these color printers that has been proposed is a color laser printer that includes separating/pressing mechanisms for pressing the corresponding developing rollers against or separating the developing rollers from the corresponding photosensitive drums. The separating/pressing mechanisms are provided in the main casing, and are also provided one on each axial end of the photosensitive drums when the drum unit is mounted in the main casing.

In this type of color laser printer, the developer cartridges are mounted in and removed from the drum unit in a substantially vertical direction while the drum unit is withdrawn from the main casing.

Further, another electrophotographic image forming apparatus known in the art is provided with a casing; a plurality of process cartridges arranged parallel to each other and juxtaposed in a prescribed direction inside the casing, each process cartridge integrally including a photosensitive drum and a toner-accommodating unit; and a plurality of LED units provided in one-to-one correspondence with the plurality of photosensitive drums for exposing the photosensitive drums.

One such image forming apparatus that has been proposed is a color multifunction peripheral whose casing is provided with a support frame, for example, that can be mounted in and pulled out of the casing in a front-rear direction. The support frame integrally supports the plurality of process cartridges. The support frame is provided with support arms for supporting the LED units between toner-accommodating units of neighboring process cartridges.

In the conventional color multifunction peripheral described above, the process cartridges are mounted in and removed from the support frame in a substantially vertical direction in a state where the support frame has been withdrawn from the casing.

SUMMARY

Here, to make the operation of replacing the developer cartridges more efficient, it is desirable to configure the printer such that the developer cartridges can be pulled directly out from the main casing along the axial direction of the photosensitive drums.

However, with the conventional color laser printer described above, the separating/pressing mechanisms are provided on both axial ends of the photosensitive drums when the drum unit is mounted in the main casing. Accordingly, the separating/pressing mechanisms would interfere with the developer cartridges that are pulled out of the main casing in the axial direction of the photosensitive drums.

With this conventional construction, it is difficult to devise a configuration that would allow the developer cartridges to be pulled out of the main casing along the axial direction of the photosensitive drums.

Further, recent years have brought demand for increasingly more compact image forming apparatus to provide more flexibility in choosing installation locations.

However, the conventional color multifunction peripheral described above has limitations in how compact the apparatus can be made due to the support arms provided for supporting the LED units between the toner-accommodating units of neighboring process cartridges. Specifically, there is a limitation to how compact the color multifunction peripheral can be made in the direction that the process cartridges are arrayed.

Further, to make operations for replacing the process cartridges more efficient, it is desirable to configure the multifunction peripheral so that the process cartridges can be pulled directly out of the casing along an axial direction of the photosensitive drums.

However, if the process cartridges can be pulled out of the casing along the axial direction of the photosensitive drums, it is necessary to retract the LED units in order to prevent the LED units from interfering with the photosensitive drums as the process cartridges are removed. Hence, normally it is necessary to provide a retracting mechanism in the casing for retracting the LED units, but allocating space in the casing for the retracting mechanism is contrary to the goal of making the image forming apparatus more compact.

In view of the foregoing, it is an object of the present invention to provide an image forming apparatus that is capable of bringing developing rollers into contact with (adjacent to) and separating developing rollers from corresponding photosensitive drums, and that has developing units capable of being pulled out of a casing of the image forming apparatus along the axial direction of the photosensitive drums.

It is another object of the present invention to provide an image forming apparatus having an efficient arrangement of exposure units and capable of being made more compact, while allowing photosensitive drums to be pulled out of a casing of the image forming apparatus along their axial direction.

It is another object of the present invention to provide an image forming apparatus having an efficient arrangement of exposure-member supporting members and capable of being made more compact, while allowing a photosensitive drum unit to be pulled out of a casing of the image forming apparatus along an axial direction of photosensitive drums.

In order to attain the above and other objects, the present invention provides an image forming apparatus including: a casing; a plurality of photosensitive drums; a plurality of developing units; an opening-closing member; and a first contacting-separating member. The casing is formed with an opening. The plurality of photosensitive drums is disposed juxtaposedly with each other in a juxtaposed direction with a space between neighboring photosensitive drums. Each of the plurality of photosensitive drums has an axis extending in an axial direction. The axial direction defines a first side and a second side opposite to the first side. The plurality of developing units are configured to be mounted in and withdrawn from the casing through the opening in the axial direction. Each of the developing units includes a developing roller provided in one-to-one correspondence with the photosensitive drums. The opening-closing member is disposed on the first side of the axial direction and configured to move between an open position for exposing the opening and a closed position for covering the opening. The first contacting-separating member is provided at the opening-closing member and configured to move in the juxtaposed direction relative to the casing for moving, in a state where the opening-closing member is at the closed position, the developing roller between an adjacent position adjacent to or in contact with the corresponding photosensitive drums and a separated position spaced apart from the corresponding photosensitive drums.

Specifically, in the embodiments, the first side corresponds to a front side, and the second side corresponds to a rear side.

According to another aspect, the present invention provides an image forming apparatus including: a casing; a first photosensitive drum; a second photosensitive drum; a first developing unit; a second developing unit; a withdrawal-restricting unit; and an exposure unit. The casing is formed with an opening. The first photosensitive drum has an axis extending in an axial direction and configured to be mounted in and withdrawn from the casing through the opening in the axial direction. The second photosensitive drum is disposed juxtaposedly with the first photosensitive drum in a juxtaposed direction orthogonal to the axial direction with a space therebetween in a state where the first photosensitive drum is mounted in the casing. The first developing unit includes a first developing roller configured to supply developer to the first photosensitive drum. The second developing unit includes a second developing roller configured to supply developer to the second photosensitive drum. The withdrawal-restricting unit is configured to move between a withdrawal-restricted position for restricting withdrawal of the first photosensitive drum from the casing and a withdrawal-allowed position for allowing withdrawal of the first photosensitive drum from the casing. The exposure unit is configured to move between an exposure position adjacent to the first photosensitive drum so as to expose the first photosensitive drum to light and a retracted position away from the first photosensitive drum. The exposure unit is configured to be supported on the second developing unit so as to be placed at the retracted position when the withdrawal-restricting unit is at the withdrawal-allowed position.

Specifically, in the embodiments, the first photosensitive drum corresponds to any one of a black photosensitive drum 21K, a yellow photosensitive drum 21Y, and a magenta photosensitive drum 21M. The second photosensitive drum corresponds to the yellow photosensitive drum 21Y if the black photosensitive drum 21K corresponds to the first photosensitive drum. Alternatively, the second photosensitive drum corresponds to the magenta photosensitive drum 21M if the yellow photosensitive drum 21Y corresponds to the first photosensitive drum. Alternatively, the second photosensitive drum corresponds to a cyan photosensitive drum 21C if the magenta photosensitive drum 21M corresponds to the first photosensitive drum.

According to still another aspect, the present invention provides an image forming apparatus including: a casing; a first photosensitive drum; a first developing unit; a withdrawal-restricting unit; and an exposure unit. The casing is formed with an opening. The first photosensitive drum has an axis extending in an axial direction and configured to be mounted in and withdrawn from the casing through the opening in the axial direction. The first developing unit includes a first developing roller configured to supply developer to the first photosensitive drum. The withdrawal-restricting unit is configured to move between a withdrawal-restricted position for restricting withdrawal of the first photosensitive drum from the casing and a withdrawal-allowed position for allowing withdrawal of the first photosensitive drum from the casing. The exposure unit is configured to move between an exposure position adjacent to the first photosensitive drum so as to expose the first photosensitive drum to light and a retracted position away from the first photosensitive drum. The exposure unit is configured to be supported on the first developing unit so as to be placed at the retracted position when the withdrawal-restricting unit is at the withdrawal-allowed position.

Specifically, in the embodiments, the first photosensitive drum corresponds to any one of the black photosensitive drum 21K, the yellow photosensitive drum 21Y, and the magenta photosensitive drum 21M.

According to still another aspect, the present invention provides an image forming apparatus including: a casing; a plurality of photosensitive drums; a plurality of developing units; a withdrawal-restricting unit; and a plurality of exposure units. The casing is formed with an opening. The plurality of photosensitive drums each has an axis extending in an axial direction and is configured to be mounted in and withdrawn from the casing through the opening in the axial direction. The plurality of developing units are provided in one-to-one correspondence with the plurality of photosensitive drums and each includes a developing roller configured to supply developer to the corresponding photosensitive drum. The withdrawal-restricting unit is configured to move between a withdrawal-restricted position for restricting withdrawal of the plurality of photosensitive drums from the casing and a withdrawal-allowed position for allowing withdrawal of the plurality of photosensitive drums from the casing. The plurality of exposure units are provided in one-to-one correspondence with the plurality of photosensitive drums and each is configured to move between an exposure position adjacent to the corresponding photosensitive drum so as to expose the photosensitive drum to light and a retracted position away from the corresponding photosensitive drum. Each of the plurality of exposure units is configured to be supported on the developing units so as to be placed at the retracted position when the withdrawal-restricting unit is at the withdrawal-allowed position.

According to still another aspect, the present invention provides an image forming apparatus including: a casing; an opening-closing member; a photosensitive member unit; an exposure member; and an exposure-member supporting member. The casing is formed with an opening. The opening-closing member is configured to move between an open position for exposing the opening and a closed position for covering the opening. The photosensitive member unit includes a photosensitive drum having an axis extending in an axial direction and configured to be mounted in and withdrawn from the casing through the opening in the axial direction. The axial direction defines a first side and a second side opposite to the first side. The exposure member is configured to expose the photosensitive drum to light. The exposure-member supporting member supports the exposure member. The exposure-member supporting member has a first end on the first side in the axial direction that is supported to the casing, and a second end on the second side in the axial direction that is engageable with the opening-closing member. The exposure-member supporting member is configured to move between an exposure position adjacent to the photosensitive drum and a retracted position away from the photosensitive drum. The opening-closing member includes a first engaging part configured to be engaged with the second end of the exposure-member supporting member so as to position the exposure-member supporting member at the exposure position when the opening-closing member is at the closed position. The exposure-member supporting member is configured to move from the retracted position to the exposure position in association with a movement of the opening-closing member from the open position to the closed position with causing an engagement of the second end with the first engaging part. The exposure-member supporting member is configured to move from the exposure position to the retracted position in association with a movement of the opening-closing member from the closed position to the open position with causing a disengagement of the second end from the first engaging part.

Specifically, in the embodiments, the first side corresponds to a rear side, and the second side corresponds to a front side.

BRIEF DESCRIPTION OF THE DRAWINGS

In the drawings;

FIGS. 21A-1 and 21A-2 are enlarged views of a guide member and a cover-side engaging part of a color printer according to a sixth embodiment of the present invention; and in which FIG. 21A-1 shows a state where the guide member is disposed in a guiding position, and FIG. 21A-2 shows a state where the guide member is disposed in a non-guiding position; and FIGS. 21B-1 and 21B-2 are enlarged views of a guide member and a cover-side engaging part of a color printer according to a seventh embodiment of the present invention; and in which FIG. 21B-1 shows a state where the guide member is disposed in a guiding position, and FIG. 21B-2 shows a state where the guide member is disposed in a non-guiding position.

DETAILED DESCRIPTION

1. Overall Structure of Color Printer

Figure 1:
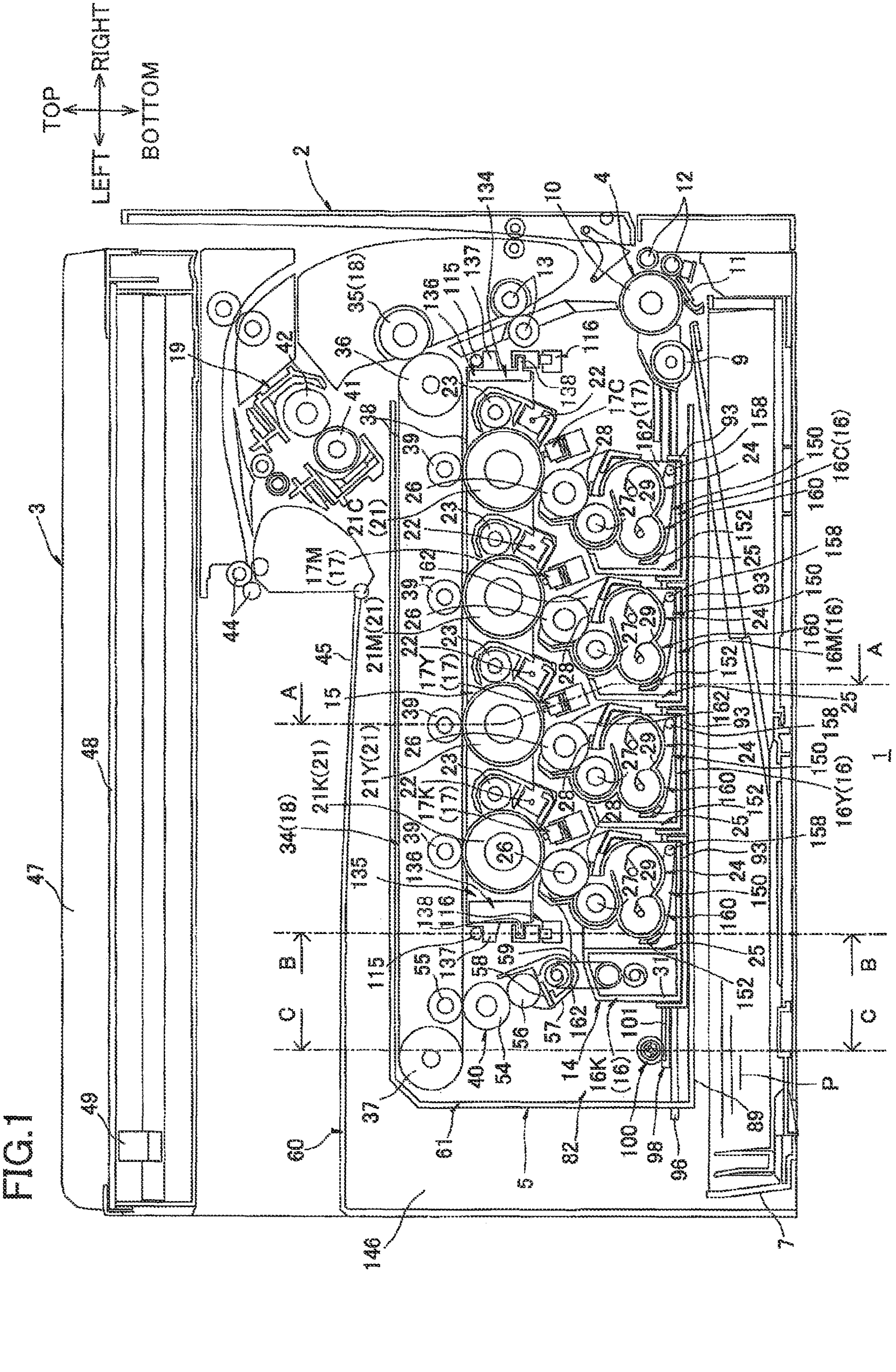
FIG. 1 is a cross-sectional view of a color printer according to a first embodiment of the present invention.

FIG. 1 shows a color printer 1 serving as an example of an image forming apparatus of the present invention. The color printer 1 is a horizontal tandem-type intermediate transfer color printer.

The color printer 1 is also a multifunction peripheral that is integrally provided with a main casing 2, and a flatbed scanner 3 provided above the main casing 2 for scanning image data of an original.

Within the main casing 2, the color printer 1 also includes a sheet feeding unit 4 for feeding sheets of paper P to be printed, and an image forming unit 5 for forming images on the sheets P supplied by the sheet feeding unit 4.

(1) Main Casing

Figure 2:
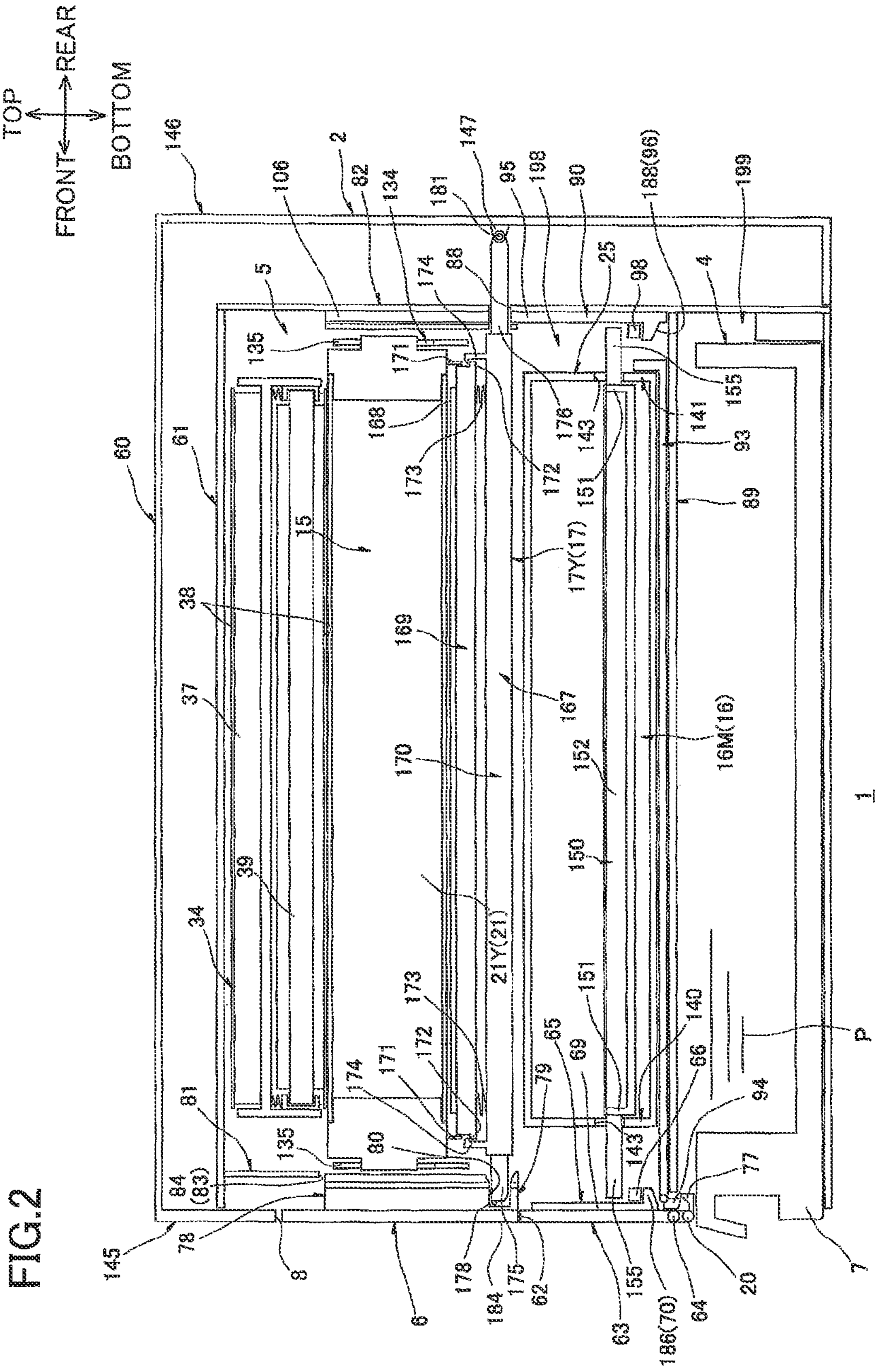
FIG. 2 is a cross-sectional view of the color printer along a line A-A in FIG. 1 in a state where a front cover is in a closed position.

As shown in FIGS. 1 and 2, the main casing 2 is formed in a box-like shape and serves to accommodate the sheet feeding unit 4 and the image forming unit 5. A first opening 8 is formed in one side wall (i.e. a front wall) of the main casing 2. The main casing 2 is provided with a front cover 6 that can be pivoted (moved), about a first hinge portion 20 provided on a bottom edge of the front cover 6, between a closed position (see FIG. 2) covering the first opening 8 and an open position (see FIG. 3) exposing the first opening 8.

In the following description, the side of the main casing 2 on which the front cover 6 is provided (the left side in FIG. 2) will be referred to as the "front side," and the opposite side (the right side in FIG. 2) as the "rear side." Further, left and right sides of the main casing 2 in the following description will be based on the perspective of a user facing the front side of the color printer 1. Thus, the left side of the main casing 2 in FIG. 1 will be referred to the "left side" and the right side the "right side," while the near side in FIG. 1 will be referred to as the "front side" and the far side as the "rear side."

(2) Sheet Feeding Unit

As shown in FIG. 1, the sheet feeding unit 4 includes a paper tray 7 that accommodates the sheets of paper P. The paper tray 7 is detachably mounted in a bottom section of the main casing 2.

The sheet feeding unit 4 also includes a pick-up roller 9, a feeding roller 10, a feeding pad 11, a pair of pinch rollers 12, and a pair of registration rollers 13. The pick-up roller 9 rotates to supply the sheets P accommodated in the paper tray 7 between the feeding roller 10 and the feeding pad 11, whereby the rotation of the feeding roller 10 separates and feeds the sheets P one sheet at a time. The rotating feeding roller 10 subsequently supplies each sheet P so as to pass sequentially between the feeding roller 10 and the pinch rollers 12 and to enter between the registration rollers 13 disposed above the feeding roller 10. The registration rollers 13 rotate in order to supply the sheet P to the image forming unit 5 (a portion between an intermediate transfer belt 38 and a secondary transfer roller 35, both described later) at a prescribed timing.

(3) Image Forming Unit

The image forming unit 5 is disposed above the sheet feeding unit 4 and includes a process unit 14, a transfer unit 18, and a fixing unit 19.

(3-1) Process Unit

The process unit 14 is disposed above the paper tray 7. The process unit 14 includes a drum unit 15, four developing units 16, and four LED units 17.

(3-1-1) Drum Unit

The drum unit 15 is disposed in a top portion of the process unit 14. The drum unit 15 integrally supports four each of photosensitive drums 21, scorotron chargers 22, and drum cleaning rollers 23.

The plurality of (four) photosensitive drums 21 correspond to a plurality of (four) printing colors (black, yellow, magenta, and cyan) and are arranged juxtaposed to (parallel to) one another and spaced at intervals in a left-right direction. More specifically, the plurality of photosensitive drums 21 includes a black photosensitive drum 21K, a yellow photosensitive drum 21Y, a magenta photosensitive drum 21M, and a cyan photosensitive drum 21C that are arranged from a left side toward a right side in the order given. Of these four photosensitive drums 21, any two neighboring photosensitive drums 21 may be taken as examples of a first photosensitive drum and a second photosensitive drum. More specifically, if the black photosensitive drum 21K corresponds to the first photosensitive drum, the yellow photosensitive drum 21Y positioned on an immediate right side of the black photosensitive drum 21K corresponds to the second photosensitive drum. Alternatively, if the yellow photosensitive drum 21Y corresponds to the first photosensitive drum, then the magenta photosensitive drum 21M positioned to an immediate right side of the yellow photosensitive drum 21Y corresponds to the second photosensitive drum.

In other words, the second photosensitive drum corresponds to the photosensitive drum 21 positioned adjacent to and on the immediate right side of any selected first photosensitive drum.

Four corresponding scorotron chargers 22 are provided for the four photosensitive drums 21. Each scorotron charger 22 is disposed on a lower right side of the corresponding photosensitive drum 21 so as to confront but not contact the same.

Four corresponding drum cleaning rollers 23 are provided for the four photosensitive drums 21. Each drum cleaning roller 23 is disposed above the corresponding scorotron charger 22 so as to confront and contact an upper right portion of the corresponding photosensitive drum 21.

(3-1-2) Developing Unit

Four corresponding developing units 16 are provided for the four photosensitive drums 21. As will be described later in detail, the developing units 16 can be slidingly moved in a front-rear direction between a developing-unit mounted position (see FIG. 2) mounted inside the main casing 2, and a developing-unit withdrawn position (see FIG. 8B) withdrawn from the main casing 2.

The four developing units 16 are disposed below the corresponding photosensitive drums 21 when in the developing-unit mounted position and are arranged juxtaposed with (parallel to) one another and spaced at intervals in the left-right direction. More specifically, the developing units 16 are arranged juxtaposed with one another such that, in a left-right space between neighboring developing units 16, the left-right space between upper portions of the developing units 16 (upper ends of developing devices 24 described later) is larger than the left-right space between lower portions of the developing units 16 (the developing-unit frames 25 described later).

The developing units 16 include a black developing unit 16K, a yellow developing unit 16Y, a magenta developing unit 16M, and a cyan developing unit 16C that are arranged from a left side toward a right side in the order given. Of these four developing units 16, the developing unit 16 corresponding to the first photosensitive drum described above is equivalent to a first developing unit, and the developing unit 16 corresponding to the second photosensitive drum is equivalent to a second developing unit.

In other words, if the black photosensitive drum 21K corresponds to the first photosensitive drum, then the black developing unit 16K associated with the black photosensitive drum 21K corresponds to the first developing unit. In this case, since the yellow photosensitive drum 21Y corresponds to the second photosensitive drum, the yellow developing unit 16Y associated with the yellow photosensitive drum 21Y corresponds to the second developing unit.

Since the first and second developing units respectively correspond to the selected first and second photosensitive drums, the correlations between the developing unit 16 of the first embodiment and the first and second developing units differ depending on the selected first and second photosensitive drums.

As will be described below, each of the four developing units 16 includes the developing device 24 and the developing-unit frame 25.

The developing device 24 is accommodated in the corresponding developing-unit frame 25 and includes a developing roller 26. In other words, one developing roller 26 is provided for each of the four photosensitive drums 21.

The developing roller 26 provided in the first developing unit described above corresponds to a first developing roller, and the developing roller 26 provided in the second developing unit corresponds to a second developing roller.

The developing roller 26 is rotatably supported in an upper portion of the corresponding developing device 24. The developing roller 26 is exposed to an outside through the upper portion of the developing device 24 and contacts a bottom portion of the corresponding photosensitive drum 21.

The developing device 24 includes a supply roller 27 for supplying toner to the developing roller 26, and a thickness-regulating blade 28 for regulating thickness of toner carried on the developing roller 26. The developing device 24 also includes a toner-accommodating section 29 disposed below the supply roller 27 for accommodating toner in the corresponding color (black, yellow, magenta, or cyan).

In the black developing unit 16K, a waste-toner-accommodating section 31 is integrally provided on a left side of the developing-unit frame 25 for accommodating waste toner. The waste-toner-accommodating section 31 has a box-like shape.

(3-1-3) LED Unit

Four corresponding LED units 17 are provided for the four photosensitive drums 21. Each LED unit 17 is disposed on a right side of the upper portion of the corresponding developing unit 16 (upper end of the developing device 24) and opposes the bottom portion of the corresponding photosensitive drum 21. The LED unit 17 exposes a surface of the corresponding photosensitive drum 21 to light based on prescribed image data.

(3-2) Transfer Unit

The transfer unit 18 is disposed above the process unit 14 and includes a belt unit 34, and the secondary transfer roller 35.

The belt unit 34 is oriented in the left-right direction so as to confront each of the four photosensitive drums 21 from above. As shown in FIG. 2, the belt unit 34 is supported between a front wall 81 and a rear wall 82 of an inner casing 61 (all described later).

As shown in FIG. 1, the belt unit 34 includes a drive roller 36, a follow roller 37, the intermediate transfer belt 38, four primary transfer rollers 39, and a belt cleaner 40.

The drive roller 36 and the follow roller 37 are arranged in confrontation with each other and are spaced apart in the left-right direction.

The intermediate transfer belt 38 is looped around the drive roller 36 and the follow roller 37, with a lower portion of the intermediate transfer belt 38 disposed above the photosensitive drums 21 so as to oppose and contact the same. When the drive roller 36 is driven to rotate, the follow roller 37 follows as the intermediate transfer belt 38 circulates so that its lower portion in contact with the photosensitive drums 21 moves rightward.

Each of the four primary transfer rollers 39 is disposed in confrontation with the corresponding photosensitive drum 21, with the lower portion of the intermediate transfer belt 38 interposed therebetween.

The belt cleaner 40 is disposed below a left end portion of the intermediate transfer belt 38 and on a front side of the drum unit 15. The belt cleaner 40 includes a belt cleaning roller 54, an opposing roller 55, an intermediate roller 56, a waste toner reservoir 57, and a scraping blade 58.

The belt cleaning roller 54 is adapted to clean residual toner (waste toner) left on a surface of the intermediate transfer belt 38. The intermediate roller 56 temporarily retains toner cleaned off by the belt cleaning roller 54. The toner is subsequently scraped off the intermediate roller 56 by the scraping blade 58 and falls through an opening formed in the waste toner reservoir 57 to be collected therein. Waste toner in the waste toner reservoir 57 is conveyed to the waste-toner-accommodating section 31 through a waste-toner-conveying pipe 59 connecting a rear end portion of the waste toner reservoir 57 to a rear end portion of the waste-toner-accommodating section 31 and is collected in the waste-toner-accommodating section 31.

The belt cleaning roller 54, the opposing roller 55, the intermediate roller 56, the waste toner reservoir 57, and the scraping blade 58 are supported between the front wall 81 and the rear wall 82 of the inner casing 61 described later.

The secondary transfer roller 35 is provided on a right side of the belt unit 34 and confronts the drive roller 36 with the intermediate transfer belt 38 interposed therebetween.

(3-3) Fixing Unit

The fixing unit 19 is disposed diagonally above and leftward of the secondary transfer roller 35. The fixing unit 19 includes a heating roller 41, and a pressure roller 42 that contacts an upper right portion of the heating roller 41 and applies pressure thereto.

(3-4) Image Forming Operation (3-4-1) Developing Operation

Toner accommodated in each toner-accommodating section 29 is supplied onto the corresponding supply roller 27, and the supply roller 27 in turn supplies the toner onto the developing roller 26.

The thickness-regulating blade 28 regulates the thickness of toner supplied onto the developing roller 26 as the developing roller 26 rotates, maintaining the toner carried on a surface of the developing roller 26 at a thin uniform thickness.

In the meantime, the scorotron charger 22 applies a uniform positive charge to the surface of the corresponding photosensitive drum 21 as the photosensitive drum 21 rotates. Subsequently, the photosensitive drum 21 is exposed to light by the LED unit 17, forming an electrostatic latent image on the surface of the photosensitive drum 21 corresponding to an image to be printed on the sheet P.

As the photosensitive drum 21 continues to rotate, the positively charged toner carried on the surface of the developing roller 26 is supplied to the electrostatic latent image formed on the surface of the photosensitive drum 21. The toner develops the electrostatic latent image on the photosensitive drum 21 into a visible toner image through reverse development.

(3-4-2) Transferring and Fixing Operations

A primary transfer is performed by sequentially transferring toner images carried on the surfaces of the photosensitive drums 21 onto the lower portion of the intermediate transfer belt 38 as the lower portion moves from left to right. The primary transfer forms a color image on the intermediate transfer belt 38.

As the intermediate transfer belt 38 passes through a position opposing the secondary transfer roller 35, the color image formed on the intermediate transfer belt 38 is transferred in a secondary transfer onto the sheet P supplied from the sheet feeding unit 4.

Next, the color image transferred onto the sheet P is thermally fixed to the sheet P by heat and pressure as the sheet P passes between the heating roller 41 and the pressure roller 42 in the fixing unit 19.

(4) Paper Discharge

The sheet P onto which the toner image has been fixed in the fixing unit 19 is discharged onto a discharge tray 45 formed on a top surface of the main casing 2 by discharge rollers 44.

(5) Flatbed Scanner

The flatbed scanner 3 is disposed above the discharge tray 45. The flatbed scanner 3 includes a document-holding cover 47, a glass surface 48, and a CCD sensor 49. After an original is placed between the document-holding cover 47 and the glass surface 48, the flatbed scanner 3 scans image data from the original by sliding the CCD sensor 49 over the same.

Subsequently, the image forming unit 5 can form an image on the sheet P as described above based on the image data scanned from the original.

2. Detailed Description of Main Casing

As shown in FIG. 2, the main casing 2 includes an outer casing 60 constituting an outer shape of the color printer 1, and the inner casing 61 provided on an inside of the outer casing 60.

The outer casing 60 is generally box-shaped and substantially rectangular in a side view. The outer casing 60 has a front wall 145 and a rear wall 146 that are arranged in confrontation with (parallel to) each other and spaced apart in the front-rear direction.

Figure 4:
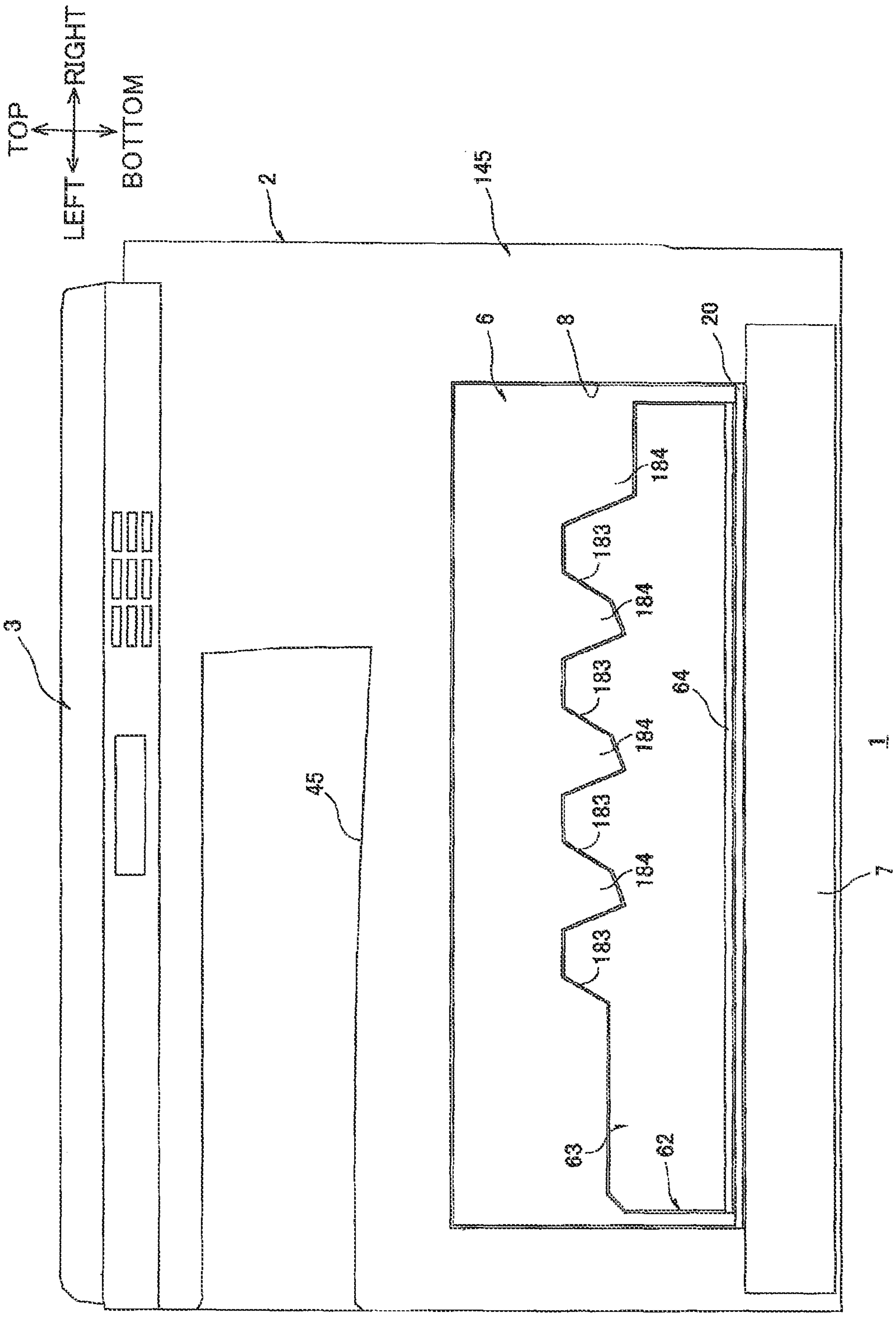
FIG. 4 is a front view of the color printer shown in FIG. 1 in a state where the front cover is in the closed position.

As shown in FIG. 4, the front wall 145 has a generally flat plate shape and is elongated in the left-right direction. The first opening 8 described above is formed in a generally center region of the front wall 145.

The first opening 8 is generally rectangular in a front view, with its long dimension aligned in the left-right direction, and penetrates the front wall 145 in the front-rear direction.

The front cover 6 is provided at the front wall 145.

The front cover 6 has a generally flat plate shape, with its long dimension aligned in the left-right direction. The left-right and vertical dimensions of the front cover 6 are approximately equivalent to the same dimensions of the first opening 8.

Figure 5:
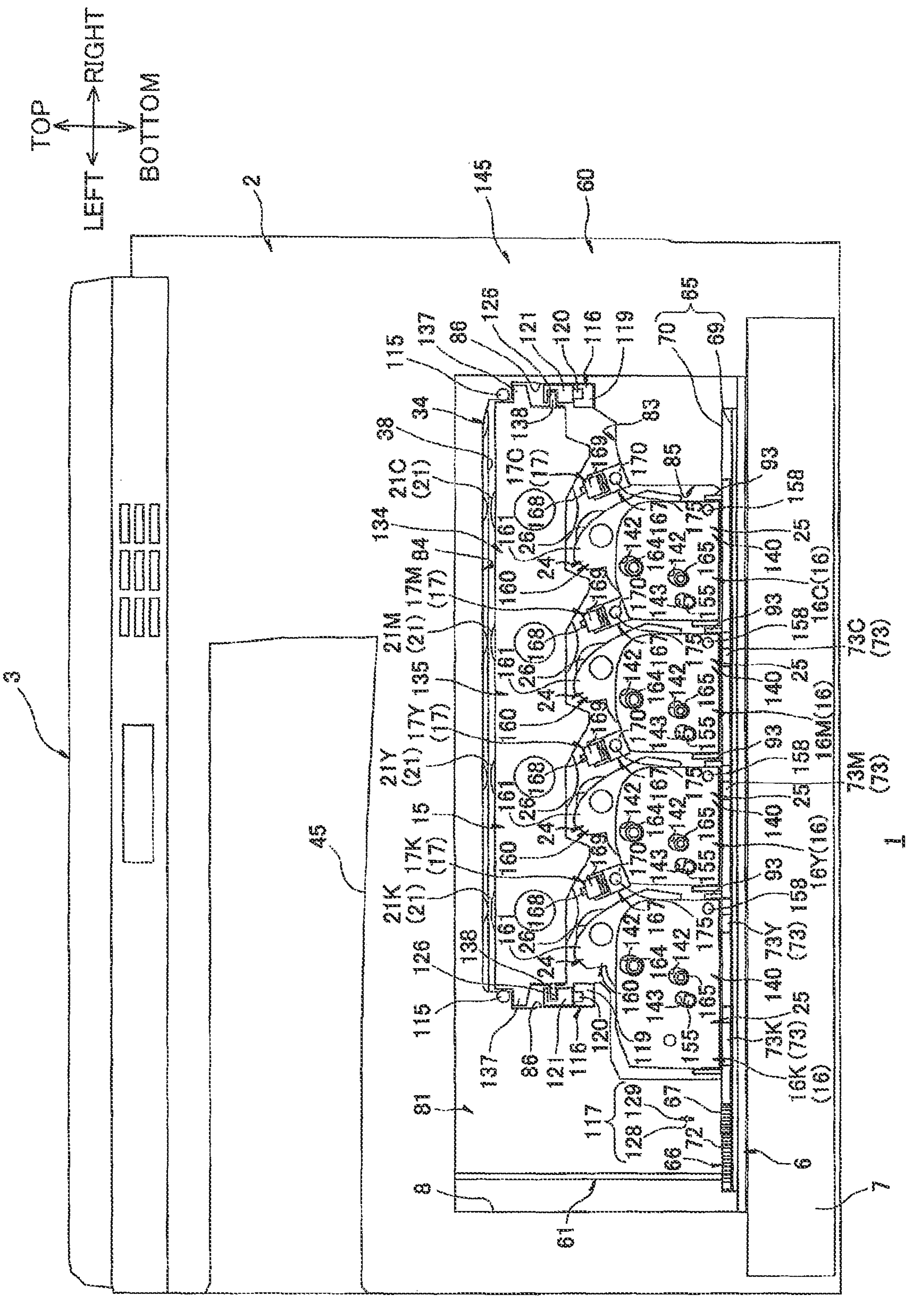
FIG. 5 is a front view of the color printer shown in FIG. 1 in a state where the front cover is in the open position.

The first hinge portion 20 is provided on the bottom edge of the front cover 6 while left and right ends of the first hinge portion 20 are respectively supported to the front wall 145 at lower left and right peripheral edges of the first opening 8, so that the front cover 6 can pivotally move between the closed position (see FIG. 4) and the open position (see FIG. 5). In the first embodiment, the front cover 6 serves as a withdrawal-restricting unit. The closed position of the front cover 6 corresponds to a withdrawal-restricted position for restricting withdrawal of the drum unit 15 (photosensitive drums 21) from the main casing 2, and the open position corresponds to a withdrawal-allowed position for allowing withdrawal of the drum unit 15 (photosensitive drums 21) from the main casing 2.

The following description of the front cover 6 will assume that the front cover 6 is disposed in the closed position (the state of the front cover 6 in FIGS. 2, 4, 9A-9B, 11A-11C, and 14-16).

The front cover 6 is formed with a developing-unit opening 62.

The developing-unit opening 62 penetrates the front cover 6 above the first hinge portion 20 and has a generally rectangular shape in a front view, with its long dimension aligned in the left-right direction. The left-right dimension of the developing-unit opening 62 is greater than that of a first cam support member 65 (described later, see FIG. 5).

Developing-unit grooves 183 are formed in an upper edge defining the developing-unit opening 62.

Specifically, four of the developing-unit grooves 183 are formed in a portion of the front cover 6 defining the upper edge of the developing-unit opening 62. The developing-unit grooves 183 are generally U-shaped in a front view and are recessed upward in the upper edge of the developing-unit opening 62. The developing-unit grooves 183 are aligned with upper end portions of the four developing devices 24 when projected in the front-rear direction (see FIG. 5).

A portion of the front cover 6 disposed on a right side of each of the four developing-unit grooves 183 is defined as an engaging support part 184.

The four engaging support parts 184 are spaced at intervals in the left-right direction. More specifically, the rightmost engaging support part 184 in FIG. 4 is generally rectangular in a front view, while the remaining engaging support parts 184 (the three engaging support parts 184 excluding the rightmost engaging support part 184) are generally triangular in shape in a front view, tapering toward bottom ends thereof and positioned between neighboring developing-unit grooves 183 in the left-right direction.

As shown in FIG. 2, the front cover 6 includes a developing-unit cover 63, a restricting member 77, a first opposing part 78, and cover-side engaging parts 79.

As shown in FIG. 4, the developing-unit cover 63 has a generally flat plate shape elongated in the left-right direction and substantially conforms in shape to a projected surface of the developing-unit opening 62 when projected in the front-rear direction.

As shown in FIG. 2, the developing-unit cover 63 includes the first cam support member 65, and a second hinge portion 64.

The first cam support member 65 is provided on a rear surface of the developing-unit cover 63 and extends in the left-right direction (see FIG. 5). The first cam support member 65 is integrally provided with a first body part 69, and a first cam support part 70.

The first body part 69 extends vertically and has a generally flat plate shape, elongated in the left-right direction (see FIG. 5).

Figures 11A, 11B, 11C:
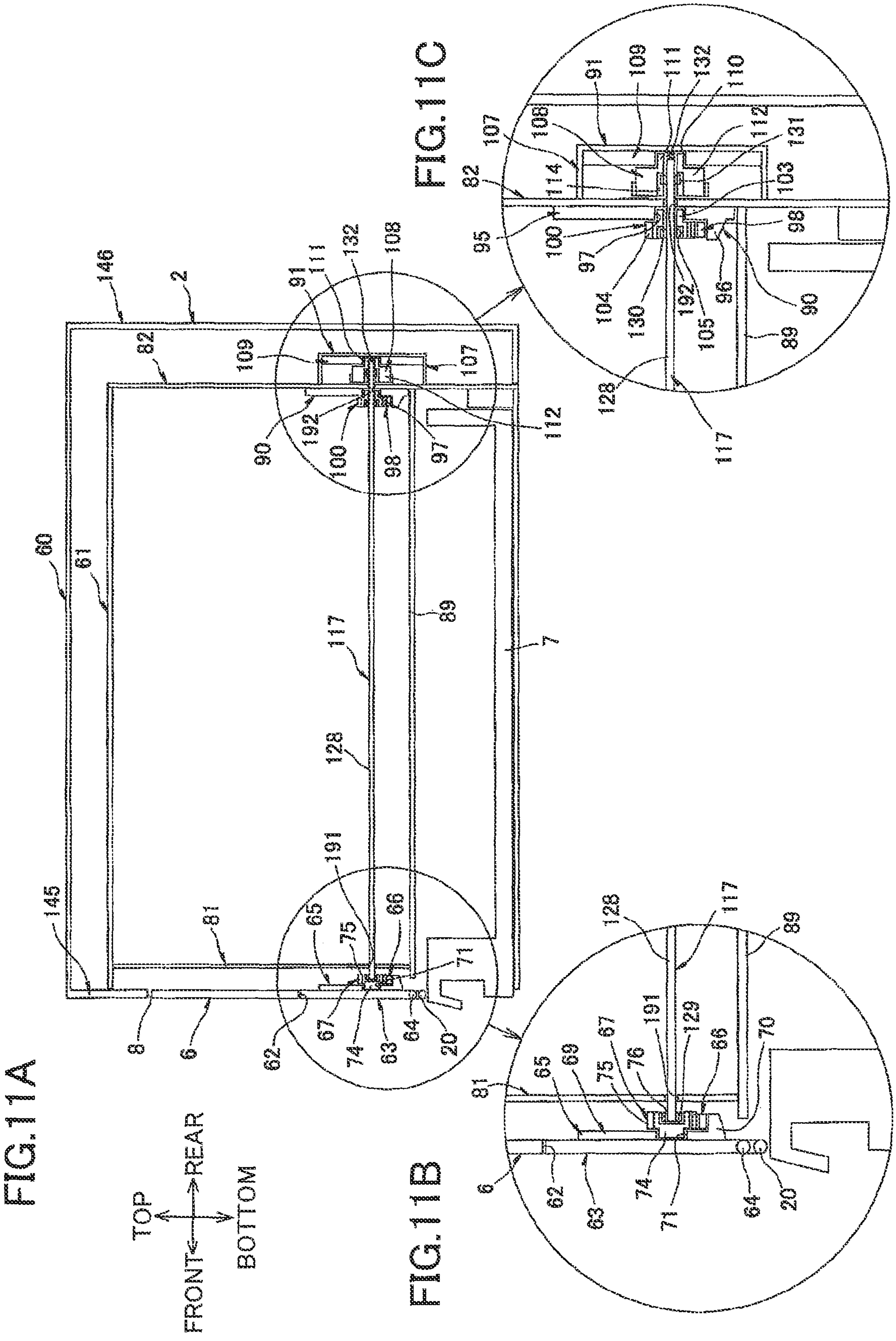
FIG. 11A is a cross-sectional view of the color printer along a line C-C in FIG. 1 in a state where the front cover is in the closed position.
FIG. 11B is an enlarged view of a front end portion of a connecting part marked by a circle in FIG. 11A.
FIG. 11C is an enlarged view of a rear end portion of the connecting part marked by a circle in FIG. 11A.

The first body part 69 is formed with a first gear insertion hole 71, as shown in FIG. 11B.

The first gear insertion hole 71 is formed in a lower left portion of the first body part 69 (see FIG. 1) at a position corresponding to a first insertion part 74 (described later) of a first pinion gear 67 (described later). The first gear insertion hole 71 has a generally circular shape in a front view and penetrates the first body part 69. The first gear insertion hole 71 has a diameter approximately equivalent to an outer diameter of the first insertion part 74 (described later).

Figure 14:
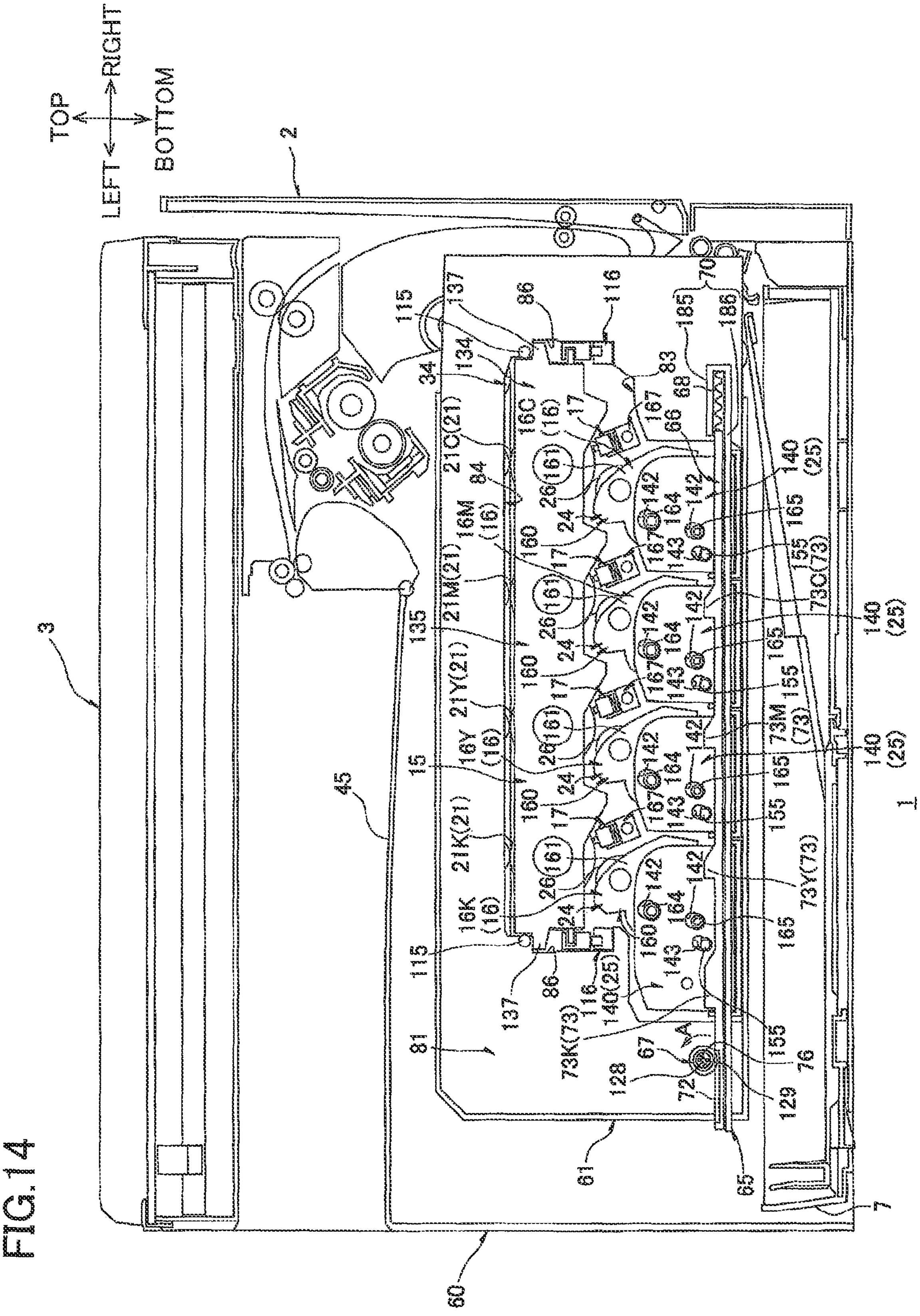
FIG. 14 is a front view of the color printer shown in FIG. 1 (when the front cover has been eliminated) showing a first cam member and a second cam member disposed in a fully separated position.

The first cam support part 70 is provided on a rear surface of the first body part 69 at a bottom end thereof and is elongated in the left-right direction (see FIG. 5). As shown in FIG. 14, the first cam support part 70 has a generally J-shape in a front view and is integrally configured of a first cam guide part 186 and a first spring accommodating part 185.

As shown in FIG. 2, the first cam guide part 186 is generally rectangular in a side view and protrudes rearward from the bottom end of the rear surface of the first body part 69. As shown in FIG. 14, the first cam guide part 186 is generally bar-shaped and extends in the left-right direction.

The first spring accommodating part 185 is generally U-shaped in a front view having an opening on its left side. The first spring accommodating part 185 has a bottom portion whose left end is formed continuously with a right end of the first cam guide part 186.

Further, the first cam support member 65 is provided with a first cam member 66, the first pinion gear 67, and a first spring member 68.

The first cam member 66 has a generally bar shape that extends in the left-right direction. The first cam member 66 includes a first rack gear 72, and first cam parts 73.

The first rack gear 72 is formed on a top surface of the first cam member 66 at a left end portion thereof.

The first cam parts 73 are provided on a right side of the first rack gear 72. Specifically, four first cam parts 73 are formed at intervals in the left-right direction and correspond in position to bosses 155 (described later) provided on front sides of the four developing units 16.

The first cam parts 73 are generally rectangular in a front view, projecting upward from the top surface of the first cam member 66. Each first cam part 73 has a right edge that slopes downward toward the right.

Of the four first cam parts 73, the leftmost first cam part 73, i.e., the first cam part 73 corresponding to the black developing unit 16K (hereinafter referred to as the black first cam part 73K) has a left-right dimension greater than those of the remaining first cam parts 73 (hereinafter referred to as the first cam parts 73Y, 73M, and 73C) corresponding to the remaining developing units 16 (yellow developing unit 16Y, magenta developing unit 16M, and cyan developing unit 16C).

The first cam member 66 is disposed above the first cam guide part 186 and is slidably movable in the left-right direction over a top surface of the first cam guide part 186.

That is, as will be described later in detail with reference to FIGS. 14 through 16, the first cam member 66 can be moved between a fully separated position (second position) disposed farthest leftward, a single-color operating position (first position) rightward from the fully separated position, and a multi-color operating position (first position) further rightward from the single-color operating position.

When the first cam member 66 is in the fully separated position, the left end of the first cam member 66 is aligned vertically with the left end of the first cam guide part 186 and the right end of the first cam member 66 is disposed at the left end of the first spring accommodating part 185, as shown in FIG. 14.

Figure 15:
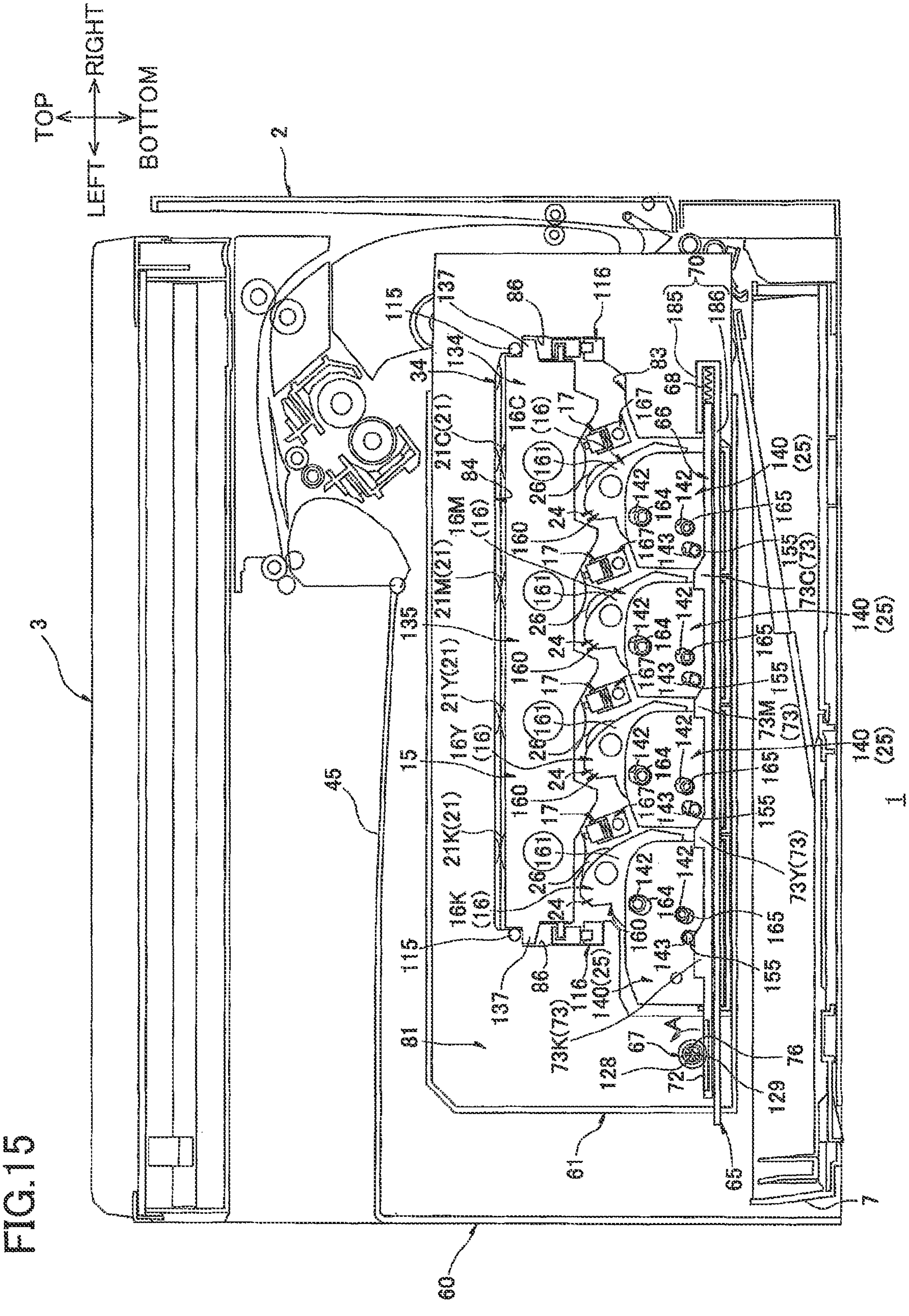
FIG. 15 is a front view of the color printer shown in FIG. 1 (when the front cover has been eliminated) showing the first cam member and the second cam member disposed in a single-color operating position.

When the first cam member 66 is in the single-color operating position, the left end of the first cam member 66 is disposed rightward from the left end of the first cam guide part 186 and the right end of the first cam member 66 is disposed in the generally left-right center region of the first spring accommodating part 185, as shown in FIG. 15.

Figure 16:
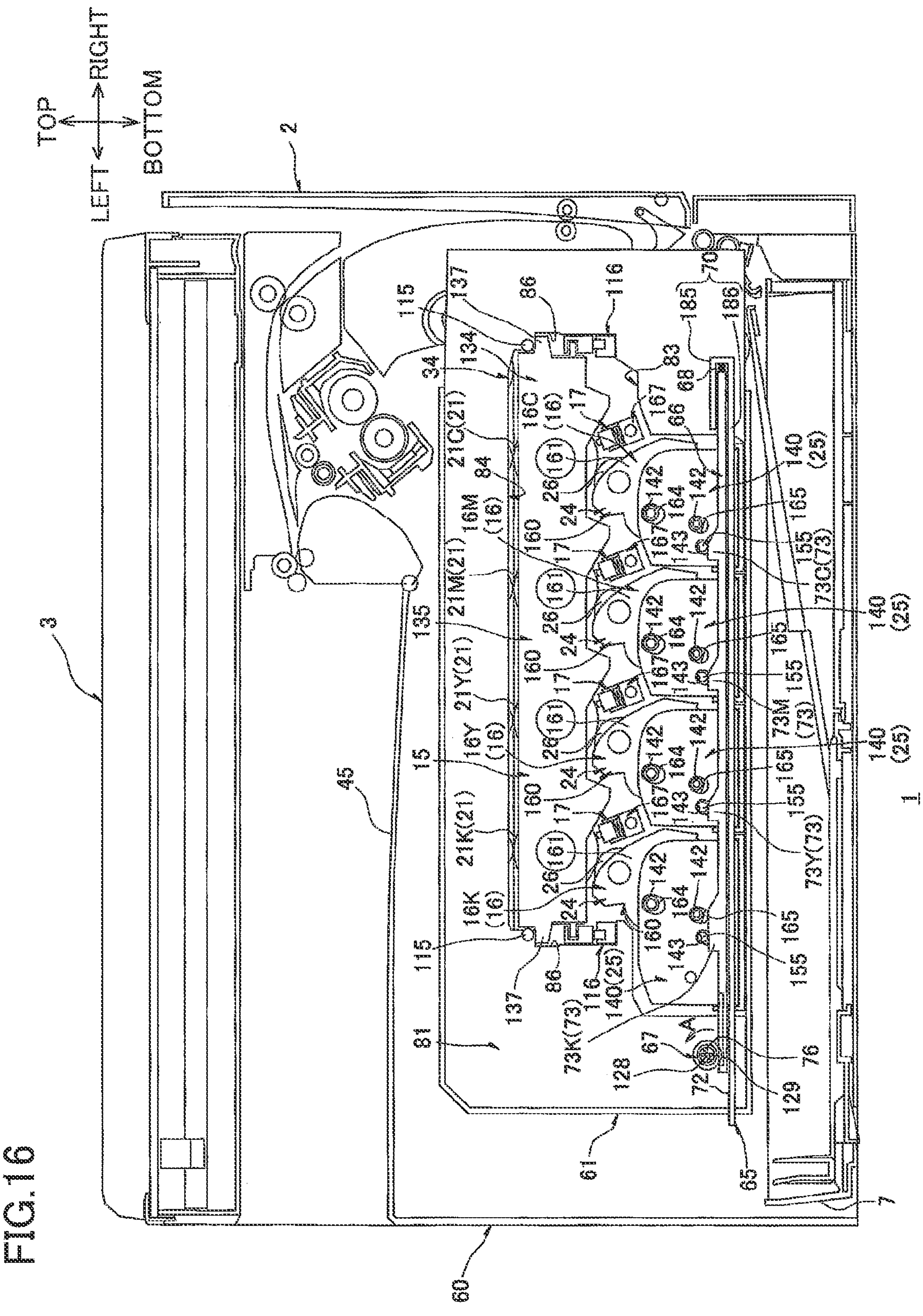
FIG. 16 is a front view of the color printer shown in FIG. 1 (when the front cover has been eliminated) showing the first cam member and the second cam member disposed in a multi-color operating position.

When the first cam member 66 is in the multi-color operating position, the right end of the first cam member 66 is disposed at the right end of the first spring accommodating part 185, as shown in FIG. 16.

As shown in FIG. 11B, the first pinion gear 67 is generally columnar in shape and extends in the front-rear direction. The first pinion gear 67 is integrally configured of a first gear part 75, and the first insertion part 74.

The first gear part 75 constitutes a rear portion of the first pinion gear 67. Gear teeth are formed around an entire peripheral surface of the first gear part 75.

The first insertion part 74 constitutes a front portion of the first pinion gear 67. The first insertion part 74 has a generally columnar shape and protrudes forward from a front surface of the first gear part 75. The first insertion part 74 is aligned coaxially with the first gear part 75 and has an outer diameter that is smaller than an outer diameter of the first gear part 75.

A first linking part 76 is also formed on the first pinion gear 67.

The first linking part 76 is formed in substantially a center region in a rear surface of the first gear part 75. In a side view, the first linking part 76 has a generally U-shape, with a rear opening. When the front cover 6 is in the closed position, a first coupling part 129 (described later) of a connecting part 117 (described later) provided in the main casing 2 is inserted into the first linking part 76 so as to be incapable of rotating relative thereto. A drive force is inputted from the main casing 2 into the first linking part 76 via the connecting part 117.

The first pinion gear 67 is disposed above the left end of the first cam member 66 such that the first insertion part 74 is inserted into the first gear insertion hole 71 so as to be capable of rotating relative thereto, and a lower portion of the first gear part 75 meshingly engages with the first rack gear 72, as shown in FIGS. 14 through 16.

Specifically, the first pinion gear 67 meshingly engages with a right end of the first rack gear 72 when the first cam member 66 is in the fully separated position shown in FIG. 14, meshingly engages with an approximate left-right center region of the first rack gear 72 when the first cam member 66 is in the single-color operating position shown in FIG. 15, and meshingly engages with a left end of the first rack gear 72 when the first cam member 66 is in the multi-color operating position shown in FIG. 16.

The first spring member 68 is formed in the shape of an air-core coil that extends in the left-right direction, as shown in FIG. 14. The first spring member 68 is accommodated in the first spring accommodating part 185 so as to be interposed between the right end of the first cam member 66 and a right wall of the first spring accommodating part 185.

The first spring member 68 has a left end fixed to the right end of the first cam member 66, and a right end fixed to a left surface of the right wall of the first spring accommodating part 185.

With this configuration, the first spring member 68 constantly urges the first cam member 66 leftward toward the fully separated position. That is, the first spring member 68 urges the first cam member 66 from the multi-color operating position (or single-color operating position) toward the fully separated position.

As shown in FIG. 4, the second hinge portion 64 is provided on a bottom edge of the developing-unit cover 63 while left and right ends of the second hinge portion 64 are respectively supported to the front cover 6 at lower left and right peripheral edges of the developing-unit opening 62.

With this configuration, the developing-unit cover 63 can pivotally move about the second hinge portion 64 between a developing-unit-cover closed position (see FIG. 4) for closing the developing-unit opening 62, and a developing-unit-cover open position (see FIG. 8B) for exposing the developing-unit opening 62.

As shown in FIG. 2, the restricting member 77 is provided at the first hinge portion 20 so as to be incapable of moving relative thereto. The restricting member 77 first extends rearward from a rear edge of the first hinge portion 20, then bends upward to form a general L-shape in a side view. The restricting member 77 has a top edge that slopes rearward toward the top.

Figures 9A, 9B:
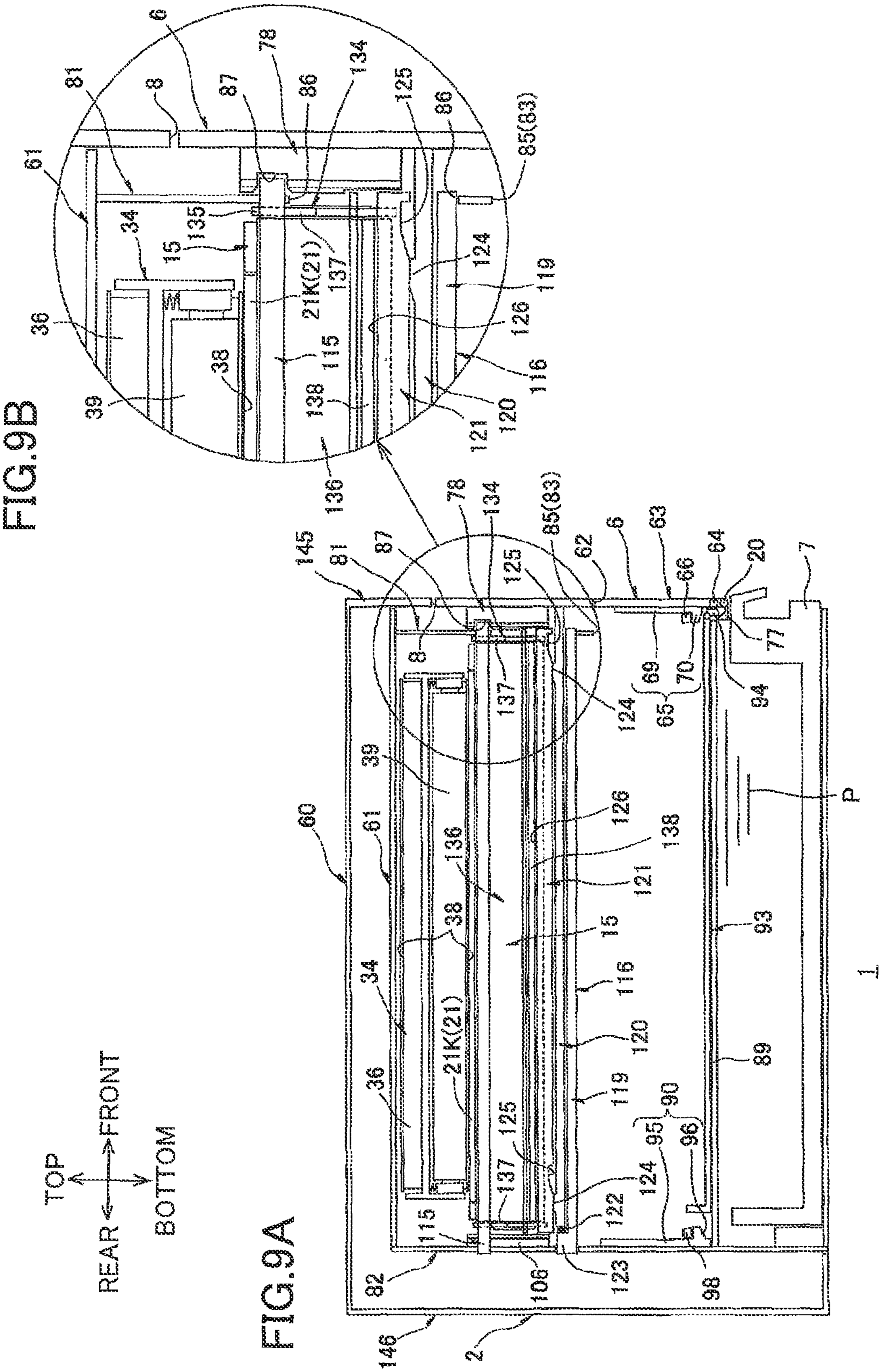
FIG. 9A is a cross-sectional view of the color printer along a line B-B in FIG. 1 in a state where the front cover is in the closed position.
FIG. 9B is an enlarged view of a front end portion of a pressing unit marked by a circle in FIG. 9A.

The first opposing part 78 is provided on a rear surface of the front cover 6 at a position above the developing-unit opening 62 and is elongated in the left-right direction (see FIG. 9A). The first opposing part 78 is generally rectangular in a side view and protrudes rearward from the rear surface of the front cover 6.

As shown in FIG. 9B, positioning shaft grooves 87 are formed in the first opposing part 78.

Two of the positioning shaft grooves 87 are formed apart from each other in the left-right direction at positions corresponding to front ends of two positioning shafts 115 (described later) (see FIG. 1).

The positioning shaft grooves 87 are formed in an upper portion of the first opposing part 78 at respective left and right ends thereof. The positioning shaft grooves 87 are recessed frontward in the rear surface of the first opposing part 78 and are substantially U-shaped in a side view.

As shown in FIG. 2, four of the cover-side engaging parts 79 are disposed below the first opposing part 78 at positions corresponding to the four engaging support parts 184 (see FIG. 4). The cover-side engaging parts 79 are generally rectangular in a side view and protrude rearward from the rear surfaces of the corresponding engaging support parts 184. The cover-side engaging parts 79 are integrally formed with the first opposing part 78 so that their top ends are continuous with a bottom edge of the first opposing part 78.

Each cover-side engaging part 79 is formed with an engaging groove 80 at a position corresponding to an LED-unit engaging part 175 (described later) of the LED unit 17.

The engaging grooves 80 are generally U-shaped in a side view and are recessed frontward in rear surfaces of the cover-side engaging parts 79. The engaging grooves 80 have a vertical dimension approximately equivalent to that of the LED-unit engaging parts 175 (described later).

As shown in FIG. 1, the rear wall 146 has a generally flat plate shape and is elongated in the left-right direction.

As shown in FIG. 2, LED-unit support parts 147 are provided at the rear wall 146.

Specifically, four of the LED-unit support parts 147 are spaced at intervals in the left-right direction and correspond in position to LED-unit supported parts 176 (described later) of the four LED units 17.

Each of the four LED-unit support parts 147 is provided on a front surface of the rear wall 146 in substantially a vertical center thereof. The LED-unit support parts 147 have a flat plate shape and are generally semi-circular in a side view, protruding forward from the front surface of the rear wall 146.

The inner casing 61 has a box-like shape that is generally rectangular in a side view. The inner casing 61 has vertical and left-right dimensions sufficient for accommodating the sheet feeding unit 4 (see FIG. 1) and the image forming unit 5. The inner casing 61 is accommodated in a front side of the outer casing 60 so as to leave a gap between its rear side and a rear side of the outer casing 60.

The inner casing 61 includes the front wall 81 and the rear wall 82 that are arranged in confrontation with each other and spaced apart in the front-rear direction.

As shown in FIGS. 5 and 11B, the front wall 81 has a generally flat plate shape and is elongated in the left-right direction. The front wall 81 is formed with a second opening 83 (see FIG. 5) and a front connecting-part support hole 191 (see FIG. 11B).

As shown in FIG. 5, the second opening 83 is formed in an approximate left-right center region of the front wall 81 so as to be in communication with the first opening 8 of the outer casing 60 in the front-rear direction.

The second opening 83 includes a drum access opening 84 constituting an upper portion thereof, and a developing-unit access opening 85 constituting a lower portion thereof.

The drum access opening 84 is generally rectangular in a front view, with its long dimension aligned in the left-right direction, and penetrates the front wall 81. Pressing unit grooves 86 (see FIG. 5) are formed one in each of left and right edges of the drum access opening 84.

The pressing unit grooves 86 are generally U-shaped in a front view and are recessed outward in respective leftward and rightward directions in the left and right edges of the drum access opening 84, respectively.

The developing-unit access opening 85 is generally rectangular in a front view, with its long dimension aligned in the left-right direction, and penetrates the front wall 81. The left-right length of the developing-unit access opening 85 is approximately equivalent to that of the drum access opening 84.

The developing-unit access opening 85 is formed below the drum access opening 84 such that a left edge of the developing-unit access opening 85 is positioned farther leftward than a left edge of the drum access opening 84, and a right portion of the developing-unit access opening 85 communicates vertically with a left portion of the drum access opening 84.

As shown in FIG. 11B, the front connecting-part support hole 191 has a generally circular shape in a front view and penetrates the front wall 81 at a position leftward of the developing-unit access opening 85 and opposing the first linking part 76 of the first pinion gear 67 in the front-rear direction when the front cover 6 is in the closed position. The front connecting-part support hole 191 has a diameter greater than an outer diameter of a shaft part 128 (described later) of the connecting part 117 (described later).

As shown in FIGS. 2 and 11C, the rear wall 82 is formed with supported part insertion holes 88 (see FIG. 2) and a rear connecting-part support hole 192 (see FIG. 11C).

As shown in FIG. 2, four of the supported part insertion holes 88 are formed at intervals in the left-right direction and correspond in position to the LED-unit supported parts 176 (described later) of the four LED units 17 (see FIG. 1).

Each of the four supported part insertion holes 88 penetrates the rear wall 82 in the front-rear direction at positions substantially in a vertical center of the rear wall 82. The supported part insertion hole 88 has a vertical dimension greater than that of the LED-unit supported part 176 (described later).

As shown in FIG. 11A, the rear connecting-part support hole 192 has a generally circular shape in a front view and penetrates a lower left portion of the rear wall 82 at a position aligned with the front connecting-part support hole 191 in the front-rear direction. The rear connecting-part support hole 192 has a diameter greater than the outer diameter of the shaft part 128 (described later) of the connecting part 117 (described later).

As shown in FIG. 2, the rear wall 82 includes a second cam support member 90, a second opposing part 106, and a drive input unit 91 (see FIGS. 11B and 11C).

The second cam support member 90 has a shape the same as that of the first cam support member 65 (see FIG. 14). The second cam support member 90 is provided on a front surface of the rear wall 82 so as to overlap the first cam support member 65 in the front-rear direction when projected in the front-rear direction in a state where the front cover 6 is in the closed position.

The second cam support member 90 is integrally provided with a second body part 95, and a second cam support part 96.

The second body part 95 extends vertically and has a generally flat plate shape, elongated in the left-right direction.

The second body part 95 is formed with a second gear insertion hole 97, as shown in FIG. 11C.

The second gear insertion hole 97 is formed in a lower left portion of the second body part 95 at a position corresponding to a second insertion part 103 (described later) of a second pinion gear 100 (described later). The second gear insertion hole 97 has a generally circular shape in a rear view and penetrates the second body part 95 to provide communication with the rear connecting-part support hole 192 in the front-rear direction. The second gear insertion hole 97 has a diameter approximately equivalent to an outer diameter of the second insertion part 103 (described later).

Figure 6:
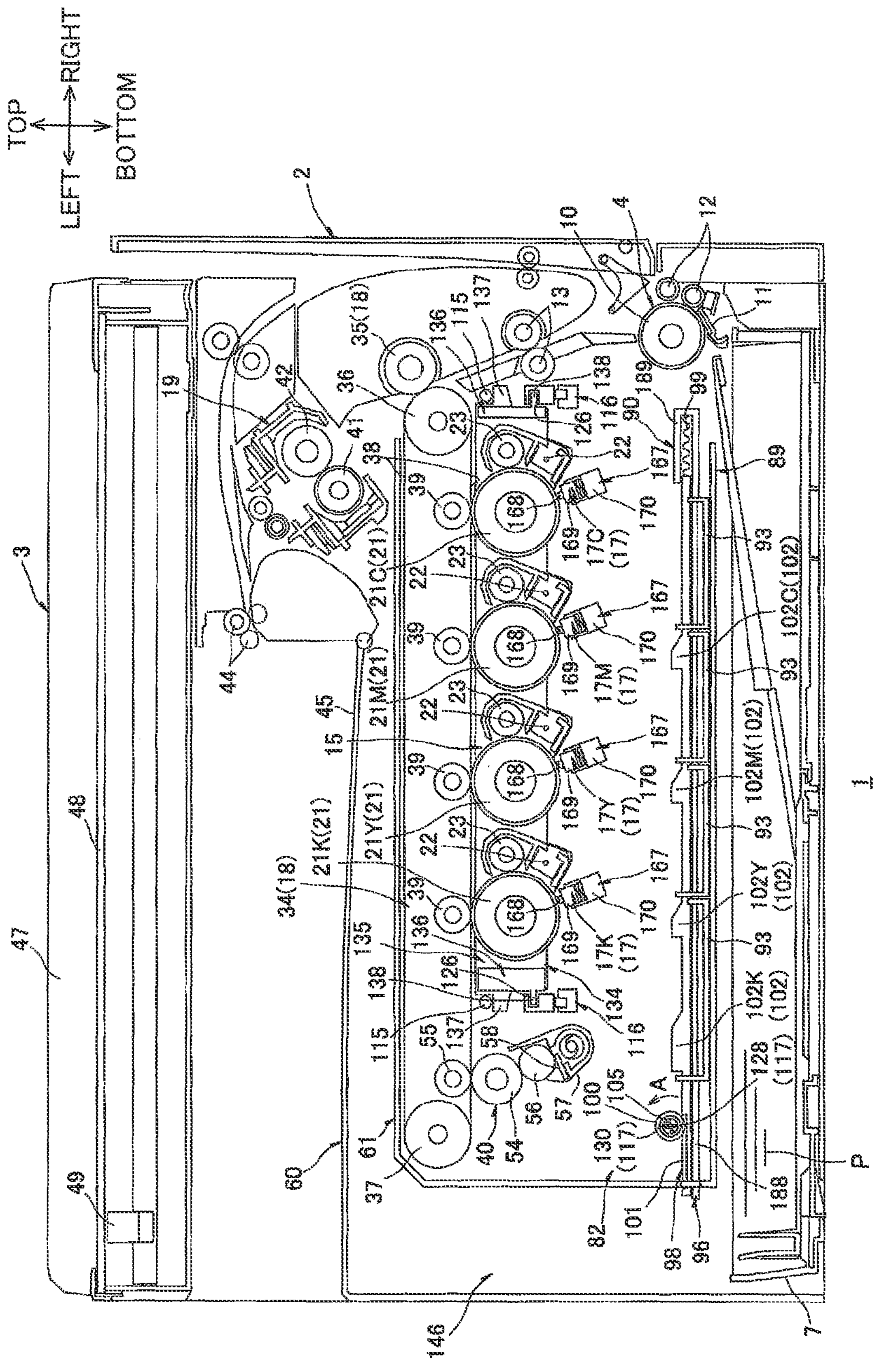
FIG. 6 is a cross-sectional view of the color printer along the line A-A in FIG. 1 when developing units have been eliminated.

The second cam support part 96 is provided on a front surface of the second body part 95 at a bottom end thereof and is elongated in the left-right direction (see FIG. 6).

As shown in FIG. 6, the second cam support part 96 has a generally J-shape in a front view and is integrally configured of a second cam guide part 188 and a second spring accommodating part 189.

As shown in FIG. 2, the second cam guide part 188 is generally rectangular in a side view and protrudes forward from the bottom end of the front surface of the second body part 95. As shown in FIG. 6, the second cam guide part 188 is generally bar-shaped and extends in the left-right direction.

The second spring accommodating part 189 is generally U-shaped in a front view having an opening on its left side. The second spring accommodating part 189 has a bottom portion whose left end is formed continuously with a right end of the second cam guide part 188.

Further, the second cam support member 90 is provided with a second cam member 98, the second pinion gear 100, and a second spring member 99.

The second cam member 98 has a shape the same as that of the first cam member 66 (see FIG. 14). Specifically, the second cam member 98 has a generally bar shape and extends in the left-right direction. The second cam member 98 includes a second rack gear 101, and second cam parts 102.

The second rack gear 101 is formed on a top surface of the second cam member 98 at a left end portion thereof.

The second cam parts 102 are provided on a right side of the second rack gear 101. Specifically, four of the second cam parts 102 are formed at intervals in the left-right direction and correspond in position to bosses 155 (described later) provided on rear sides of the four developing units 16.

The second cam parts 102 are generally rectangular in a front view, projecting upward from the top surface of the second cam member 98. Each second cam parts 102 has a right edge that slopes downward toward the right.

Of the four second cam parts 102, the leftmost second cam part 102, i.e., the second cam part 102 corresponding to the black developing unit 16K (hereinafter referred to as the black second cam part 102K) has a left-right dimension greater than those of the remaining second cam parts 102 (hereinafter referred to as the second cam parts 102Y, 102M, 102C) corresponding to the remaining developing units 16 (yellow developing unit 16Y, magenta developing unit 16M, cyan developing unit 16C).

The second cam member 98 is disposed above the second cam guide part 188 so as to overlap the first cam member 66 (see FIG. 14) when projected in the front-rear direction, and is slidably movable in the left-right direction over a top surface of the second cam guide part 188.

Specifically, as will be described later in detail, the second cam member 98 can be moved between a fully separated position (fourth position) disposed farthest leftward, as shown in FIG. 6, a single-color operating position (third position) rightward from the fully separated position, and a multi-color operating position (third position) further rightward from the single-color operating position.

When the second cam member 98 is in the fully separated position, the left end of the second cam member 98 is aligned vertically with the left end of the second cam guide part 188 and the right end of the second cam member 98 is disposed at the left end of the second spring accommodating part 189, as shown in FIG. 6.

Although not shown in the drawings, when the second cam member 98 is in the single-color operating position, the left end of the second cam member 98 is disposed rightward from the left end of the second cam guide part 188 and the right end of the second cam member 98 is disposed in the general left-right center region of the second spring accommodating part 189.

Although not shown in the drawings, when the second cam member 98 is in the multi-color operating position, the right end of the second cam member 98 is disposed at the right end of the second spring accommodating part 189.

As shown in FIG. 11C, the second pinion gear 100 is generally columnar in shape and extends in the front-rear direction. The second pinion gear 100 is integrally configured of a second gear part 104, and the second insertion part 103.

The second gear part 104 constitutes a front portion of the second pinion gear 100. The second gear part 104 has a generally columnar shape and extends in the front-rear direction. The second gear part 104 has an outer diameter equivalent to that of the first gear part 75 of the first pinion gear 67. Gear teeth are formed around an entire outer peripheral surface of the second gear part 104.

The second gear part 104 has an inner peripheral surface formed as a second linking part 105.

When the front cover 6 is in the closed position, a second coupling part 130 (described later) of the connecting part 117 (described later) provided in the main casing 2 is inserted into the second linking part 105 so as to be incapable of rotating relative thereto.

The second insertion part 103 constitutes a rear portion of the second pinion gear 100. The second insertion part 103 has a generally columnar shape and protrudes rearward from a rear surface of the second gear part 104. The second insertion part 103 is aligned coaxially with the second gear part 104. The second insertion part 103 has an outer diameter that is smaller than an outer diameter of the second gear part 104, and an inner diameter that is slightly greater than the outer diameter of the shaft part 128 (described later) of the connecting part 117 (described later).

The second pinion gear 100 is disposed above the left end of the second cam member 98 such that the second insertion part 103 is inserted into the second gear insertion hole 97 so as to be capable of rotating relative thereto, and a lower portion of the second gear part 104 meshingly engages (couples) with the second rack gear 101 (see FIG. 6).

Specifically, the second pinion gear 100 meshingly engages with a right end of the second rack gear 101 when the second cam member 98 is in the fully separated position shown in FIG. 6. While not shown in the drawings, the second pinion gear 100 meshingly engages with an approximate left-right center region of the second rack gear 101 when the second cam member 98 is in the single-color operating position, and meshingly engages with a left end of the second rack gear 101 when the second cam member 98 is in the multi-color operating position.

In this way, the second pinion gear 100 is disposed in a position for opposing the first pinion gear 67 (see FIG. 11B) in the front-rear direction, and is supported to the rear wall 82 so as to be capable of rotating relative thereto. Further, the second insertion part 103 of the second pinion gear 100 is in communication with the rear connecting-part support hole 192 in the front-rear direction.

As shown in FIG. 6, the second spring member 99 is formed in the shape of an air-core coil that extends in the left-right direction. The second spring member 99 is accommodated in the second spring accommodating part 189 so as to be interposed between the right end of the second cam member 98 and a right wall of the second spring accommodating part 189.

The second spring member 99 has a left end fixed to the right end of the second cam member 98, and a right end fixed to a left surface of the right wall of the second spring accommodating part 189.

With this configuration, the second spring member 99 constantly urges the second cam member 98 leftward toward the fully separated position, as described above with the first cam member 66. In other words, the second spring member 99 urges the second cam member 98 from the multi-color operating position (or single-color operating position) toward the fully separated position.

As shown in FIG. 2, the second opposing part 106 is provided on a front surface of the rear wall 82 at a position above the supported part insertion holes 88. The second opposing part 106 is elongated in the left-right direction (see FIG. 9A). The second opposing part 106 is generally rectangular in a side view and protrudes forward from the front surface of the rear wall 82.

As shown in FIG. 11C, the drive input unit 91 is provided on a rear surface of the rear wall 82, and is disposed opposite to the second pinion gear 100 with respect to the rear wall 82.

The drive input unit 91 includes a drive frame 107, and a drive gear 108.

The drive frame 107 has a generally U-shape in a side view having a front opening. A drive gear support part 109 is fixed to a front surface of a rear wall of the drive frame 107.

The drive gear support part 109 is generally rectangular in a side view, and is elongated vertically. The drive gear support part 109 is formed with a drive gear support hole 110 in an approximate vertical center region thereof.

The drive gear support hole 110 is shaped to conform to a supported part 111 (described later) of the drive gear 108 (described later). The drive gear support hole 110 has a generally circular shape in a front view and penetrates the drive gear support part 109. When projected in the front-rear direction, the drive gear support hole 110 conforms in shape to a projected surface of the second gear insertion hole 97.

The drive frame 107 is supported to the rear wall 82 with top and bottom edges of the drive frame 107 fixed to the rear surface of the rear wall 82.

The drive gear 108 includes an input gear part 112, and the supported part 111.

The input gear part 112 is generally columnar in shape and extends in the front-rear direction. Gear teeth are formed around an entire peripheral surface of the input gear part 112.

The input gear part 112 has an inner peripheral surface formed as a drive-side linking part 114.

When the front cover 6 is in the closed position, a drive coupling part 131 (described later) of the connecting part 117 (described later) provided in the main casing 2 is inserted into the drive-side linking part 114 so as to be incapable of rotating relative thereto.

The supported part 111 is generally columnar in shape and protrudes rearward from a rear end portion of the input gear part 112. The supported part 111 is aligned coaxially with the input gear part 112. The supported part 111 has an outer diameter that is smaller than an outer diameter of the input gear part 112, and an inner diameter that is approximately equivalent to the outer diameter of the shaft part 128 (described later) of the connecting part 117 (described later).

The input gear part 112 is accommodated in the drive frame 107 and is supported to the rear wall 82 so as to be capable of rotating relative to the rear wall 82 by inserting the supported part 111 into the drive gear support hole 110 so as to be capable of rotating relative thereto.

As shown in FIGS. 9A and 11A, a partitioning wall 89, the positioning shafts 115 (see FIG. 9A), pressing units 116 (see FIG. 9A), and the connecting part 117 (see FIG. 11A) are supported between the front wall 81 and the rear wall 82.

The partitioning wall 89 has a generally flat plate shape and extends in the front-rear direction. As shown in FIG. 2, the partitioning wall 89 is provided vertically between the paper tray 7 and the developing units 16 for partitioning an interior space in the inner casing 61 into an upper unit-accommodating space 198, and a lower paper-tray-accommodating space 199.

Guide parts 93 are fixed to a top surface of the partitioning wall 89. As shown in FIGS. 1 and 2, four of the guide parts 93 are provided to correspond to the four developing units 16.

The guide parts 93 have a tray-like structure (see FIG. 2), elongated in the front-rear direction and open on its top and front sides. The guide parts 93 are also generally U-shaped in a front view (see FIG. 1), with an open top. Each guide part 93 has an inner surface that conforms to an outer shape of a bottom portion of the corresponding developing-unit frame 25. Each guide part 93 has inner dimensions (left-right and front-rear dimensions) approximately equivalent to outer dimensions (left-right and front-rear dimensions) of the developing-unit frame 25. Further, each guide part 93 has a front-rear dimension smaller than that of the partitioning wall 89.

A pivot part 94 is provided at a front end of each guide part 93, as shown in FIG. 9A.

Figure 3:
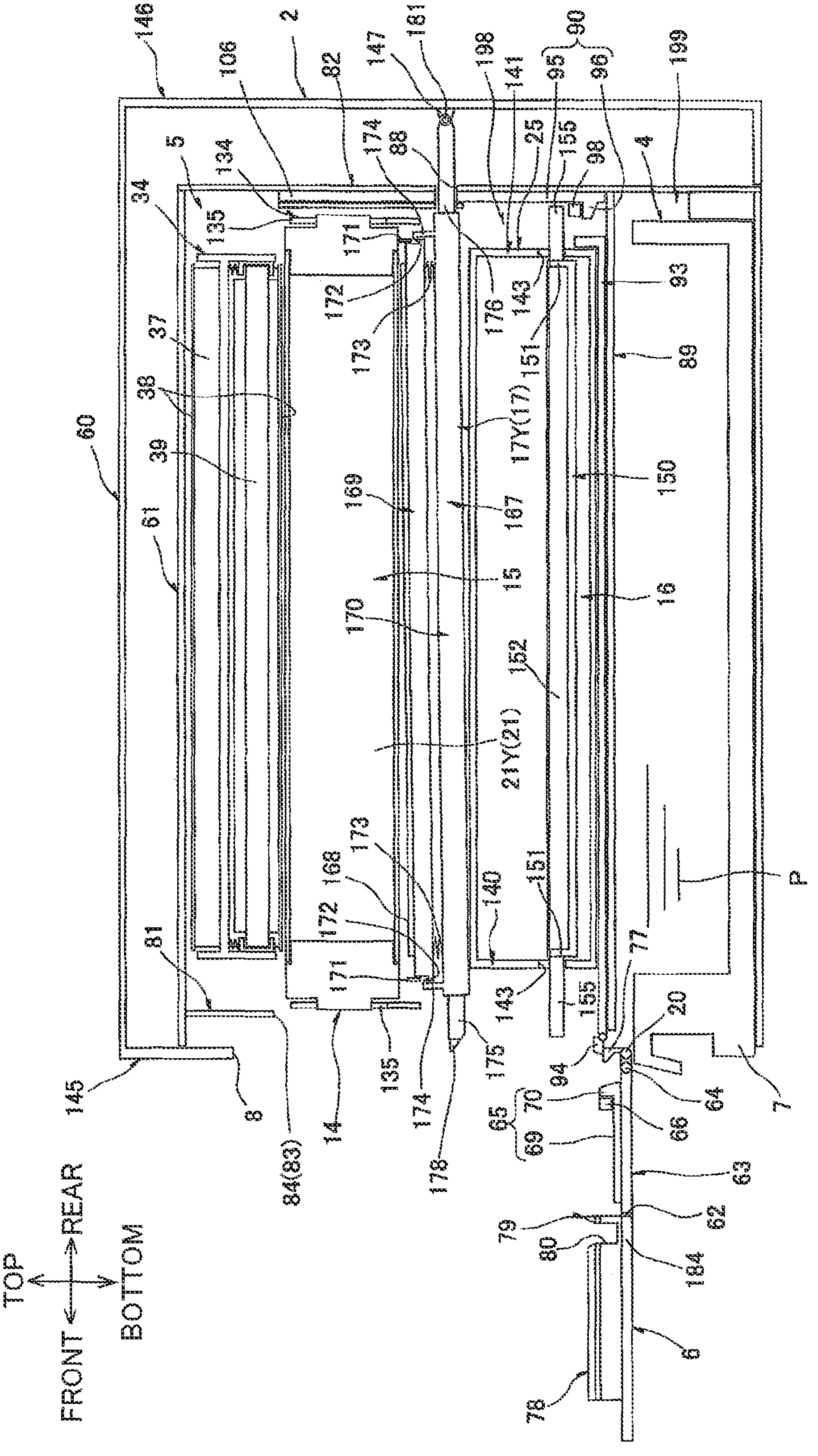
FIG. 3 is a cross-sectional view of the color printer along the line A-A in FIG. 1 in a state where the front cover is in an open position.

The pivot parts 94 are generally rectangular in a side view. Each pivot part 94 is capable of pivotally moving about its rear end between a withdrawal-allowed position extending downward from the front end of the guide part 93, and a withdrawal-restricted position (see FIG. 3) extending forward from the front end of the guide part 93. Specifically, when in the withdrawal-allowed position, the pivot part 94 is disposed lower than a bottom wall of the guide part 93. When in the withdrawal-restricted position, an upper portion of the pivot part 94 is higher than the bottom wall of the guide part 93, as shown in FIG. 3.

The guide parts 93 are fixed to the top surface of the partitioning wall 89 so that the front end of each guide part 93 is positioned farther forward than a front end of the partitioning wall 89. With this configuration, the force of gravity continuously urges the pivot parts 94 into their withdrawal-allowed position. Further, a gap in the front-rear direction is provided between rear ends of the guide part 93 and the rear wall 82.

As shown in FIG. 9A, the positioning shafts 115 are generally columnar in shape and extend in the front-rear direction. As shown in FIG. 5, two of the positioning shafts 115 are disposed juxtaposed with (parallel to) each other and separated from each other in the left-right direction. As shown in FIG. 9A, the positioning shafts 115 are formed longer in the front-rear direction than the distance between the front wall 81 and the rear wall 82.

Thus, the two positioning shafts 115 are fixed in the front wall 81 and the rear wall 82, with front ends of the positioning shafts 115 penetrating upper peripheral edges of the pressing unit grooves 86 formed in the front wall 81 in the front-rear direction (see FIG. 5), while rear ends of the positioning shafts 115 penetrate the second opposing part 106 and the rear wall 82 in the front-rear direction.

Two of the pressing units 116 are provided to correspond to two guided parts 138 (described later) provided at the drum unit 15. The pressing units 116 are disposed below the respective positioning shafts 115 (see FIG. 5).

Each pressing unit 116 includes a fixed part 119, a sliding member 120, a pressing spring 122, and a moving member 121, as shown in FIG. 9A.

The fixed part 119 has a general bar shape and extends in the front-rear direction. The fixed part 119 has a rear end integrally provided with a protruding part 123.

The protruding part 123 is generally rectangular in a side view and protrudes upward from a top surface of the fixed part 119 at the rear end thereof.

A front end of the fixed part 119 is fixed to the front wall 81, while being supported from beneath to a lower edge of the pressing unit groove 86 (see FIG. 5). Further, the rear end of the fixed part 119 is fixed to the rear wall 82, while being inserted through the rear wall 82 in the front-rear direction.

The sliding member 120 is generally bar-shaped and extends in the front-rear direction. The front-rear dimension of the sliding member 120 is approximately equivalent to that of the fixed part 119.

The sliding member 120 is provided with two pressing cam parts 124 spaced apart in the front-rear direction.

The pressing cam parts 124 are generally rectangular in a side view and protrude upward from a top surface of the sliding member 120. The pressing cam parts 124 have rear ends formed so as to slope downward toward the rear.

Figures 10A, 10B:
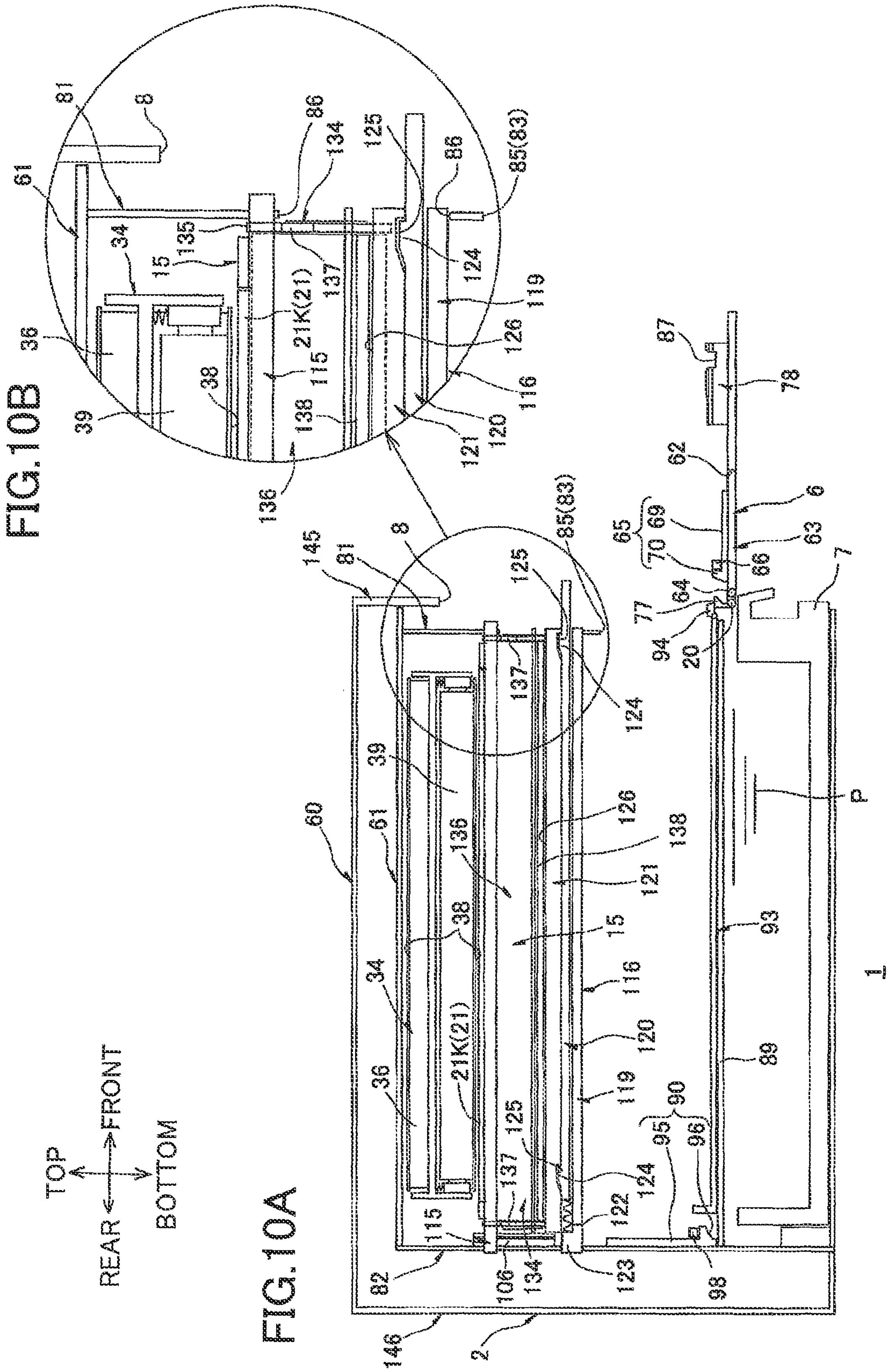
FIG. 10A is a cross-sectional view of the color printer along the line B-B in FIG. 1 in a state where the front cover is in the open position.
FIG. 10B is an enlarged view of the front end portion of the pressing unit marked by a circle in FIG. 10A.

As shown in FIGS. 9A and 10A, the sliding member 120 is disposed above the fixed part 119 such that a front surface of the protruding part 123 provided at the fixed part 119 opposes a rear surface of the sliding member 120 in the front-rear direction. With this configuration, the sliding member 120 can slidingly move in the front-rear direction over the top surface of the fixed part 119.

Specifically, the sliding member 120 can move between a protruding position shown in FIG. 10A in which a front end of the sliding member 120 protrudes out of the outer casing 60 through the first opening 8 formed in the outer casing 60, and a contacting position shown in FIG. 9A in which the front end of the sliding member 120 is accommodated in the outer casing 60.

As shown in FIG. 10A, the pressing spring 122 is shaped like an air-core coil and extends in the front-rear direction. The pressing spring 122 is interposed between the front surface of the protruding part 123 provided at the fixed part 119 and the rear surface of the sliding member 120. Further, a front end of the pressing spring 122 is fixed to the rear surface of the sliding member 120, and a rear end of the pressing spring 122 is fixed to the front surface of the protruding part 123.

With this configuration, the pressing spring 122 constantly urges the sliding member 120 forward toward the protruding position.

The moving member 121 is generally bar-shaped and extends in the front-rear direction.

The moving member 121 is formed with cam-receiving grooves 125 (see FIG. 10A) and drum-guiding grooves 126 (see FIG. 5).

The cam-receiving grooves 125 are formed in a bottom surface of the moving member 121, with one on each of front and rear ends thereof, to correspond to the two pressing cam parts 124.

The cam-receiving grooves 125 are generally rectangular in a side view and are recessed upward in the bottom surface of the moving member 121. The cam-receiving grooves 125 have rear edges that are shaped to slope downward toward the rear.

As shown in FIG. 5, the drum-guiding grooves 126 are generally U-shaped in a front view and are recessed outward in respective leftward and rightward directions in right and left surfaces of the moving members 121. As shown in FIG. 9A, the drum-guiding grooves 126 are elongated in the front-rear direction. The drum-guiding grooves 126 have a width (vertical dimension) approximately equivalent to a vertical dimension of the guided parts 138 (described later).

As shown in FIGS. 9A and 10A, the moving members 121 are disposed above the sliding members 120 and are configured to move vertically.

Specifically, when the sliding members 120 are in the contacting position shown in FIG. 9A, the bottom surfaces of the moving members 121 on the rear sides of the cam-receiving grooves 125 contact the top surfaces of the pressing cam parts 124 and, hence, the moving members 121 are disposed in a pressing position where the moving members 121 are elevated. When the sliding members 120 are in the protruding position shown in FIG. 10A, the cam-receiving grooves 125 receive the pressing cam parts 124, allowing the moving members 121 to move downward into a release position. Hence, the moving members 121 can move vertically between the pressing position and the release position shown in FIGS. 9A and 10A, respectively.

Since the pressing cam parts 124 are normally disposed in the protruding position, the moving members 121 are normally disposed in the release position.

Figure 12B:
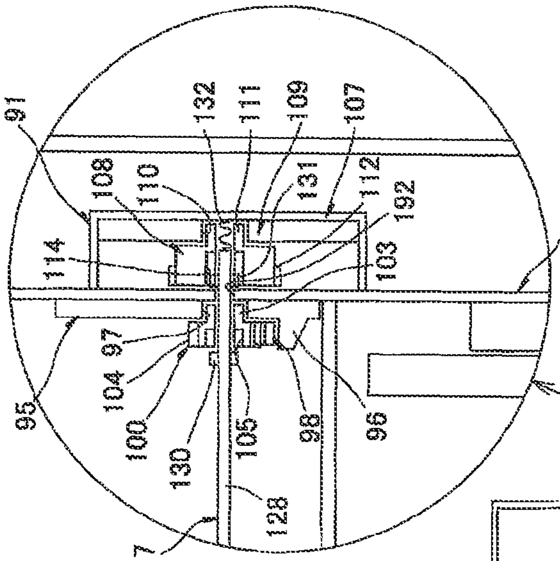
FIG. 12B is an enlarged view of the rear end portion of the connecting part marked by a circle in FIG. 12A.
Figure 12A:
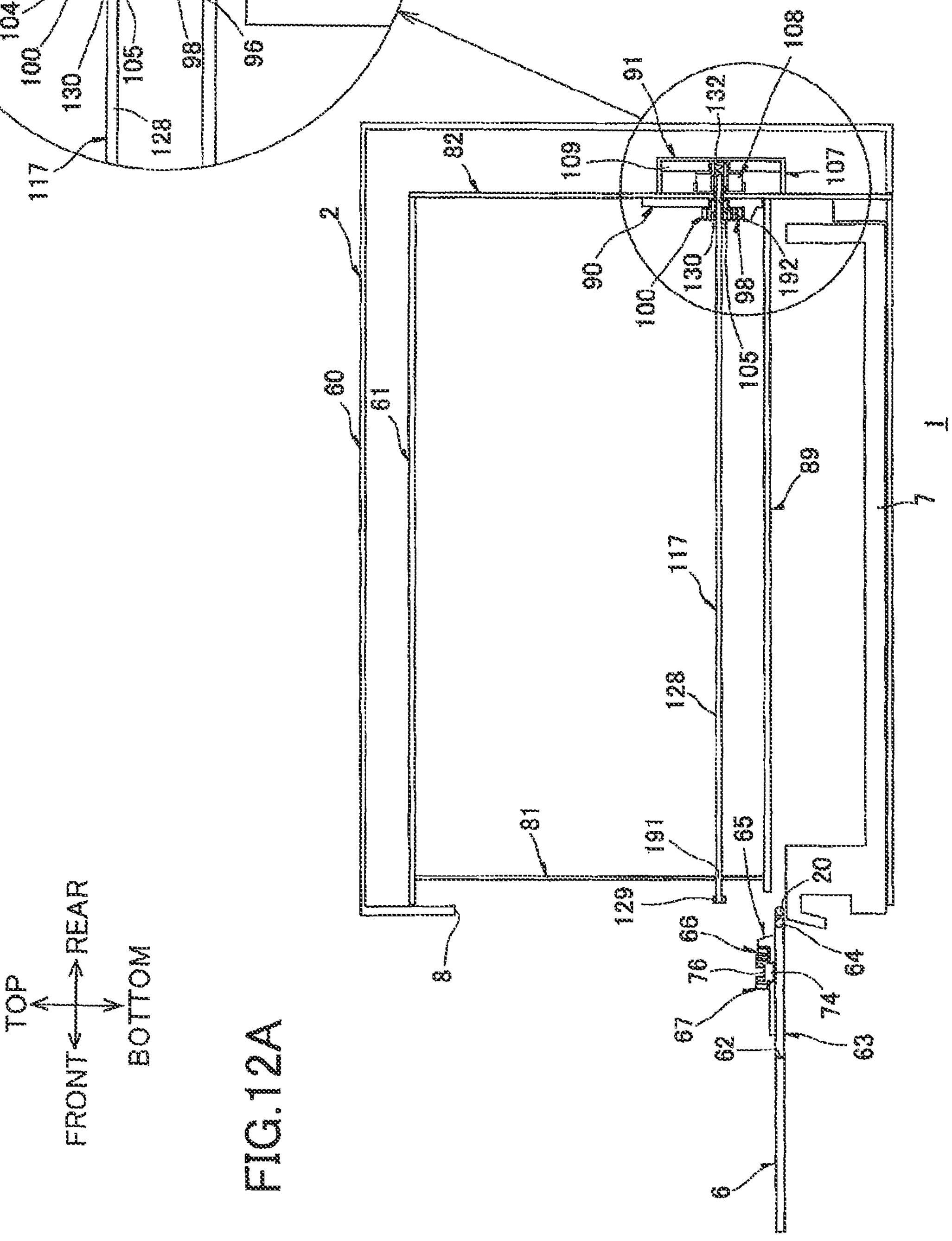
FIG. 12A is a cross-sectional view of the color printer along the line C-C in FIG. 1 in a state where the front cover is in the open position.

As shown in FIG. 5, the connecting part 117 is provided on a lower left side of the left pressing unit 116. As shown in FIGS. 12A and 12B, the connecting part 117 includes the shaft part 128, the first coupling part 129, the second coupling part 130, the drive coupling part 131, and a connecting part spring 132.

The shaft part 128 is generally columnar in shape and is oriented in the front-rear direction. The front-rear dimension of the shaft part 128 is greater than the gap formed between the front wall 81 and rear wall 82.

As shown in FIG. 11A, the shaft part 128 is supported in the front wall 81 and the rear wall 82 so as to be capable of rotating relative to the same, with the front end of the shaft part 128 inserted through the front connecting-part support hole 191 and protruding forward from the front wall 81 and the rear end inserted through the second pinion gear 100 and the rear connecting-part support hole 192 and protruding rearward from the rear wall 82. The rear end of the shaft part 128 is inserted into the drive gear 108.

As shown in FIG. 11B, the first coupling part 129 is provided at the front end of the shaft part 128 and corresponds to the first linking part 76 of the first pinion gear 67. That is, the first coupling part 129 is on the front side of the front wall 81.

As shown in FIG. 11C, the second coupling part 130 is provided at a portion of the shaft part 128 approximately one-tenth the front-rear length of the shaft part 128 from the rear end thereof, and corresponds to the second linking part 105 of the second pinion gear 100.

As shown in FIG. 11C, the drive coupling part 131 is provided at the rear end of the shaft part 128 and corresponds to the drive-side linking part 114 of the drive input unit 91. That is, the drive coupling part 131 is on the rear side of the rear wall 82.

Since the diameters of the front connecting-part support hole 191 and the rear connecting-part support hole 192 are greater than the outer diameter of the shaft part 128, the connecting part 117 can slide in the front-rear direction.

Specifically, the connecting part 117 can move between a coupled position (see FIG. 11A) in which the rear end of the shaft part 128 is inserted into the supported part 111 and the drive coupling part 131 is disposed in the rear end portion of the drive-side linking part 114 (see FIG. 11C), and an uncoupled position (see FIG. 12A) in which the rear end of the shaft part 128 is separated from the supported part 111 and the drive coupling part 131 is disposed in the front end portion of the drive-side linking part 114 (see FIG. 12B).

When the connecting part 117 is in the coupled position, as shown in FIG. 11B, the first coupling part 129 is fitted into the first linking part 76 so as to be incapable of rotating relative thereto, and, as shown in FIG. 11C, the second coupling part 130 is fitted into the second linking part 105 so as to be incapable of rotating relative thereto. Hence, when the connecting part 117 is in the coupled position, the first pinion gear 67 and the second pinion gear 100 can rotate together relative to the inner casing 61 through the connecting part 117.

As shown in FIG. 12B, the connecting part spring 132 is formed in the shape of an air-core coil that extends in the front-rear direction. The connecting part spring 132 is accommodated in the supported part 111 and interposed between the rear end of the shaft part 128 and the rear wall of the drive frame 107 opposing the drive gear support hole 110.

With this configuration, the connecting part spring 132 constantly urges the connecting part 117 forward toward the uncoupled position shown in FIG. 12A.

Within the inner casing 61, as shown in FIG. 2, the belt unit 34, the drum unit 15, the four LED units 17, and the four developing units 16 are all accommodated.

The belt unit 34 is disposed in a top portion of the inner casing 61.

3. Detailed Description of Drum Unit

The drum unit 15 is disposed beneath the belt unit 34. The drum unit 15 includes a drum drawer 134.

As will be described later in detail, the drum drawer 134 can slidingly move in the front-rear direction between a drum-mounted position (see FIG. 3) in which the drum drawer 134 is mounted in the main casing 2, and a drum-withdrawn position (see FIG. 8A) in which the drum drawer 134 is withdrawn from the main casing 2.

The drum drawer 134 is a frame-like member that is generally rectangular in a plan view. As shown in FIGS. 1 and 2, the drum drawer 134 includes a pair of drum side walls 135 (see FIG. 2) arranged in confrontation with (parallel to) each other and spaced apart in the front-rear direction; and a pair of drum beams 136 (see FIG. 1) respectively bridging left and right ends of the drum side walls 135.

As shown in FIG. 1, the drum side walls 135 have a generally flat plate shape that is elongated in the left-right direction. The drum side walls 135 are integrally provided with positioned parts 137.

The positioned parts 137 are provided on both the left and right ends of the drum side walls 135. The positioned parts 137 are generally rectangular in a front view and protrude outward in respective left and right directions from an approximate vertical center regions on the left and right ends of the drum side walls 135.

The drum beams 136 are generally rectangular in a side view and are elongated vertically. The drum beams 136 are integrally provided with guided parts 138 (see FIGS. 9A and 10A).

The guided parts 138 are generally rectangular in a side view and are elongated in the left-right direction, as shown in FIG. 9A. The guided parts 138 are formed on respective left and right outer surfaces of the drum beams 136, on lower portions thereof, and protrude outward in respective left and right directions (see FIG. 1).

Four sets of the photosensitive drums 21, the scorotron chargers 22, and the drum cleaning rollers 23 are integrally supported between the pair of drum side walls 135.

As shown in FIG. 2, the photosensitive drums 21 are generally cylindrical in shape and extend in the front-rear direction. The front and rear ends of the photosensitive drums 21 are supported to the respective drum side walls 135 so as to be capable of rotating relative thereto.

4. Detailed Description of LED Units

The four LED units 17 are disposed beneath the drum unit 15 and positioned to a right side of the upper portion of the developing device 24 in the corresponding developing units 16. Accordingly, of the four LED units 17, the three LED units 17 corresponding to the black photosensitive drum 21K, the yellow photosensitive drum 21Y, and the magenta photosensitive drum 21M (hereinafter referred to as the three LED units 17KYM) are disposed between the upper portions of the developing devices 24 in neighboring developing units 16. The left-right dimension of the LED unit 17 is greater than the gap in the left-right direction between the developing-unit frames 25 in neighboring developing units 16 (i.e., between the lower portions of neighboring developing units 16).

Each LED unit 17 includes an LED-unit support member 167, and an LED array 168, as shown in FIG. 2.

Each LED-unit support member 167 is configured of a first frame 170, and a second frame 169.

In the following description of the LED units 17, upward, downward, forward, rearward, leftward, and rightward directions relative to the LED units 17 will assume that the first frames 170 are disposed in an exposure position described later (FIGS. 1, 2, 4, 6, 8B, 9A, 11A, and 14-16).

The first frame 170 is provided at a bottom portion of the LED unit 17. The first frame 170 is generally rectangular in a side view and is elongated in the front-rear direction. Each first frame 170 includes a pair of hook-like parts 174, two compression springs 173, the LED-unit engaging part 175, and the LED-unit supported part 176.

The hook-like parts 174 are provided at a top surface of the first frame 170, with one on each of left and right ends thereof, and are spaced apart in the front-rear direction. The hook-like parts 174 are generally rectangular in a side view and protrude upward from the top surface of the first frame 170. Each hook-like parts 174 has a top end that bends inward in respective front and rear directions.

As shown in FIG. 2, the compression springs 173 are formed in the shape of an air-core coil that extend vertically. The compression springs 173 are disposed at the top surface of the first frame 170 inside the hook-like parts 174 with respect to the front-rear direction. The compression springs 173 have bottom ends that are fixed to the top surface of the first frame 170.

Figure 7A:
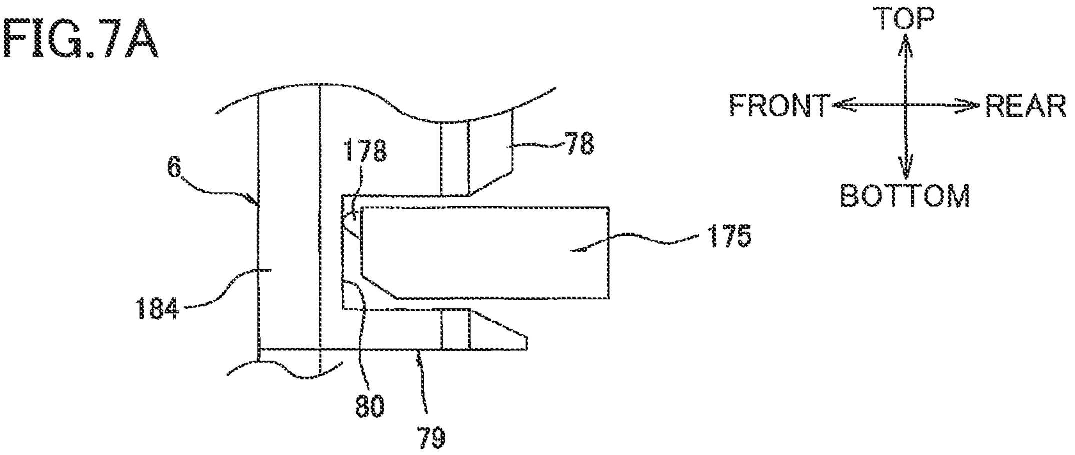
FIG. 7A is a side view illustrating a movement of a guide member shown in FIG. 3 in a state where the guide member is disposed in a non-guiding position.

The LED-unit engaging part 175 is generally columnar-shaped and extends forward from a front endface of the first frame 170. As shown in FIG. 7C, a guide member groove 177 is formed in the LED-unit engaging part 175.

The guide member groove 177 is generally U-shaped in a side view with a front opening and is recessed rearward in a front endface of the LED-unit engaging part 175. The front portion of the guide member groove 177 tapers toward the front.

A guide member 178 is accommodated in the guide member groove 177.

The guide member 178 is generally triangular in a side view, tapering toward a front end thereof. A spring groove 179 is formed in a rear end portion of the guide member 178.

The spring groove 179 is generally U-shaped in a side view with a rear opening and is recessed frontward in a rear endface of the guide member 178.

The guide member 178 is capable of advancing and retracting (moving) between a guiding position (see FIGS. 7B and 7C) advanced forward toward the front cover 6 and a non-guiding position (see FIG. 7A) retracted rearward from the guiding position toward a rear end of the guide member groove 177.

A compression spring 180 is interposed between a rear surface of the spring groove 179 and a front surface of the guide member groove 177. The compression spring 180 constantly urges the guide member 178 forward toward the guiding position.

As shown in FIG. 2, the LED-unit supported part 176 has a flat plate shape that is generally rectangular in a side view and extends rearward from a rear endface of the first frame 170.

The first frame 170 is arranged such that the LED-unit supported part 176 is inserted through the corresponding supported part insertion hole 88 and a rear end of the LED-unit supported part 176 overlaps the LED-unit support part 147 in the left-right direction. A pivot shaft 181 that is generally columnar in shape penetrates the overlapped portion of the LED-unit supported part 176 and the corresponding LED-unit support part 147 in the left-right direction.

With this configuration, the first frame 170 is capable of pivotally moving about the pivot shafts 181. In other words, the rear end of the LED-unit supported part 176 is supported to the main casing 2 so that the first frame 170 can move relative to the main casing 2.

Specifically, when the front cover 6 is in the closed position shown in FIG. 2, each first frame 170 is in the exposure position aligned in the front-rear direction, with the front end of the LED-unit engaging part 175 engaged in the engaging groove 80 of the corresponding cover-side engaging part 79.

When the front cover 6 is in the open position shown in FIG. 3, each first frame 170 is disposed in a retracted position sloping downward toward the front, with the front end of the LED-unit engaging part 175 disengaged from the engaging groove 80 of the corresponding cover-side engaging part 79.

When the first frame 170 of any of the three LED units 17KYM is disposed in the retracted position, as shown in FIGS. 3 and 5, a bottom surface of the front end of the first frame 170 contacts a top edge of a developing-unit front wall 140 constituting the developing-unit frame 25 positioned beneath the first frame 170. Hence, the developing-unit front wall 140 supports the first frame 170 from below.

That is, of the four LED units 17, the first frames 170 of the three LED units 17KYM are supported on the developing units 16 corresponding to the yellow photosensitive drum 21Y, the magenta photosensitive drum 21M, and the cyan photosensitive drum 21C (i.e., the developing units 16 corresponding to the second developing units described above) when the first frames 170 are in the retracted position.

When the first frame 170 of the LED unit 17 corresponding to the cyan photosensitive drum 21C (hereinafter referred to as the cyan LED unit 17C) is in the retracted position, the first frame 170 contacts a bottom edge defining the drum access opening 84 formed in the front wall 81. Hence, the front wall 81 supports the first frame 170 of the cyan LED unit 17C from below.

The second frame 169 is disposed above the first frame 170. The second frame 169 is generally rectangular in a side view and is elongated in the front-rear direction. The second frame 169 has a front-rear dimension shorter than that of the first frame 170.

The second frame 169 is provided with two positioning rollers 171, and two protrusions 172.

The positioning rollers 171 are generally disc-shaped and are rotatably supported on front and rear endfaces of the second frame 169 at an upper portion thereof. The positioning rollers 171 are provided so as to protrude slightly above the LED array 168. With this configuration, the positioning rollers 171 contact the bottom portion of the photosensitive drum 21 on left and right ends thereof, respectively, when the first frame 170 is in the exposure position.

The protrusions 172 are generally rectangular in a side view and protrude outward in respective forward and rearward directions from a lower portion of the front and rear endfaces of the second frame 169.

The second frame 169 is disposed above the first frame 170 such that the protrusions 172 respectively engage with the hook-like parts 174 of the first frame 170.

With this configuration, the compression springs 173 are interposed between the bottom surface of the second frame 169 and the top surface of the first frame 170. Hence, the second frame 169 is movably supported to the first frame 170 while the compression springs 173 are capable of expanding and contracting vertically. The compression springs 173 constantly urge the second frame 169 upward.

The LED array 168 has a generally flat plate shape that is elongated in the left-right direction and is disposed on a top surface of the corresponding second frame 169. The LED array 168 integrally retains multiple LEDs arrayed in the left-right direction for exposing the corresponding photosensitive drum 21. Consequently, the compression springs 173 urge the LED array 168 through the second frame 169 toward the corresponding photosensitive drum 21.

When the first frame 170 is in the exposure position shown in FIG. 2, the LED array 168 is disposed adjacent to the bottom portion of the corresponding photosensitive drum 21, confronting the photosensitive drum 21 from below so as to expose the same to light. When the first frame 170 is in the retracted position shown in FIG. 3, the LED array 168 is retracted below the corresponding photosensitive drum 21 farther than when the first frame 170 is in the exposure position.

5. Detailed Description of Developing Units

In the first embodiment, as shown in FIG. 1, the black developing unit 16K, the yellow developing unit 16Y, the magenta developing unit 16M, and the cyan developing unit 16C are arranged juxtaposed with (parallel to) one another and are spaced at intervals in the left-right direction.

All of the four developing units 16 have the same structure except that the black developing unit 16K retains the waste-toner-accommodating section 31. Therefore, the developing units 16YMC (yellow developing unit 16Y, magenta developing unit 16M, and cyan developing unit 16C) are covered in the following description, while a detailed description of the black developing unit 16K will be omitted.

(1) Developing-Unit Frame

Figure 13A:
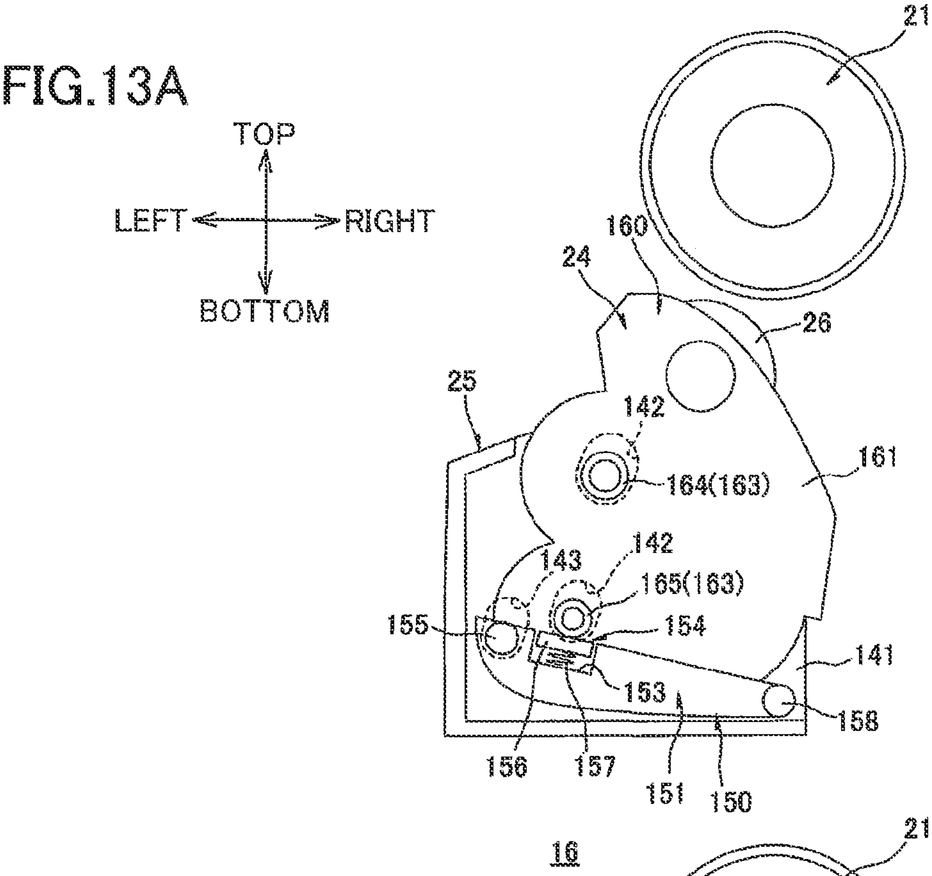
FIG. 13A is a front view of the developing unit shown in FIG. 1 in a state where a developing roller is disposed in a separated position.

As shown in FIG. 13A, the developing-unit frame 25 forms a generally L-shape in a side view. The developing-unit frame 25 is elongated in the front-rear direction. As shown in FIGS. 2 and 5, front and rear ends of the developing-unit frame 25 are respectively closed by the developing-unit front wall 140 and a developing-unit rear wall 141.

In the first embodiment, the developing-unit front wall 140 and the developing-unit rear wall 141 have an identical structure. Therefore, the following description will cover only the developing-unit front wall 140 in detail.

As shown in FIG. 5, the developing-unit front wall 140 has a flat plate shape and is generally rectangular in a front view.

The developing-unit front wall 140 is formed with guide holes 142, and a pivot hole 143.

Two of the guide holes 142 are formed in the developing-unit front wall 140 at positions separated vertically, and specifically at positions corresponding to a large-diameter boss 164 (described later) and a small-diameter boss 165 (described later) of the developing device 24. The guide holes 142 are generally elliptical in a front view and are elongated along a confronting direction X (see FIG. 13B) in which the photosensitive drum 21 and the developing roller 26 confront each other. The guide holes 142 have major axes approximately 1.5 times outer diameters of the large-diameter boss 164 and the small-diameter boss 165, respectively, while having minor axes approximately equal to the outer diameters of the large-diameter boss 164 and the small-diameter boss 165, respectively.

The pivot hole 143 is formed in the developing-unit front wall 140 at a position corresponding to the boss 155 (described later) of a pivoting part 150 (described later). The pivot hole 143 is generally elliptical in a side view and penetrates the developing-unit front wall 140. The elliptical shape of the pivot hole 143 is slightly curved to follow the path of the pivoting part 150 when the pivoting part 150 moves between a developing position (described later) and a non-developing position (described later).

The developing-unit frame 25 includes the pivoting part 150 and the developing device 24.

(2) Pivoting Part

As shown in FIG. 2, the pivoting part 150 includes pivoting-part side walls 151 arranged in confrontation with each other and spaced apart in the front-rear direction, a pivoting-part left wall 152 (see FIG. 1) spanning between left ends of the pivoting-part side walls 151, and a pivoting shaft 158 (see FIG. 13A) spanning between right ends of the pivoting-part side walls 151.

As shown in FIG. 13A, the pivoting-part side walls 151 are generally semicircular in a side view, with a convex side thereof facing downward. An urging-part-accommodating groove 153 is formed in each pivoting-part side wall 151.

The urging-part-accommodating groove 153 is generally U-shaped in a front view with a top opening and is recessed diagonally below and leftward in a top edge of the pivoting-part side wall 151 at a left end portion thereof.

An urging part 154 is accommodated in each urging-part-accommodating groove 153.

The urging part 154 includes a contact part 156, and an urging spring 157.

The contact part 156 is generally rectangular in a front view and is disposed on a top end of the urging part 154.

The urging spring 157 is formed in the shape of an air-core coil that extends diagonally upward and rightward (or diagonally downward and leftward). The urging spring 157 is interposed between a bottom surface of the contact part 156 and a top surface of the urging-part-accommodating groove 153. The urging spring 157 has a top end that is fixed to the bottom surface of the contact part 156, and has a bottom end that is fixed to the top surface of the urging-part-accommodating groove 153.

With this configuration, the urging spring 157 constantly urges the contact part 156 upward (specifically, diagonally upward and rightward).

The boss 155 is provided on an outer surface of each of the pivoting-part side walls 151 (respective front and rear outer surfaces of the pivoting-part side walls 151).

The bosses 155 have a generally columnar shape (see FIG. 2) and protrude outward in respective forward and rearward directions from respective front and rear outer surfaces of the pivoting-part side walls 151 at left ends thereof. The boss 155 has a front-rear dimension greater than a thickness of the developing-unit front wall 140 (the developing-unit rear wall 141).

As shown in FIG. 1, the pivoting-part left wall 152 is generally arcuate-shaped in a front view, with its concave side facing obliquely upward and rightward. The pivoting-part left wall 152 is elongated in the front-rear direction (see FIG. 2).

The pivoting shaft 158 is generally columnar in shape and is elongated in the front-rear direction. The pivoting shaft 158 has a front-rear dimension greater than the gap formed between the pair of pivoting-part side walls 151. Hence, the pivoting shaft 158 is supported between right end portions of the pivoting-part side walls 151 such that both front and rear ends of the pivoting shaft 158 protrude outward from the pivoting-part side walls 151 in respective front and rear directions.

As shown in FIG. 5, the pivoting part 150 is accommodated in the developing-unit frame 25 with the front and rear ends of the pivoting shaft 158 rotatably supported to the developing-unit front wall 140 and the developing-unit rear wall 141 and the bosses 155 inserted through the corresponding pivot holes 143.

Figure 13B:
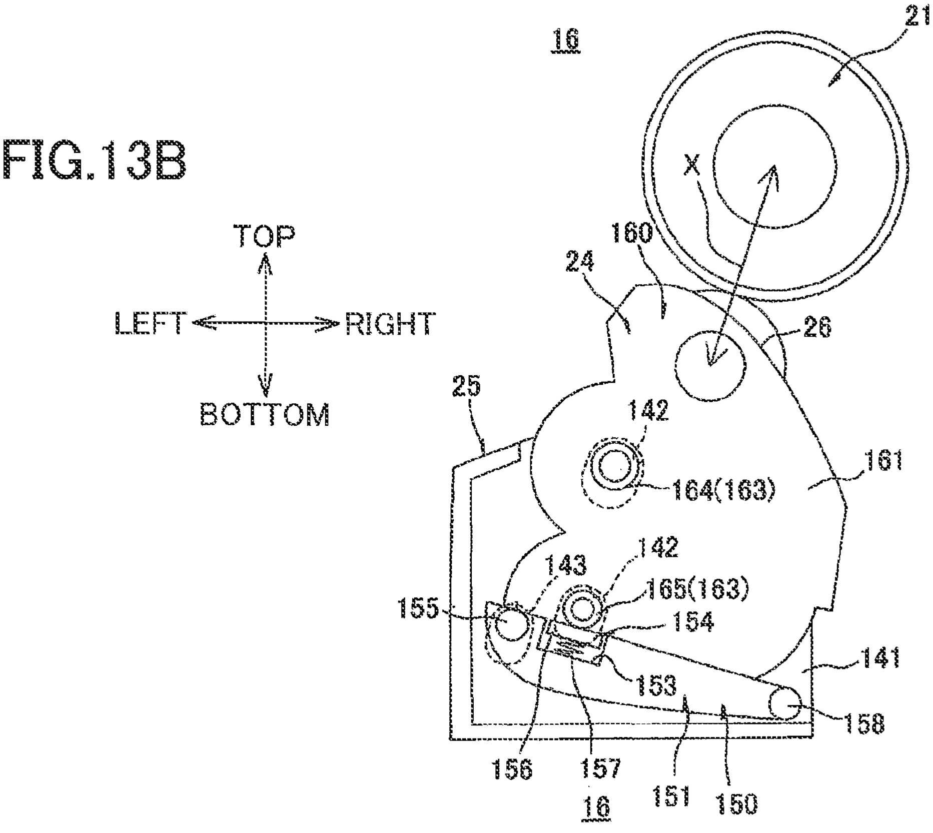
FIG. 13B is a front view of the developing unit shown in FIG. 1 in a state where the developing roller is disposed in an adjacent position.

With this configuration, the pivoting part 150 can pivotally move about the pivoting shaft 158 between the non-developing position shown in FIG. 13A in which the bosses 155 are positioned in bottom ends of the pivot holes 143, and the developing position shown in FIG. 13B in which the bosses 155 are positioned in top ends of the pivot holes 143.

Further, front and rear ends of the bosses 155 protrude farther outward in respective forward and rearward directions from the developing-unit front wall 140 and the developing-unit rear wall 141, respectively.

(3) Developing Device

The developing devices 24 are provided in the corresponding developing-unit frames 25 above the pivoting parts 150. Each developing device 24 includes a developing-device frame 160.

The developing-device frame 160 has a hollow cylindrical shape (see FIG. 1) that is open on top and right sides thereof. The developing-device frame 160 is elongated in the front-rear direction, with its front end closed by a developing-device front wall 161 (see FIG. 13A) and its rear end closed by a developing-device rear wall 162 (see FIG. 1).

In this embodiment, the structure of the developing-device front wall 161 and the developing-device rear wall 162 is identical. Therefore, the following description can be applied to both the developing-device front wall 161 and the developing-device rear wall 162, although only the developing-device front wall 161 will be described.

As shown in FIG. 13A, the developing-device front wall 161 has a front surface on which guided parts 163 are provided. The guided parts 163 include the large-diameter boss 164 and the small-diameter boss 165.

The large-diameter boss 164 is provided in an upper left portion of the front surface of the developing-device front wall 161. The large-diameter boss 164 is generally cylindrical in shape and protrudes forward from the developing-device front wall 161.

The small-diameter boss 165 is disposed below the large-diameter boss 164 and is spaced apart from the large-diameter boss 164 vertically. The small-diameter boss 165 is generally cylindrical in shape and protrudes forward from the developing-device front wall 161.

The developing-device front wall 161 and the developing-device rear wall 162 rotatably support the developing roller 26 described earlier at a position between top end portions of the developing-device front wall 161 and the developing-device rear wall 162 so that the developing roller 26 is exposed on the upper right side, and also support the toner-accommodating section 29 described earlier at a position between bottom end portions of the developing-device front wall 161 and the developing-device rear wall 162, as shown in FIG. 1.

As shown in FIG. 13A, the developing device 24 is accommodated in the developing-unit frame 25 such that the large-diameter boss 164 and the small-diameter boss 165 are inserted through the corresponding guide holes 142 from the inside thereof, and the bottom end of the toner-accommodating section 29 is disposed between the pair of pivoting-part side walls 151.

With this configuration, the small-diameter boss 165 of the developing device 24 contacts a top surface of the contact part 156 of the urging part 154 from above.

Hence, when the pivoting part 150 is in the developing position shown in FIG. 13B, the contact part 156 presses the small-diameter boss 165 obliquely upward and rightward, and the large-diameter boss 164 and the small-diameter boss 165 are disposed in the top ends of their respective guide holes 142.

Consequently, the developing roller 26 of the developing device 24 is disposed in an adjacent position adjacent to or in contact with the corresponding photosensitive drum 21, as shown in FIG. 16. In the first embodiment, the developing roller 26 is in contact with the corresponding photosensitive drum 21 when disposed in the adjacent position.

When the pivoting part 150 is in the non-developing position shown in FIG. 13A, the large-diameter boss 164 and the small-diameter boss 165 are disposed in the bottom ends of their respective guide holes 142.

Consequently, the developing roller 26 of the developing device 24 is in a separated position spaced apart from the corresponding photosensitive drum 21, as shown in FIG. 14.

Hence, the developing roller 26 can be moved between the adjacent position and the separated position in association with movement of the pivoting part 150 between the developing position and the non-developing position.

6. Operations for Mounting and Removing Drum Unit Relative to Main Casing

Next, operations for mounting the drum unit 15 in and removing the drum unit 15 from the main casing 2 will be described.

(1) Operation for Mounting the Drum Unit in the Main Casing

In order to mount the drum unit 15 in the main casing 2, initially the front cover 6 is placed in the open position shown in FIG. 3, revealing the first opening 8 and the second opening 83.

At this time, the front ends of the LED-unit engaging parts 175 of the LED units 17 are disengaged from the engaging grooves 80 formed in the cover-side engaging parts 79 of the front cover 6, and the first frames 170 are disposed in their retracted position.

Figure 7B:
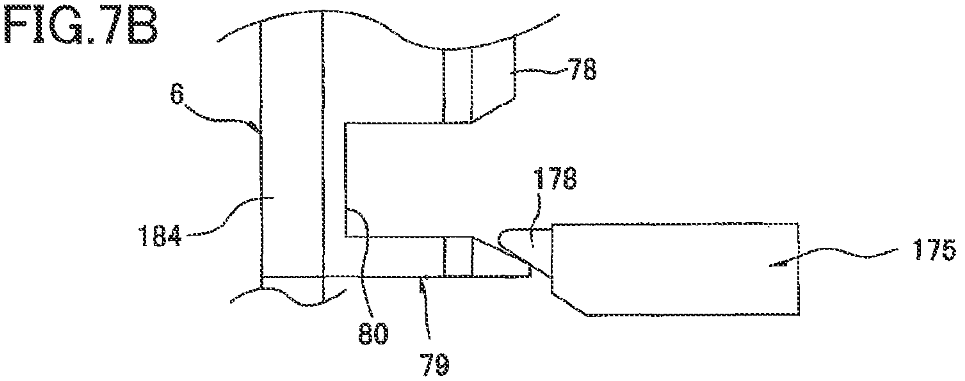
FIG. 7B is a side view illustrating the movement of the guide member shown in FIG. 3 in a state where the guide member is disposed in a guiding position.
Figure 7C:
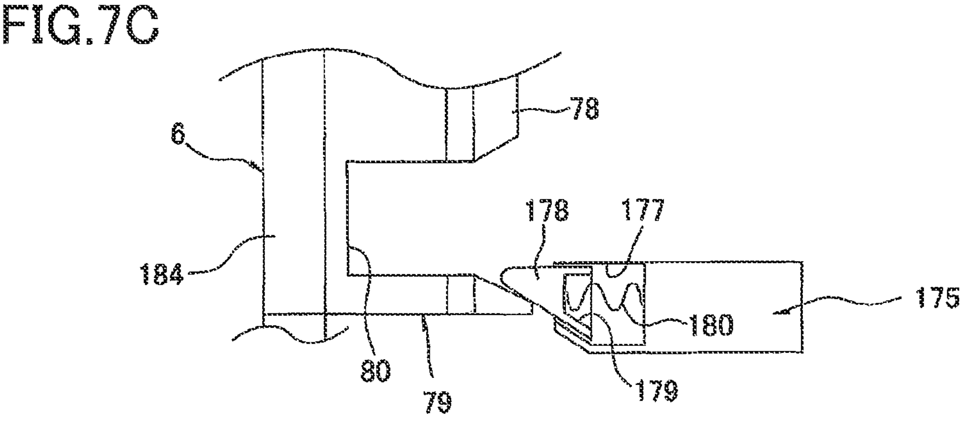
FIG. 7C is a side cross-sectional view illustrating the movement of the guide member shown in FIG. 3 in a state where the guide member is disposed in the guiding position.

The guide members 178 are also disposed in their guiding position shown in FIG. 7B.

Further, the pivot parts 94 of the guide parts 93 are disposed in the withdrawal-restricted position supported from below by the restricting member 77 of the front cover 6, as shown in FIG. 3.

Accordingly, the upper portions of the pivot parts 94 are positioned higher than the bottom walls of the guide parts 93, restricting the developing units 16 from being withdrawn from the main casing 2 (unit-accommodating space 198).

In addition, the sliding member 120 is disposed in the protruding position shown in FIG. 10A, and the moving member 121 is in the release position.

Further, the connecting part 117 is disposed in the uncoupled position, as shown in FIG. 12A.

Next, the drum unit 15 is inserted into the main casing 2 (unit-accommodating space 198) through the first opening 8 and the drum access opening 84 (see FIG. 5) so that the guided parts 138 of the drum drawer 134 are inserted into the corresponding drum-guiding grooves 126 formed in the corresponding moving members 121 from front, as shown in FIG. 10A.

Since the moving members 121 are in the release position at this time, the top portions of the photosensitive drums 21 of the drum unit 15 confront the bottom portion of the intermediate transfer belt 38, but are vertically spaced apart therefrom.

As the drum unit 15 (drum drawer 134) is moved rearward, the drum drawer 134 moves horizontally (along the front-rear direction) rearward as the guided parts 138 are guided in the drum-guiding grooves 126 until the drum drawer 134 is accommodated (mounted) within the inner casing 61.

Through this operation, the drum drawer 134 is placed in the drum-mounted position within the inner casing 61.

Next, the front cover 6 is returned from its open position to the closed position shown in FIG. 9A.

Through this operation, the rear surface of the front cover 6 contacts the front ends of the sliding members 120, moving the sliding members 120 from the protruding position to the contacting position against the urging force of the pressing springs 122.

As the sliding members 120 move from the protruding position to the contacting position, the pressing cam parts 124 of the sliding members 120 press the moving members 121 upward, moving the moving members 121 from the release position to the pressing position.

Since the guided parts 138 of the drum drawer 134 are disposed in the drum-guiding grooves 126 formed in the moving members 121, the drum unit 15 also moves upward in association with the upward movement of the moving members 121.

Consequently, the positioned parts 137 of the drum side walls 135 contact (engage) the front and rear ends of the corresponding positioning shafts 115 from below.

That is, the positioned parts 137 provided on the left and right ends of the front drum side wall 135 and the positioned parts 137 provided on the left and right ends of the rear drum side wall 135 are pressed upward by the pressing units 116 when the drum unit 15 is accommodated (mounted) in the inner casing 61 and contact (engage) the respective front and rear ends of the corresponding positioning shafts 115.

In this way, the drum unit 15 is subjected to positioning relative to the inner casing 61 by positioning each end (four corners in a plan view) of the drum drawer 134 on the front and rear ends of the corresponding positioning shafts 115.

At this time, the top portions of the photosensitive drums 21 vertically confront and contact the lower portion of the intermediate transfer belt 38.

As a result, the operation for mounting the drum unit 15 in the main casing 2 (unit-accommodating space 198) is complete.

When the front cover 6 is in the closed position, the pivot parts 94 of the guide parts 93 are no longer in contact with the restricting member 77 and are placed in the withdrawal-allowed position.

When the front cover 6 is moved from the open position toward the closed position, the lower edges of the engaging grooves 80 formed in the cover-side engaging parts 79 contact the front ends of the guide members 178 from below, as shown in FIG. 7B. This contact guides the movement of the cover-side engaging parts 79 so that the front ends of the LED-unit engaging parts 175 are fitted into (becomes engaged with) the engaging grooves 80 formed in the cover-side engaging parts 79.

When the front cover 6 reaches the closed position, the front ends of the LED-unit engaging parts 175 are fitted into the engaging grooves 80 of the cover-side engaging parts 79, as shown in FIG. 7A.

At this time, the front ends of the guide members 178 contact the front surfaces of the engaging grooves 80, moving the guide members 178 from the guiding position to the non-guiding position against the urging force of the compression springs 180 (see FIG. 7C).

Hence, the first frames 170 of the LED-unit support members 167 are disposed in their exposure position shown in FIG. 2 by fitting the front ends of the LED-unit engaging parts 175 into the engaging grooves 80 formed in the corresponding cover-side engaging parts 79.

In other words, the first frames 170 move from their retracted position to their exposure position as the front cover 6 moves from the open position to the closed position. Hence, the cover-side engaging parts 79 engage the front ends of the corresponding LED-unit engaging parts 175 when the front cover 6 is placed in the closed position, thereby placing the first frames 170 in the exposure position.

With respect to the connecting part 117 shown in FIGS. 11A through 11C, when the front cover 6 moves from the open position to the closed position, the first coupling part 129 is fitted (coupled) with the first linking part 76 of the first pinion gear 67 so as to be incapable of rotating relative thereto, and the rear surface of the first linking part 76 contacts and pushes the front end of the shaft part 128. Accordingly, the connecting part 117 moves from the uncoupled position to the coupled position against the urging force of the connecting part spring 132.

Consequently, the second coupling part 130 of the connecting part 117 is fitted (coupled) with the second linking part 105 of the second pinion gear 100 so as to be incapable of rotating relative thereto, as shown in FIG. 11C.

In this way, the front end of the connecting part 117 is coupled to the first cam member 66 through the first pinion gear 67 (see FIG. 11B), and the rear end of the connecting part 117 is coupled to the second cam member 98 through the second pinion gear 100 (see FIG. 11C).

(2) Operation for Removing the Drum Unit from the Main Casing

To remove the drum unit 15 from the main casing 2, the steps in the operation for mounting the drum unit 15 described above are performed in reverse.

Specifically, the front cover 6 is moved from the closed position to the open position, as shown in FIGS. 10A and 10B, revealing the first opening 8 and the second opening 83.

This operation removes the contact between the rear surface of the front cover 6 and the front ends of the sliding members 120, allowing the sliding members 120 to move from the contacting position to the protruding position shown in FIG. 10A.

The moving members 121 move from the pressing position to the release position in association with the movement of the sliding members 120 described above, and the drum unit 15 moves downward together with the movement of the moving members 121.

As a result, the top portions of the photosensitive drums 21 are separated vertically from the lower portion of the intermediate transfer belt 38.

Also, as the front cover 6 moves from the closed position to the open position, the restricting member 77 contacts the pivot parts 94 of the guide parts 93, moving the pivot parts 94 from the withdrawal-allowed position (see FIG. 9A) to the withdrawal-restricted position (see FIG. 10A).

Also as the front cover 6 moves from the closed position to the open position, the front ends of the LED-unit engaging parts 175 are extracted from the corresponding engaging grooves 80 formed in the cover-side engaging parts 79, allowing the first frames 170 to move from the exposure position to the retracted position shown in FIG. 3.

Consequently, the LED arrays 168 are retracted downward from the corresponding photosensitive drums 21.

At this time, the first frames 170 of the three LED units 17KYM are supported on the developing units 16 in their retracted positions, with the bottom surfaces of their front ends contacting the top edges of the developing-unit front walls 140 of developing units 16 corresponding to the second developing units.

That is, when the front cover 6 is in the open position, the three LED units 17KYM are supported in their retracted position by the developing units 16 corresponding to the second developing units.

The first frame 170 of the cyan LED unit 17C corresponding to the cyan photosensitive drum 21C, on the other hand, is supported in its retracted position on the front wall 81 when the front cover 6 is in the open position, with the bottom surface of its front end contacting the bottom edge defining the drum access opening 84.

As shown in FIG. 12A, contact between the front end of the shaft part 128 and the rear surface of the first linking part 76 is removed as the front cover 6 moves from the closed position to the open position. Accordingly, the urging force of the connecting part spring 132 moves the connecting part 117 from the coupled position to the uncoupled position.

This movement of the connecting part 117 removes the fitting (coupling) between the first linking part 76 and the first coupling part 129 and the fitting (coupling) between the second linking part 105 and the second coupling part 130. In other words, as the front cover 6 moves from the closed position to the open position, the coupling between the connecting part 117 and the first cam member 66 via the first pinion gear 67 is removed, and the coupling between the connecting part 117 and the second cam member 98 via the second pinion gear 100 is removed.

Consequently, the urging force of the first spring member 68 urges the first cam member 66 leftward toward the fully separated position (see FIG. 14). Further, the urging force of the second spring member 99 urges the second cam member 98 leftward toward the fully separated position (see FIG. 6). Hence, the first cam member 66 and the second cam member 98 are both disposed in the fully separated position when the front cover 6 is in the open position.

Figure 8A:
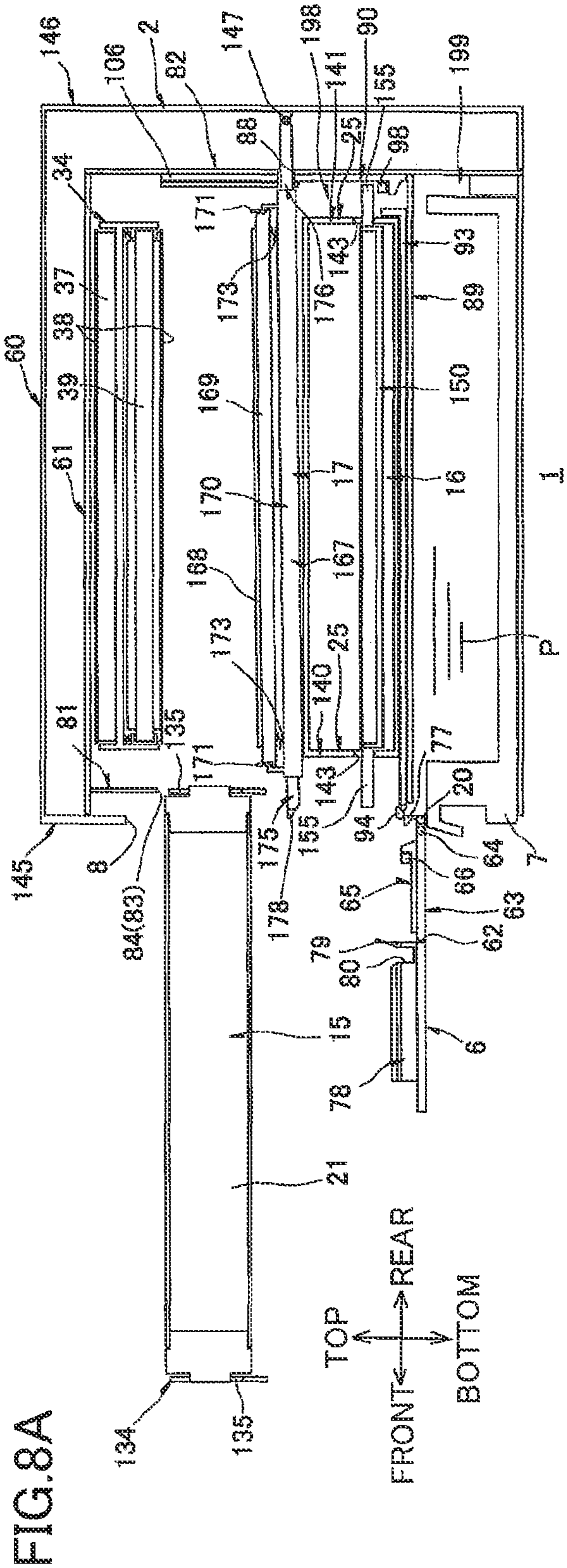
FIG. 8A is a side cross-sectional view illustrating how a drum unit shown in FIG. 1 is mounted in and removed from a main casing.

Next, as show in FIG. 8A, the drum unit 15 (drum drawer 134) is pulled horizontally (along the front-rear direction) forward from the main casing 2 through the first opening 8 and the drum access opening 84 of the second opening 83 (see FIG. 5). Through this operation, the photosensitive drums 21 supported in the drum drawer 134 are pulled horizontally (along the front-rear direction) forward out of the main casing 2 through the first opening 8 and the drum access opening 84 formed in the second opening 83.

At this point, the drum drawer 134 is disposed in the drum-withdrawn position where the drum drawer 134 has been pulled out of the main casing 2, and the operation to withdraw the drum unit 15 from the main casing 2 is complete.

7. Operations for Mounting and Removing Developing Units Relative to Main Casing Next, operations for mounting the developing units 16 into and removing the developing units 16 from the main casing 2 will be described.

Figure 8B:
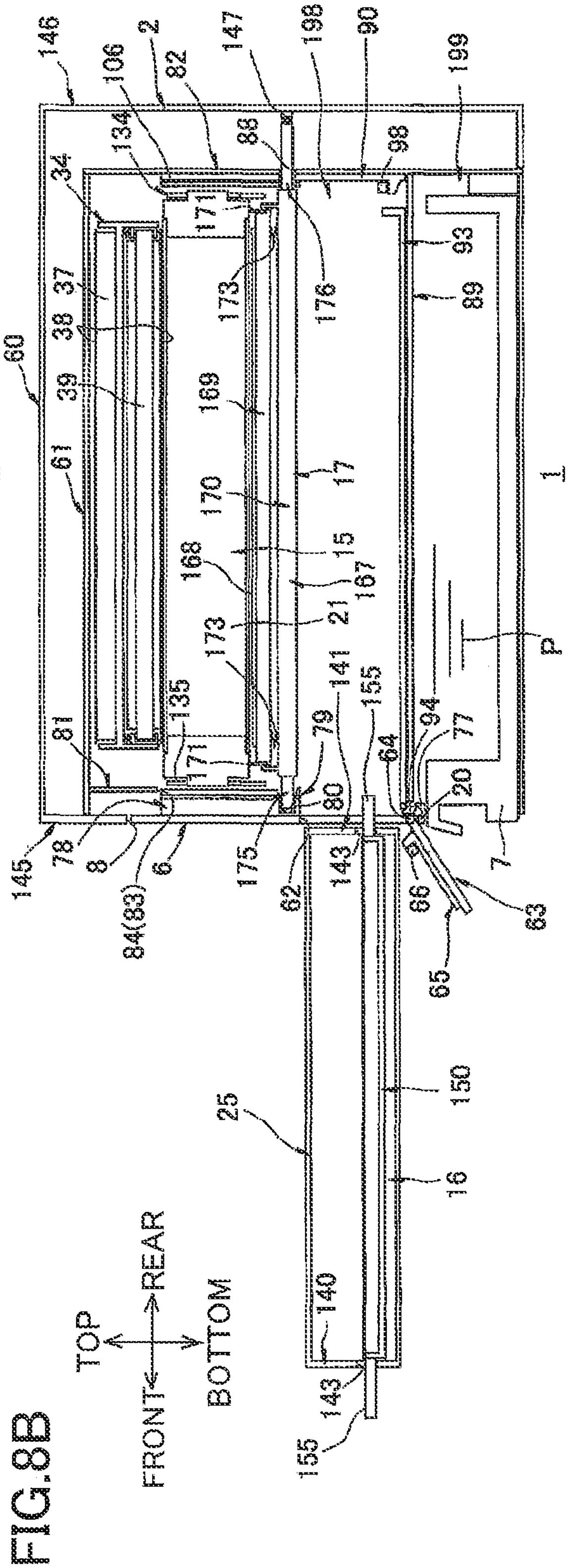
FIG. 8B is a side cross-sectional view illustrating how the developing unit shown in FIG. 1 is mounted in and removed from the main casing.

In order to mount the developing unit 16 into the main casing 2, initially, the developing-unit cover 63 is placed into the developing-unit-cover open position shown in FIG. 8B, revealing the developing-unit opening 62 (first opening 8) and the developing-unit access opening 85 of the second opening 83.

At this time, the first frames 170 of the LED units 17 are in the exposure position since the front ends of the LED-unit engaging parts 175 remain fitted into the engaging grooves 80 of the corresponding cover-side engaging parts 79.

Further, the pivot parts 94 of the guide parts 93 are disposed in the withdrawal-allowed position.

Next, the developing unit 16 is inserted into the developing-unit opening 62 and the developing-unit access opening 85 from the front side thereof so that the bottom portion of the developing-unit frame 25 is inserted into the guide part 93 from front, and pushes the developing unit 16 into the unit-accommodating space 198.

Through this operation, the bottom portion of the developing-unit frame 25 provided with the developing unit 16 is inserted into the front end of the guide part 93 and the guide part 93 guides the developing unit 16 as the developing unit 16 moves rearward into the developing-unit mounted position.

This completes the operation for mounting the developing unit 16 in the main casing 2 (unit-accommodating space 198).

In order to remove a developing unit 16 from the main casing 2 (unit-accommodating space 198), the steps in the operation for mounting the developing unit 16 are performed in reverse.

By performing the steps in reverse, the developing unit 16 is pulled forward from the unit-accommodating space 198. The guide part 93 guides the developing unit 16 in its forward movement as the developing unit 16 is pulled out of the unit-accommodating space 198 through the developing-unit opening 62 (first opening 8) and the developing-unit access opening 85 to the position shown in FIG. 8B.

Pulling the developing unit 16 out of the main casing 2 (unit-accommodating space 198) in this way places the developing unit 16 in the developing-unit withdrawn position.

8. Operations for Establishing Contact or Separation Between Developing Rollers and Photosensitive Drums Next, operations for separating the developing rollers 26 from the photosensitive drums 21 and bringing the developing rollers 26 into contact with the photosensitive drums 21 will be described.

The operating mode of the color printer 1 can be switched between a monochromatic mode for forming images in black only, and a color mode for forming color images.

In the monochromatic mode, the developing roller 26 of the black developing unit 16K is disposed in the adjacent position shown in FIG. 15 for contacting the black photosensitive drum 21K.

However, the developing rollers 26 in the non-black developing units 16 (the three color developing units 16YMC) are disposed in their respective separated position in which they are spaced apart from the corresponding photosensitive drums 21 (yellow photosensitive drum 21Y, magenta photosensitive drum 21M, and cyan photosensitive drum 21C).

In the color mode, the developing rollers 26 in all developing units 16 are disposed in the adjacent position, as shown in FIG. 16.

All developing rollers 26 are normally disposed in the separated position shown in FIG. 14 with the pivoting parts 150 being constantly urged toward the non-developing position shown in FIG. 13A.

Hence, in order to place the developing rollers 26 in their respective adjacent position contacting the corresponding photosensitive drums 21 (see FIG. 13B) when performing an image-forming operation, the first cam member 66 and the second cam member 98 are disposed in the single-color operating position or the multi-color operating position shown in FIGS. 15 and 16, respectively, and the corresponding pivoting parts 150 are disposed in the developing position.

In order to place the first cam member 66 and the second cam member 98 in the single-color operating position or the multi-color operating position, a drive source such as a motor (not shown) provided in the main casing 2 inputs a drive force into the input gear part 112 of the drive gear 108 shown in FIG. 11A.

This drive force is transmitted through the connecting part 117 to the first pinion gear 67 and the second pinion gear 100.

When driven by this force, the first pinion gear 67 and the second pinion gear 100 rotate together in the rotational direction A indicated by an arrow in FIGS. 6 and 14 (counterclockwise direction in a front view).

As will be described later in detail, this operation serves to move the first cam member 66 (FIG. 14) and the second cam member 98 (FIG. 6) rightward from the fully separated position into the desired single-color operating position or multi-color operating position.

Since the movement of the first cam member 66 and the second cam member 98 is similar and associated, only the movement of the first spring member 68 will be described in detail below. Here, the second cam part 102 of the second cam member 98 corresponds to the first cam part 73 of the first cam member 66.

(1) Fully Separated Position

When the first cam member 66 is in the fully separated position, the four first cam parts 73 are arranged at intervals in the left-right direction and are positioned leftward of the corresponding bosses 155.

In other words, the bosses 155 are not operated by the corresponding first cam parts 73 when the first cam member 66 is in the fully separated position. Similarly, the bosses 155 are not operated by the corresponding second cam parts 102 when the second cam member 98 is in the fully separated position.

Accordingly, all pivoting parts 150 are disposed in the non-developing position shown in FIG. 13A and all developing rollers 26 are disposed in the separated position. Hence, the developing rollers 26 are in their separated position when the first cam member 66 and the second cam member 98 are in the fully separated position.

(2) Single-Color Operating Position

When the drive force is transmitted to the first cam member 66 through the first pinion gear 67 and the connecting part 117, the first cam member 66 moves rightward from the fully separated position.

Consequently, the black first cam part 73K positioned farthest leftward among the four first cam parts 73 approaches the boss 155 of the black developing unit 16K, moving beneath the boss 155.

Accordingly, the sloped right edge of the black first cam part 73K pushes the boss 155 of the black developing unit 16K upward, moving the boss 155 from the bottom end of the pivot hole 143 to the top end thereof.

When the first cam member 66 arrives at the single-color operating position, the front end of the boss 155 of the black developing unit 16K (the outer end in the front-rear direction) is positioned on the right end portion of the top surface of the black first cam part 73K.

At this time, the pivoting part 150 of the black developing unit 16K is disposed in the developing position shown in FIG. 13B since the black first cam part 73K and the black second cam part 102K have placed the corresponding front and rear bosses 155 in the top ends of the corresponding pivot holes 143.

Accordingly, only the developing roller 26 of the black developing unit 16K is disposed in the adjacent position, setting the color printer 1 in the monochromatic mode.

(3) Multi-Color Operating Position

If the drive force is further transmitted to the first cam member 66 to move the first cam member 66 further rightward from the single-color operating position, the other first cam parts 73Y, 73M, and 73C approach the bosses 155 of the corresponding three color developing units 16YMC, moving beneath the bosses 155.

Consequently, the sloped right edges of the corresponding first cam parts 73Y, 73M, and 73C push the bosses 155 of the three color developing units 16YMC upward, moving the bosses 155 from the bottom ends of the corresponding pivot holes 143 to the top ends thereof, as shown in FIG. 16.

When the first cam member 66 arrives at the multi-color operating position, the front ends of the bosses 155 of the three color developing units 16YMC (the outer ends in the front-rear direction) are disposed on the top surfaces of the first cam parts 73Y, 73M, and 73C, while the front end of the boss 155 of the black developing unit 16K (the outer end in the front-rear direction) is positioned on the left end portion of the top surface of the black first cam part 73K.

Accordingly, as shown in FIG. 13B, all pivoting parts 150 are disposed in their developing position, and all developing rollers 26 are disposed in their adjacent position, thereby setting the color printer 1 in the color mode.

Hence, when the first cam member 66 and the second cam member 98 move from the fully separated position to the multi-color operating position (or the single-color operating position), the first cam parts 73 and the second cam parts 102 guide the developing rollers 26 to move from the separated position toward their adjacent position. When the first cam member 66 and the second cam member 98 are disposed in the multi-color operating position (or the single-color operating position), the first cam parts 73 and the second cam parts 102 serve to support the corresponding bosses 155 from the bottom thereof.

As described above, the operating mode of the color printer 1 can be selectively switched between the monochromatic mode and the color mode.

9. Operational Advantages (1) As shown in FIG. 8B, the color printer 1 includes the first cam member 66 provided at the developing-unit cover 63 of the front cover 6. Movement of the first cam member 66 when the developing-unit cover 63 is in the developing-unit-cover closed position can move the developing rollers 26 between their adjacent position and separated position. The first cam member 66 also moves in association with the developing-unit cover 63 when the developing-unit cover 63 is moved from the developing-unit-cover closed position to the developing-unit-cover open position in order to allow the developing unit 16 to be pulled out of the main casing 2 along the front-rear direction (axial direction of the photosensitive drums 21).

Hence, by placing the developing-unit cover 63 in the developing-unit-cover open position, the first cam member 66 can be retracted from the path along which the developing unit 16 is pulled from the main casing 2.

Consequently, this configuration prevents the first cam member 66 from interfering with the developing unit 16 when the developing unit 16 is pulled out of the main casing 2 in the front-rear direction.

Thus, with this construction, the developing rollers 26 can be brought adjacent to and separated from the corresponding photosensitive drums 21, while the developing unit 16 can be pulled out of the main casing 2 along the axial direction of the photosensitive drums 21.

(2) As shown in FIGS. 14 through 16, the first cam member 66 is provided with the first cam parts 73. The first cam member 66 is configured to slidingly move between the multi-color operating position in which all developing rollers 26 are disposed in the adjacent position, the single-color operating position in which only the developing roller 26 of the black developing unit 16K is disposed in the adjacent position, and the fully separated position in which all developing rollers 26 are disposed in their separated position.

Each of the developing units 16 has the front boss 155. The front boss 155 of the black developing unit 16K is contacted (operated) by the first cam part 73 when the first cam member 66 is in the single-color operating position shown in FIG. 15, and the front bosses 155 of all developing units 16 are contacted (operated) by the corresponding first cam parts 73 when the first cam member 66 is in the multi-color operating position shown in FIG. 16. Contact between the first cam parts 73 and the front bosses 155 is removed when the first cam member 66 is in the fully separated position shown in FIG. 14.

Accordingly, the developing units 16 can be reliably operated through the first cam parts 73 and the bosses 155 by the sliding movement of the first cam member 66.

Therefore, the developing rollers 26 can be moved reliably between their adjacent position and separated position simply by the sliding movement of the first cam member 66.

Further, the developing rollers 26 are disposed in their separated position, as shown in FIG. 14, when the first cam member 66 is placed in the fully separated position, i.e., when the contact between the first cam parts 73 and the respective front bosses 155 is removed.

Hence, when the developing-unit cover 63 is moved from the developing-unit-cover closed position shown in FIG. 2 to the developing-unit-cover open position shown in FIG. 8B, the first cam member 66 moves together with the developing-unit cover 63. Since the first cam member 66 is moved to retract from the developing units 16, as shown in FIG. 8B, the contact between the first cam parts 73 (see FIG. 16) and the respective front bosses 155 is removed.

Accordingly, when the developing-unit cover 63 is placed in the developing-unit-cover open position, the developing rollers 26 are moved apart from the corresponding photosensitive drums 21 into their separated position, as shown in FIG. 5.

This construction can restrain any sliding between the developing rollers 26 and the photosensitive drums 21 when the developing units 16 are withdrawn from the main casing 2 simply by placing the developing-unit cover 63 in the developing-unit-cover open position shown in FIG. 8B.

(3) The color printer 1 also includes the connecting part 117 as shown in FIG. 11A. The connecting part 117 couples with the first cam member 66 when the front cover 6 is in the closed position to transmit the drive force to the first cam member 66. As shown in FIG. 12A, the connecting part 117 uncouples from the first cam member 66 as the front cover 6 moves from the closed position to the open position.

Hence, the drive force can be transmitted to the first cam member 66 when the front cover 6 is in the closed position, as shown in FIG. 11A. However, when the front cover 6 is moved from the closed position to the open position (when the developing-unit cover 63 is moved from the developing-unit-cover closed position to the developing-unit-cover open position), the first cam member 66 is uncoupled from the connecting part 117.

As a result, this construction enables the drive force to be transmitted to the first cam member 66, while ensuring smooth operations for opening and closing the front cover 6 (developing-unit cover 63).

(4) As shown in FIG. 14, the color printer 1 is also provided with the first spring member 68 for urging the first cam member 66 from the single-color operating position (or the multi-color operating position) toward the fully separated position. Hence, the first cam member 66 is normally disposed in the fully separated position.

As a result, when the first cam member 66 is in the single-color operating position shown in FIG. 15 (or the multi-color operating position shown in FIG. 16), this configuration prevents the first cam parts 73 from interfering with the front bosses 155 (prevents the front bosses 155 from colliding with the first cam parts 73), even when the front cover 6 (developing-unit cover 63) is moved to the open position (developing-unit-cover open position), as shown in FIGS. 8A and 8B, and subsequently moved back to the closed position (developing-unit-cover closed position).

(5) As shown in FIG. 6, the color printer 1 also includes the second cam member 98 that is configured to move along the left-right direction relative to the main casing 2 in the rear end portion of the main casing 2.

Together with the first cam member 66 (in association with the movement of the first cam member 66), the second cam member 98 moves the developing rollers 26 between the adjacent position and the separated position.

Therefore, the first cam member 66 and the second cam member 98 are respectively provided on the front and rear sides of the developing units 16.

With this construction, the second cam member 98 and the first cam member 66 work in association on both the front and rear sides of the developing units 16 to move the developing rollers 26 between their adjacent position and separated position. As a result, the second cam member 98 and the first cam member 66 can ensure the smooth motion of the developing rollers 26 while maintaining the developing rollers 26 level without any torsion.

Hence, this construction ensures smooth operations for bringing the developing rollers 26 in contact with (adjacent to) the photosensitive drums 21 and separating the developing rollers 26 from the photosensitive drums 21, while improving precision in positioning the developing rollers 26 relative to the photosensitive drums 21 when the developing rollers 26 are in their adjacent position.

(6) As shown in FIG. 6, the second cam member 98 is also provided with the second cam parts 102. The second cam member 98 is configured to slidingly move between the multi-color operating position in which all developing rollers 26 are disposed in their adjacent position, the single-color operating position in which only the developing roller 26 of the black developing unit 16K is disposed in the adjacent position, and the fully separated position in which all developing rollers 26 are disposed in their separated position.

Each of the developing units 16 has the rear boss 155. The rear boss 155 of the black developing unit 16K is contacted (operated) by the second cam part 102 when the second cam member 98 is in the single-color operating position shown in FIG. 15, and the rear bosses 155 of all developing units 16 are contacted by the corresponding second cam parts 102 when the second cam member 98 is in the multi-color operating position shown in FIG. 16. Contact between the second cam parts 102 and the rear bosses 155 is removed when the second cam member 98 is in the fully separated position shown in FIG. 14.

Accordingly, the developing units 16 can be reliably operated through the second cam parts 102 and the bosses 155 by the sliding movement of the second cam member 98.

Therefore, the developing rollers 26 can be moved reliably between their adjacent position and separated position simply by the sliding movement of the second cam member 98.

(7) As shown in FIG. 6, the color printer 1 is also provided with the second pinion gear 100.

When the front cover 6 is in the closed position (when the developing-unit cover 63 is in the developing-unit-cover closed position), the first cam member 66 and the second cam member 98 are coupled through the connecting part 117 and the second pinion gear 100 as shown in FIG. 11A, so that the drive force can be transmitted thereto. Accordingly, the first cam member 66 and the second cam member 98 can be driven by the common drive force when the front cover 6 is in the closed position (when the developing-unit cover 63 is in the developing-unit-cover closed position).

On the other hand, when the front cover 6 is in the open position (when the developing-unit cover 63 is in the developing-unit-cover open position), the connecting part 117 is uncoupled from the first cam member 66 and from the second pinion gear 100, as shown in FIG. 12A. Hence, the drive force is not transmitted to the first cam member 66 or to the second cam member 98 while the front cover 6 is in the open position (while the developing-unit cover 63 is in the developing-unit-cover open position).

With this construction, the first cam member 66 and the second cam member 98 are driven by the common drive force when the front cover 6 is in the closed position (when the developing-unit cover 63 is in the developing-unit-cover closed position), as shown in FIG. 11A, and do not receive transmission of the drive force while the front cover 6 is in the open position (while the developing-unit cover 63 is in the developing-unit-cover open position), as shown in FIG. 12A. Accordingly, this configuration ensures that the phases of the first cam member 66 and the second cam member 98 are in agreement.

As a result, the developing rollers 26 can be reliably maintained level while being moved between the adjacent position and the separated position, without any torsion.

Therefore, this construction ensures smooth operations for bringing the developing rollers 26 in contact with (adjacent to) the photosensitive drums 21 and separating the developing rollers 26 from the photosensitive drums 21, while improving precision in positioning the developing rollers 26 relative to the photosensitive drums 21 when the developing rollers 26 are in their adjacent position.

(8) As shown in FIG. 6, the color printer 1 is also provided with the second spring member 99 for urging the second cam member 98 from the single-color operating position (or the multi-color operating position) toward the fully separated position. Hence, the second cam member 98 is normally disposed in the fully separated position when the front cover 6 is in the open position.

Since the first cam member 66 is also disposed in the fully separated position by the first spring member 68 when the front cover 6 is in the open position (when the developing-unit cover 63 is in the developing-unit-cover open position), the operations of the first cam member 66 (first cam parts 73) and the second cam member 98 (second cam parts 102) can be synchronized around the opening and closing of the front cover 6 (developing-unit cover 63). This configuration also prevents interference between the bosses 155 of the developing units 16 and the second cam parts 102 of the second cam member 98 when the developing units 16 are mounted in the main casing 2.

(9) In the color printer 1 described above, the first frames 170 of the LED units 17 are supported in their retracted position on the developing units 16 corresponding to the second developing units when the front cover 6 is in the open position, as shown in FIG. 3. Accordingly, the photosensitive drums 21 can be pulled out of the main casing 2 along the front-rear direction (axial direction of the photosensitive drums 21).

Further, it is not necessary to provide support members between neighboring developing units 16 for supporting the first frames 170 of the LED units 17. It is also unnecessary to provide a retracting mechanism in the main casing 2 for retracting the first frames 170 of the LED units 17.

As a result of reducing the number of parts and components, the color printer 1 can be designed to be more compact.

Hence, this configuration ensures an efficient arrangement of the LED units 17 and allows for the design of a more compact color printer 1, while enabling the photosensitive drums 21 to be pulled out of the main casing 2 along the front-rear direction.

(10) As shown in FIG. 1, the color printer 1 includes the drum drawer 134 for integrally supporting the plurality of (four) photosensitive drums 21. The drum drawer 134 can be pulled out of the main casing 2 through the first opening 8 along the front-rear direction.

Accordingly, the four photosensitive drums 21 can be replaced simultaneously.

This construction can make operations for replacing the photosensitive drums 21 more efficient, thereby facilitating maintenance operations on the color printer 1.

(11) As shown in FIGS. 2 and 3, the front cover 6 can move between the open position exposing the first opening 8, and the closed position covering the first opening 8.

This construction uses fewer parts than when the withdrawal-restricting unit is provided separately from the front cover 6.

Further, this configuration reliably allows the photosensitive drums 21 to be pulled out of the main casing 2 when the front cover 6 is disposed in the open position since the first opening 8 is exposed, and reliably restricts the photosensitive drums 21 from undesirably being pulled out of the main casing 2 when the front cover 6 is in the closed position since the first opening 8 is covered.

(12) As shown in FIGS. 2 and 3, the rear ends (LED-unit supported parts 176) of the first frames 170 of the LED units 17 are supported to the main casing 2 so as to be capable of moving relative thereto, while the front ends (LED-unit engaging parts 175) of the first frames 170 of the LED units 17 are supported on the developing units 16 when the front cover 6 is in the open position.

Hence, through a simple structure, the first frames 170 of the LED units 17 can be moved smoothly between their exposure position and retracted position. Further, the first frames 170 can be reliably disposed in their retracted position when the front cover 6 is in the open position by supporting the first frames 170 on the developing units 16.

(13) Further, the LED units 17 are disposed between neighboring developing units 16 in the upper region thereof (near the photosensitive drums 21). Further, the gap formed between the lower portions of neighboring developing units 16 (the end farthest from the photosensitive drums 21) in the left-right direction is formed smaller than the left-right dimension of the LED units 17.

Accordingly, this configuration ensures a more efficient arrangement of the LED units 17, while enabling the color printer 1 to be made more compact, and specifically more compact in the left-right dimension.

(14) In the color printer 1 described above, when the front cover 6 is in the closed position shown in FIG. 2, the rear end of the LED-unit supported part 176 constituting the first frame 170 of each LED-unit support member 167 is pivotally supported to the LED-unit support part 147 of the rear wall 146 about the pivot shaft 181.

Further, the front end of the LED-unit engaging part 175 constituting the first frame 170 is fitted into (engaged with) the engaging groove 80 formed in the cover-side engaging part 79 of the front cover 6 when the front cover 6 is disposed in the closed position.

In this way, the first frame 170 of the LED-unit support member 167 is disposed in the exposure position. Hence, it is not necessary to provide a support member for supporting the first frame 170.

Further, since the first frame 170 moves between the exposure position and the retracted position due to the front end of the LED-unit engaging part 175 being fitted into the engaging groove 80 of the cover-side engaging part 79 or being disengaged therefrom as the front cover 6 is moved between the closed position and the open position, there is no need to provide a mechanism for moving the first frame 170.

Thus, this structure can reduce the number of required parts, enabling the color printer 1 to be made more compact.

Hence, this construction ensures an efficient arrangement of the LED-unit support members 167, enabling the color printer 1 to be made even more compact, while allowing the drum unit 15 to be pulled out of the inner casing 61 along the front-rear direction (axial direction of the photosensitive drums 21).

(15) As shown in FIGS. 9A and 9B, the inner casing 61 is provided with the positioning shafts 115 for positioning the drum unit 15. Further, the drum unit 15 is provided with the positioned parts 137 for engaging the positioning shafts 115. The positioned parts 137 are respectively provided on left and right ends of the pair of drum side walls 135 constituting the drum unit 15, i.e., on each end (each of four corners in a plan view) of the drum unit 15.

Therefore, when the drum unit 15 is mounted in the inner casing 61, the positioned parts 137 engage the front and rear ends of corresponding positioning shafts 115 to position the drum unit 15 relative to the inner casing 61.

In other words, the front and rear sides of the drum unit 15 are subjected to positioning relative to the positioning shafts 115 through the positioned parts 137. Accordingly, both sides of the drum unit 15 with respect to the axial direction can be precisely positioned relative to the inner casing 61.

As a result, the photosensitive drums 21 provided in the drum unit 15 can also be accurately positioned relative to the inner casing 61.

(16) As shown in FIG. 9A, the inner casing 61 is provided with pressing units 116 for pressing the drum unit 15 toward the positioning shafts 115. The positioning shafts 115 are oriented in the front-rear direction, and the positioned parts 137 engage the positioning shafts 115, with the pressing units 116 pressing the drum unit 15 when the drum unit 15 is mounted in the inner casing 61.

Accordingly, the positioned parts 137 can be reliably engaged with the positioning shafts 115.

Thus, this structure can further improve precision in positioning the photosensitive drums 21 relative to the inner casing 61.

(17) As shown in FIGS. 7A through 7C, the guide member 178 is provided in the LED-unit engaging part 175 of the first frame 170.

When the front cover 6 is moved from the open position to the closed position, the guide member 178 guides a movement of the cover-side engaging part 79 so that the front end of the LED-unit engaging part 175 becomes engaged with the engaging groove 80 formed in the cover-side engaging part 79.

Accordingly, the front end of the LED-unit engaging part 175 can be reliably engaged with the engaging groove 80 in the cover-side engaging part 79 when the front cover 6 is disposed in the closed position.

(18) The guide member 178 is configured to be movable between the guiding position shown in FIG. 7B in which the guide member 178 is advanced forward (toward the front cover 6), and the non-guiding position shown in FIG. 7A in which the guide member 178 is retracted rearward (toward the LED-unit engaging part 175) from the guiding position.

Thus, this structure places the guide member 178 in the guiding position when the front cover 6 is in the open position and places the guide member 178 in the non-guiding position when the front cover 6 is in the closed position.

Accordingly, since the guide member 178 can be retracted when the front cover 6 is in the closed position, the color printer 1 can be made compact, even with the inclusion of the guide member 178.

Further, since the guide member 178 can be moved into the guiding position shown in FIG. 7B in which the guide member 178 is advanced forward, the front end of the LED-unit engaging part 175 can be reliably fitted into (engaged with) the engaging groove 80 of the cover-side engaging part 79 when moving the front cover 6 from the open position to the closed position, even when the retracted position of the first frame 170 is set apart from the exposure position. Accordingly, the retracted position of the first frame 170 can be set to a position further retracted from the photosensitive drum 21, as shown in FIG. 3.

Hence, this configuration can increase the gap formed between the LED array 168 provided at the second frame 169 and the drum unit 15 when the first frame 170 is disposed in the retracted position, thereby reducing the possibility of the LED arrays 168 interfering with the drum unit 15 when the drum unit 15 is removed from the main casing 2.

Therefore, this construction facilitates operations for removing the drum unit 15 from the main casing 2.

(19) As shown in FIG. 2, the LED-unit support member 167 is disposed below the photosensitive drum 21 so that the LED array 168 confronts the bottom portion of the photosensitive drum 21.

Hence, when the first frame 170 of the LED-unit support member 167 moves from the exposure position to the retracted position, the weight of the LED-unit support member 167 can position the first frame 170 reliably in the retracted position.

In other words, this construction ensures the smooth movement of the first frame 170 from the exposure position to the retracted position.

(20) Further, the LED-unit support member 167 is provided with the compression springs 173 for urging the LED array 168 toward the photosensitive drum 21.

By urging the LED array 168 toward the photosensitive drum 21 with the compression springs 173, this construction improves precision in positioning the LED array 168 relative to the photosensitive drum 21.

(21) As shown in FIG. 1, a plurality of (four) photosensitive drums 21 is provided for a plurality of colors (black, yellow, magenta, and cyan). The photosensitive drums 21 are arranged juxtaposed with each other and spaced at intervals in the left-right direction (i.e. direction orthogonal to the axial direction of the photosensitive drums 21). The drum unit 15 integrally supports the plurality of (four) photosensitive drums 21, and a plurality of (four) LED arrays 168 and LED-unit support members 167, respectively, are provided to correspond to the plurality of photosensitive drums 21.

Thus, the color printer 1 can form full-color images.

Further, since the drum unit 15 integrally supports the plurality of (four) photosensitive drums 21, all photosensitive drums 21 can be replaced simultaneously.

This construction improves efficiency of operations for replacing the photosensitive drums 21, thereby facilitating maintenance operations for the color printer 1.

(22) As shown in FIG. 1, the color printer 1 is provided with a plurality of (four) developing units 16 in one-to-one correspondence with the plurality of (four) photosensitive drums 21.

Each of the four developing units 16 includes the developing roller 26 for supplying toner to the corresponding photosensitive drum 21. The LED units 17 are disposed between neighboring developing units 16 in the upper region thereof (near the photosensitive drums 21). Further, the gap formed between the lower portions of neighboring developing units 16 (the end farthest from the photosensitive drums 21) in the left-right direction (the gap in the direction that the photosensitive drums 21 are arrayed) is formed smaller than the left-right dimension of the LED-unit support members 167.

Thus, this configuration ensures more efficient arrangement of the LED-unit support members 167, enabling the color printer 1 to be made more compact, and specifically more compact in the left-right dimension.

This configuration of the color printer 1 also enables the developing units 16 to be pulled out of the inner casing 61 along the front-rear direction.

10. Second Embodiment

A color printer 201 as an image forming device according to a second embodiment of the present invention will next be described with reference to FIG. 17 wherein like parts and components are designated by the same reference numerals as those shown in the first embodiment (FIGS. 1 through 16) to avoid duplicating description.

In the first embodiment shown in FIG. 5, the first frames 170 constituting the LED-unit support members 167 of the three LED units 17KYM are supported on the developing-unit front walls 140 of the developing units 16 corresponding to the second developing units, i.e., the developing units 16 corresponding to the yellow photosensitive drum 21Y, the magenta photosensitive drum 21M, and the cyan photosensitive drum 21C, when the first frames 170 are disposed in their retracted position.

Figure 17:
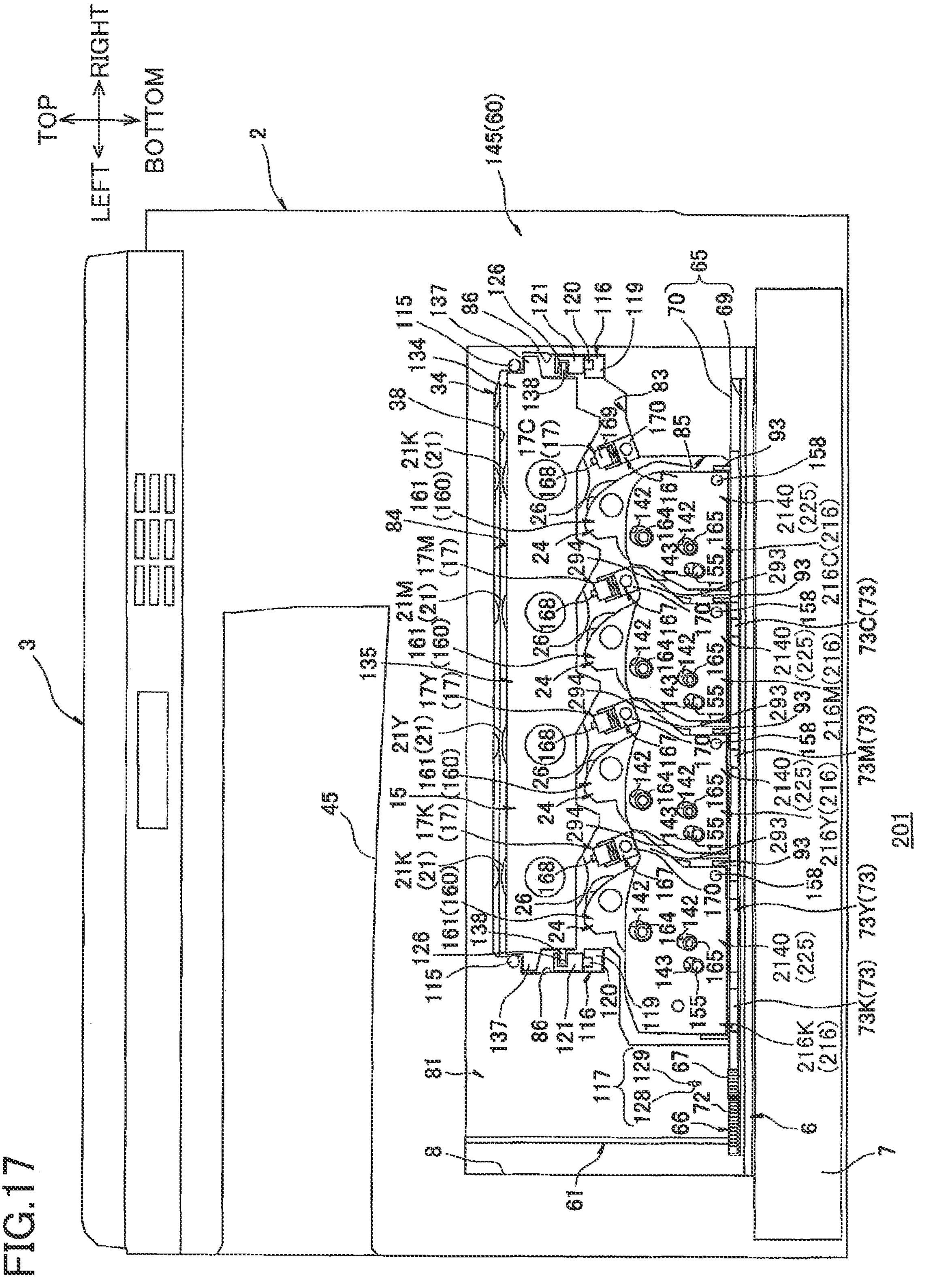
FIG. 17 is a front view of a color printer according to a second embodiment of the present invention in a state where a front cover is in an open position.

However, in the second embodiment shown in FIG. 17, the first frames 170 constituting the LED-unit support members 167 of the three LED units 17KYM are supported on developing-unit front walls 2140 of developing units 216 corresponding to the first developing units, i.e., the developing units 216 corresponding to the black photosensitive drum 21K, the yellow photosensitive drum 21Y, and the magenta photosensitive drum 21M, when the first frames 170 are disposed in their retracted position.

Specifically, frame support parts 293 are respectively provided at the developing-unit front walls 2140 in the corresponding black developing unit 216K, yellow developing unit 216Y, and magenta developing unit 216M.

The frame support parts 293 are formed on right ends of the respective developing-unit front walls 2140. The frame support parts 293 are generally triangular in a side view and protrude rightward from upper portions of the right ends of the developing-unit front walls 2140.

In addition, cutout parts 294 corresponding to the shape of opposing frame support parts 293 are formed in the developing-unit front walls 2140 of the corresponding yellow developing unit 216Y, magenta developing unit 216M, and cyan developing unit 216C.

The cutout parts 294 are formed in left edges of the developing-unit front walls 2140 as cutouts that slope obliquely rightward and upward from an approximate vertical center of the developing-unit front walls 2140.

Thus, when the first frames 170 constituting the three LED units 17KYM are disposed in their retracted position, the bottom surfaces of the front ends of the first frames 170 contact top edges of the corresponding frame support parts 293 and are supported by the frame support parts 293 from below.

In other words, when the front cover 6 is in the open position, the three LED units 17KYM are supported on the developing-unit front walls 2140 of the developing units 216 corresponding to the first developing units (the developing units 216 corresponding to the black photosensitive drum 21K, the yellow photosensitive drum 21Y, and the magenta photosensitive drum 21M) so that the three LED units 17KYM are disposed in their retracted position.

This configuration can achieve the same operational advantages described above in the first embodiment.

Further, while the color printer 1 in the first embodiment described above is provided with a plurality of (four) developing units 16, the printer 201 of the second embodiment may be a monochromatic printer provided with a single developing unit 216.

11. Third Embodiment

A color printer 301 as an image forming device according to a third embodiment of the present invention will next be described with reference to FIG. 18 wherein like parts and components are designated by the same reference numerals as those shown in the first embodiment (FIGS. 1 through 16) to avoid duplicating description.

As shown in FIGS. 9A and 9B of the first embodiment, the drum unit 15 is subjected to positioning relative to the inner casing 61 by engaging the positioned parts 137 of the drum unit 15 with the positioning shafts 115 provided in the inner casing 61.

Figure 18:
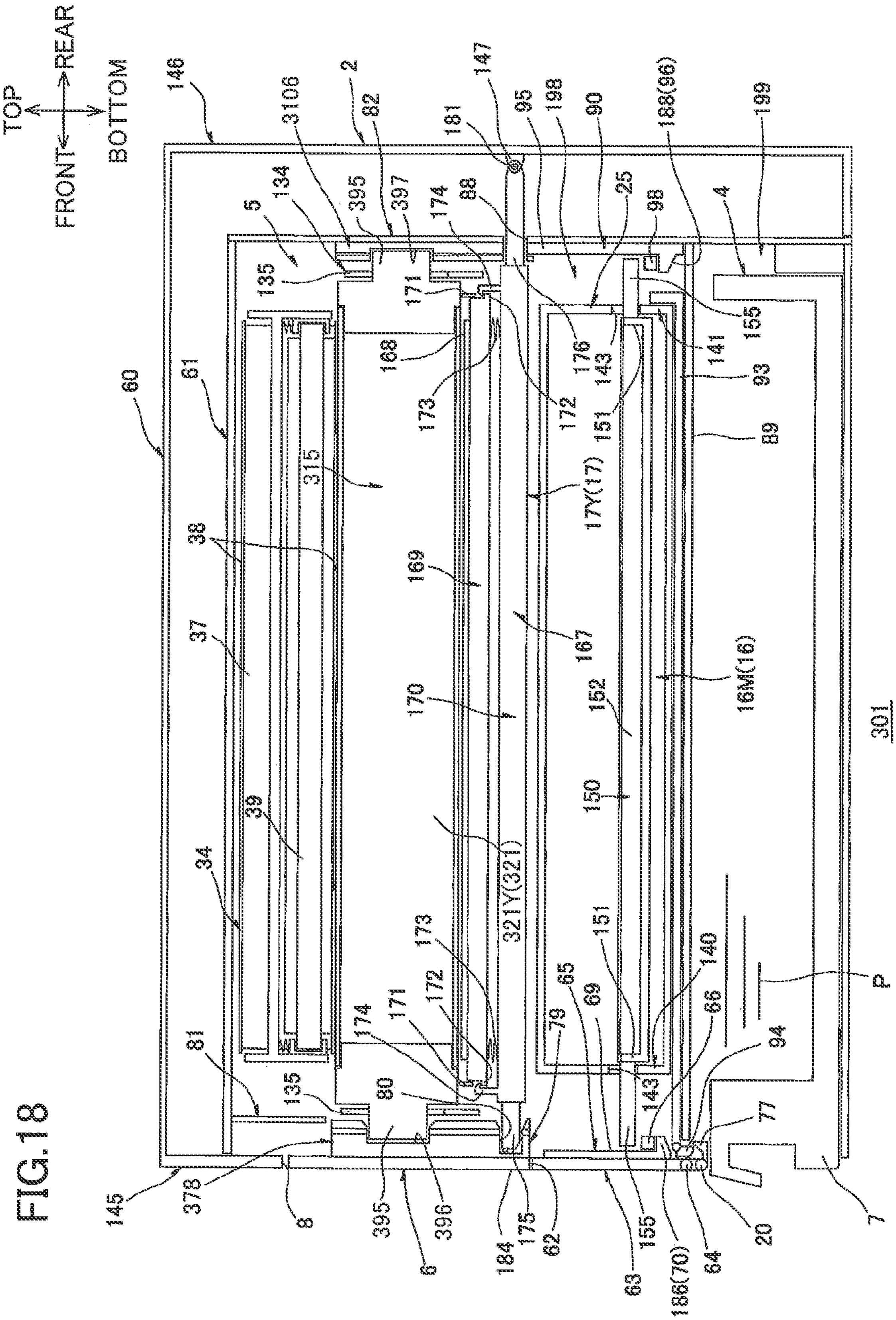
FIG. 18 is a side cross-sectional view of a color printer according to a third embodiment of the present invention.

However, as shown in FIG. 18 of the third embodiment, a drum unit 315 is subjected to positioning relative to the main casing 2 by engaging front and rear ends of photosensitive drums 321 with the main casing 2.

Specifically, fitting parts 395 are integrally provided one on each of the front and rear ends of the photosensitive drum 321.

The fitting parts 395 are provided at an approximate vertical center region of front and rear endfaces of the photosensitive drum 321. The fitting parts 395 are generally rectangular in a side view and protrude outward in respective forward and rearward directions.

A first opposing part 378 of the front cover 6 is formed with a front fitting groove 396.

The front fitting groove 396 has a shape and size that conforms to the front fitting part 395. The front fitting groove 396 is generally U-shaped in a side view with a rear opening. The front fitting groove 396 is recessed frontward in a rear surface of the first opposing part 378 at an approximate vertical center thereof.

A second opposing part 3106 of the rear wall 82 is formed with a rear fitting groove 397.

The rear fitting groove 397 has a shape and size that conforms to the rear fitting part 395. The rear fitting groove 397 is generally U-shaped in a side view with a front opening. The rear fitting groove 397 is recessed rearward in a front surface of the second opposing part 3106 at an approximate vertical center thereof.

With the drum unit 315, when the drum drawer 134 is in the drum-mounted position and the front cover 6 is in the closed position, the front fitting part 395 is fitted into (engaged with) the front fitting groove 396 and the rear fitting part 395 is fitted into (engaged with) the rear fitting groove 397.

As a result, the drum unit 315 is precisely positioned relative to the main casing 2, and the photosensitive drums 321 supported in the drum unit 315 are positioned relative to the main casing 2.

Hence, the configuration of the third embodiment described above can obtain the same operational advantages as described above in the first embodiment.

In the third embodiment shown in FIG. 18, when the front cover 6 is in the closed position, the front ends of the LED-unit engaging parts 175 are fitted into (engaged with) the engaging grooves 80 formed in the corresponding cover-side engaging parts 79, and the front fitting parts 395 are fitted into (engaged with) the front fitting grooves 396 formed in the first opposing part 378.

Hence, the front cover 6 is engaged with both the front ends of the LED-unit engaging parts 175 and the front fitting parts 395 through the cover-side engaging parts 79 and the first opposing part 378.

Accordingly, this structure improves precision in positioning the front ends of the LED-unit engaging parts 175 relative to the front fitting parts 395 through the front cover 6.

Further, as in the first embodiment described above, the third embodiment does not require the positioning shafts 115 and the pressing units 116 (see FIGS. 9A and 9B) for positioning the drum unit 15. Thus, the number of parts and components can be reduced compared to the first embodiment.

12. Fourth and Fifth Embodiments

Color printers 401 and 501 as an image forming device according to fourth and fifth embodiments of the present invention will next be described with reference to FIGS. 19 and 20, respectively, wherein like parts and components are designated by the same reference numerals as those shown in the first embodiment (FIGS. 1 through 16) to avoid duplicating description.

In the first embodiment, the front cover 6 serves as the withdrawal-restricting unit, as shown in FIGS. 2 and 3, but separate withdrawal-restricting units are provided in the fourth and fifth embodiments.

Figure 19:
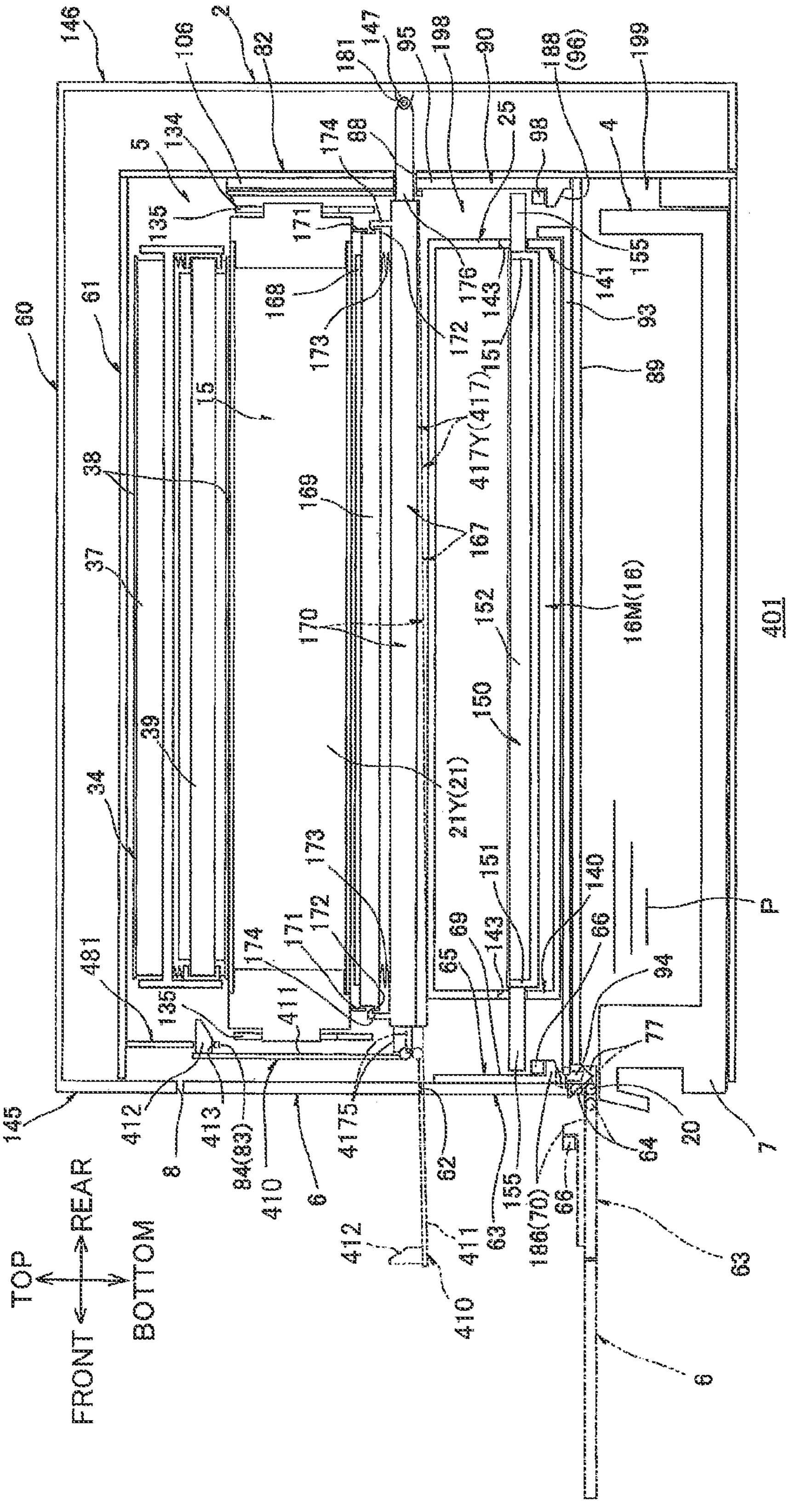
FIG. 19 is a side cross-sectional view of a color printer according to a fourth embodiment of the present invention.
Figure 20:
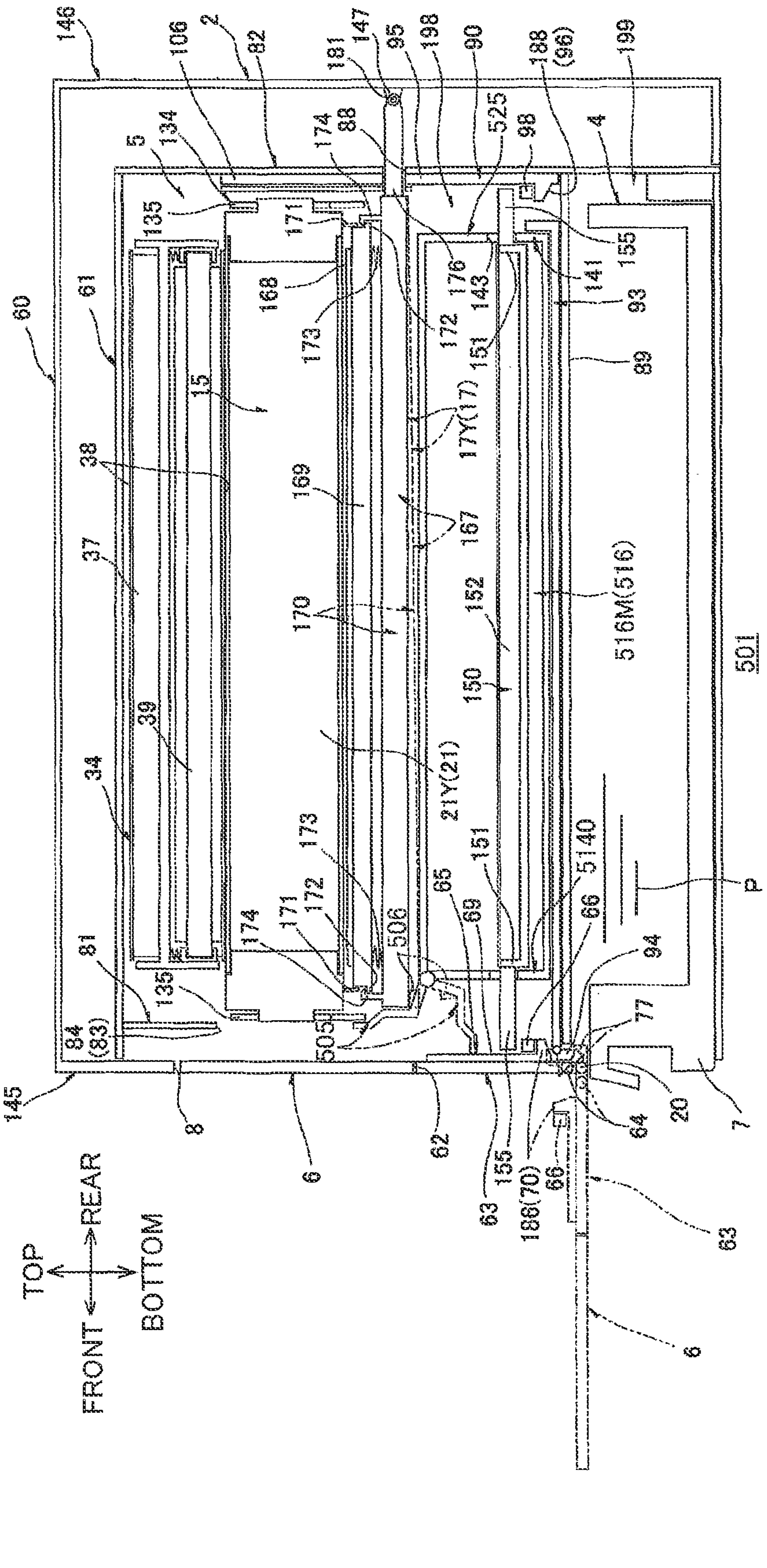
FIG. 20 is a side cross-sectional view of a color printer according to a fifth embodiment of the present invention.

Specifically, an LED unit 417 is provided with an LED restricting unit 410 as the withdrawal-restricting unit of the fourth embodiment, as shown in FIG. 19. In the fifth embodiment, a developing unit 516 is provided with a developing-unit-restricting unit 505 as the withdrawal-restricting unit, as shown in FIG. 20.

(1) Fourth Embodiment

As shown in FIG. 19, the LED restricting unit 410 is provided at an LED-unit engaging part 4175 of the first frame 170 constituting each LED-unit support member 167. As will be described later in detail, the LED restricting unit 410 is supported to the LED-unit engaging part 4175 and pivotally movable about its bottom end.

The LED restricting unit 410 includes a restricting part 411, and an engaging part 412.

In the following description of the LED restricting unit 410, it will be assumed that the LED restricting unit 410 is disposed in a withdrawal-restricted position (described later) indicated by solid lines in FIG. 19.

The restricting part 411 has a generally flat plate shape and is elongated vertically.

The engaging part 412 is formed on a rear surface of the restricting part 411 at a top end thereof. The engaging part 412 is generally rectangular in a side view and protrudes rearward from the restricting part 411. The engaging part 412 has a rear end that is tapered so that a bottom surface of the engaging part 412 slopes upward toward the rear.

An engaging hole 413 is formed in a front wall 481 of the inner casing 61 at a position corresponding to the engaging part 412. The engaging hole 413 penetrates the front wall 481 above the drum access opening 84 in the front-rear direction.

The LED restricting unit 410 can move between the withdrawal-restricted position in which the engaging part 412 is fitted in the engaging hole 413 and the restricting part 411 is oriented along the vertical direction, and a withdrawal-allowed position (indicated by double chain lines in FIG. 19) in which the engaging part 412 is not fitted in the engaging hole 413 and the restricting part 411 is oriented in the front-rear direction.

When the LED restricting unit 410 is in the withdrawal-restricted position, the restricting part 411 is positioned forward of the front end of the photosensitive drum 21 and between the photosensitive drum 21 and the front cover 6 so as to overlap the drum unit 15 when projected in the front-rear direction.

At this time, the first frame 170 of the LED unit 417 is disposed in the exposure position, while being supported by the LED restricting unit 410, with the engaging part 412 fitted into the engaging hole 413.

Thus, this construction can reliably restrict the drum unit 15 (photosensitive drum 21) from being undesirably pulled out of the main casing 2.

When the LED restricting unit 410 is in the withdrawal-allowed position, the restricting part 411 is retracted to a position that does not overlap the drum unit 15 when projected in the front-rear direction. Further, the engaging part 412 is no longer fitted in the engaging hole 413, allowing the first frame 170 of the LED unit 417 to drop into its retracted position.

Hence, the drum unit 15 can be pulled out of the main casing 2 at this time.

(2) Fifth Embodiment

The developing-unit-restricting unit 505 is provided on a developing-unit front wall 5140 constituting a developing-unit frame 525 of a developing unit 516. As will be described later in detail, the developing-unit-restricting unit 505 is supported to the developing-unit front wall 5140 and pivotally movable about its bottom end.

In the following description of the developing-unit-restricting unit 505, it will be assumed that the developing-unit-restricting unit 505 is disposed in a withdrawal-restricted position (described later) indicated by solid lines in FIG. 20.

The developing-unit-restricting unit 505 has a generally L-shape in a side view. The developing-unit-restricting unit 505 has a lower portion whose top surface is provided with a support protrusion 506.

The support protrusion 506 is formed on the lower portion of the developing-unit-restricting unit 505 so as to protrude upward from the top surface thereof.

The developing-unit-restricting unit 505 can move between the withdrawal-restricted position in which the developing-unit-restricting unit 505 first extends diagonally upward and forward and then extends upward, and a withdrawal-allowed position (indicated by double chain lines in FIG. 20) in which the developing-unit-restricting unit 505 first extends diagonally downward and forward and then extends forward.

When the developing-unit-restricting unit 505 is in the withdrawal-restricted position, a top end of the developing-unit-restricting unit 505 is positioned forward of the lower end portion of the drum side wall 135 constituting the drum unit 15 so as to overlap the lower end portion of the drum side wall 135 when projected in the front-rear direction.

At this time, the bottom surface of the front end of the first frame 170 in the LED unit 17 contacts the support protrusion 506 and is pressed upward, so that the first frame 170 is placed in the exposure position.

Thus, this configuration can reliably restrict the drum unit 15 (photosensitive drum 21) from being undesirably pulled out of the main casing 2.

When the developing-unit-restricting unit 505 is in the withdrawal-allowed position, the developing-unit-restricting unit 505 is retracted to a position that does not overlap the drum unit 15 when projected in the front-rear direction. Further, the first frame 170 of the LED unit 17 is disposed in the retracted position.

Hence, the drum unit 15 can be pulled out of the main casing 2 at this time.

Accordingly, the structures described in the fourth and fifth embodiments can obtain the same operational advantages described above in the first embodiment.

Further, since the LED restricting unit 410 of the fourth embodiment is provided at the LED unit 417 and the developing-unit-restricting unit 505 of the fifth embodiment is provided at the developing unit 516, an efficient arrangement can be designed for both the LED restricting unit 410 and the developing-unit-restricting unit 505.

13. Sixth and Seventh Embodiments

Color printers 601 and 701 as an image forming device according to sixth and seventh embodiments of the present invention will next be described with reference to FIGS. 21A-1 and 21A-2, and FIGS. 21B-1 and 21B-2, respectively, wherein like parts and components are designated by the same reference numerals as those shown in the first embodiment (FIGS. 7A through 7C) to avoid duplicating description.

(1) Sixth Embodiment

Figures 1, 21A:
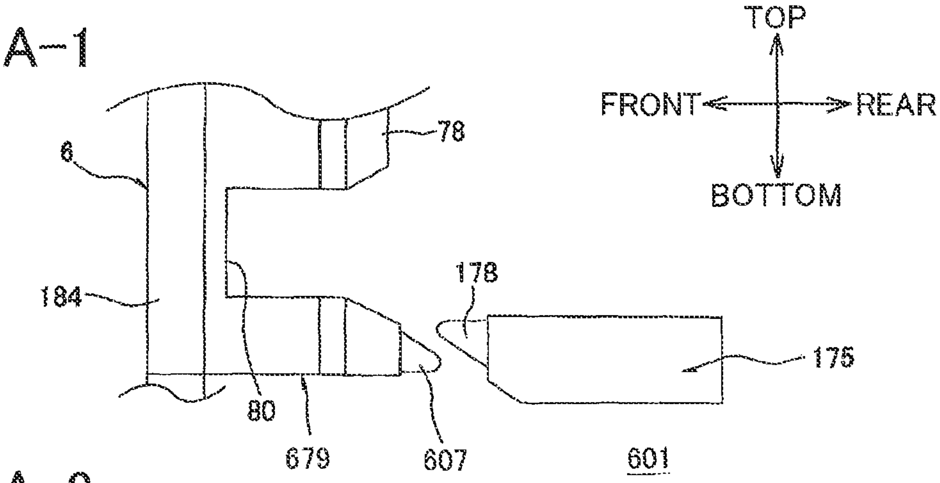
Figures 2, 21A:
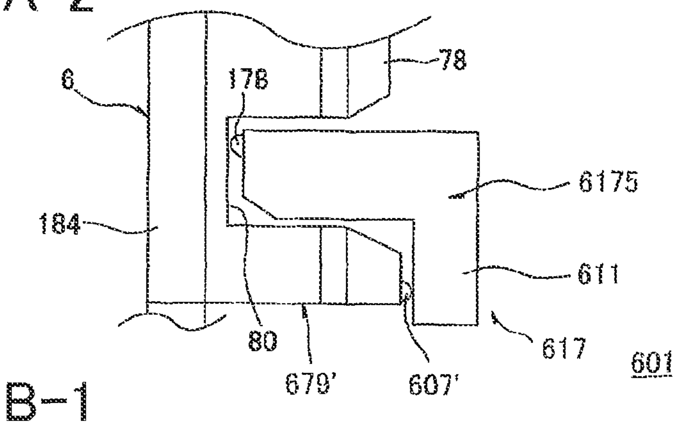

In the first embodiment shown in FIGS. 7A through 7C, the guide member 178 is provided only at the LED-unit engaging part 175. However, in the sixth embodiment, in addition to the LED-unit engaging part 175, a cover-side guide part 607 is provided at a cover-side engaging part 679 of the front cover 6, as shown in FIGS. 21A-1 and 21A-2.

Specifically, the cover-side guide part 607 is provided at the cover-side engaging part 679.

The cover-side guide part 607 is provided at a bottom portion of the cover-side engaging part 679. The cover-side guide part 607 is generally triangular in a side view and protrudes rearward from a rear end portion of the cover-side engaging part 679.

When the front cover 6 is moved from the open position to the closed position, the cover-side guide part 607 guides a movement of the LED-unit engaging part 175 so that the LED-unit engaging part 175 becomes engaged with the engaging groove 80 formed in the cover-side engaging part 679.

When the front cover 6 moves from the open position to the closed position, the cover-side guide part 607 may be configured to move from a guiding position (see FIG. 21A-1) protruding rearward (toward the LED-unit engaging part 175) for guiding a movement of the LED-unit engaging part 175, and a non-guiding position (see FIG. 21A-2) retracted forward (toward the front cover 6) from the guiding position.

In this example, the cover-side engaging part 679 may be provided with a cover-side guide part 607' having the same configuration as the guide member 178 described in the first embodiment (see FIG. 7C). A guide contact part 611 is provided at an LED-unit engaging part 6175 for contacting a rear end of the cover-side guide part 607' when the LED-unit engaging part 6175 is fitted into the engaging groove 80 to place the cover-side guide part 607' in the non-guiding position.

The guide contact part 611 is generally rectangular in a side view and protrudes downward from a bottom portion of the LED-unit engaging part 6175.

Accordingly, the structure described in the sixth embodiment can obtain the same operational advantages as described above in the first embodiment.

Further, since the guide member 178 is provided at the LED-unit engaging part 175 (6175) and the cover-side guide part 607 (607') is provided at the cover-side engaging part 679 (679'), the LED-unit engaging part 175 (6175) can be reliably engaged in the engaging groove 80.

(2) Seventh Embodiment

Figures 1, 21B:
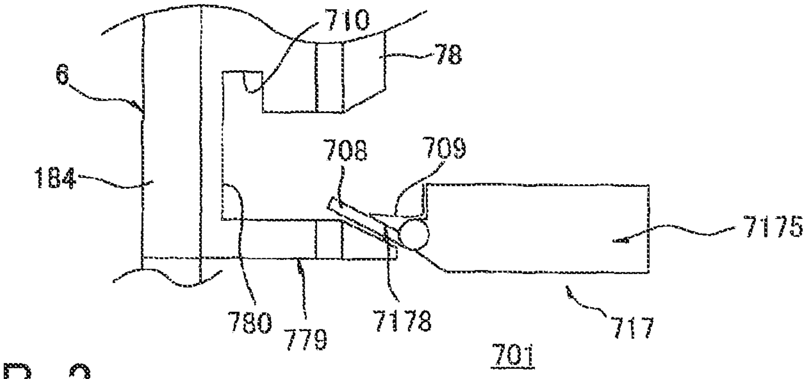
Figures 2, 21B:
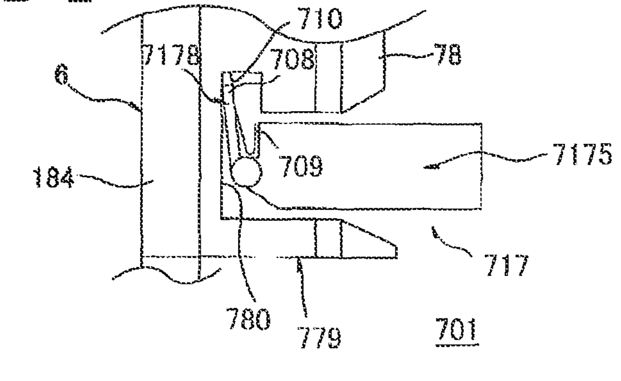

As shown in FIG. 21B-1, a guide member 7178 of an LED-unit engaging part 7175 according to the seventh embodiment includes a guide plate 708, and a leaf spring member 709.

The guide plate 708 is provided at a front end of the LED-unit engaging part 7175 and has a generally flat plate shape. The guide plate 708 is pivotally supported to the LED-unit engaging part 7175 about its rear end. The guide plate 708 can move between a guiding position (see FIG. 21B-1) extending diagonally upward and forward (toward the front cover 6), and a non-guiding position (see FIG. 21B-2) extending upward. Hence, in the non-guiding position, the guide plate 708 is retracted rearward (toward the LED-unit engaging part 7175) from the guiding position.

As shown in FIG. 21B-2, the leaf spring member 709 has a generally L-shape in a side view and is disposed above the guide plate 708.

The leaf spring member 709 constantly urges the guide plate 708 from the non-guiding position shown in FIG. 21B-2 toward the guiding position shown in FIG. 21B-1. Consequently, the guide plate 708 is normally disposed in the guiding position.

A recess 710 is formed in an engaging groove 780 of a cover-side engaging part 779.

The recess 710 is generally U-shaped in a side view with a bottom opening and is recessed upward in a top edge of a front portion of the engaging groove 780.

When the LED-unit engaging part 7175 is fitted into the engaging groove 780, as shown in FIG. 21B-2, the guide member 7178 is accommodated in the engaging groove 780 and disposed in the non-guiding position.

At this time, a top end of the guide plate 708 is accommodated in the recess 710.

The structure of the seventh embodiment described above can obtain the same operational advantages described above in the first embodiment.

14. Variations of Embodiments

In the first through seventh embodiments described above, the developing rollers 26 contact the corresponding photosensitive drums 21, as shown in FIG. 13B, when the developing rollers 26 are disposed in their adjacent position. However, the adjacent position of the developing rollers 26 may be set such that a small gap across which toner can cross is formed between the developing rollers 26 and the corresponding photosensitive drums 21.

Further, in the first through seventh embodiments, the drum unit 15 provided with the photosensitive drums 21 and the developing units 16 provided with the developing rollers 26 are configured separately from each other, but photosensitive drums 21 and developing rollers 26 may be integrally provided in process units. In this case, a single process unit may be provided for each pair of corresponding photosensitive drums 21 and developing rollers 26, with a plurality of process units corresponding to the plurality of printing colors.

Note that the first through seventh embodiments and their variations may be combined as desired.

While the present invention has been described in detail with reference to the embodiment thereof, it would be apparent to those skilled in the art that various changes and modifications may be made therein without departing from the spirit of the present invention.

What is claimed is:

1. A cartridge comprising:

a developing casing configured to accommodate developing material therein and supporting a developing roller, the developing roller being rotatable about a developing axis, the developing axis extending in a developing axis direction, the developing roller being configured to supply the developing material to a photosensitive drum;

a support member supporting the developing casing, the developing casing being connected with the support member such that the developing casing is movable relative to the support member; and a pivot member pivotably supported by the support member, the developing casing being provided with a first protrusion, the first protrusion protruding outward from the developing casing in the developing axis direction, the support member including:

a first hole, in which the first protrusion is inserted; and an additional hole, the pivot member including:

a contact part contactable with the first protrusion inserted in the first hole; and an urging member configured to urge the contact part toward the first protrusion, and the pivot member being provided with a pivot-member protrusion, the pivot-member protrusion protruding outward from the pivot member in the developing axis direction and being inserted in the additional hole of the support member.

2. The cartridge according to claim 1, wherein, as viewed in the developing axis direction, the first hole is elongated in a first-hole elongated direction so as to guide the first protrusion in the first-hole elongated direction.

3. The cartridge according to claim 1, wherein the developing casing is further provided with a second protrusion, the second protrusion protruding outward from the developing casing in the developing axis direction, and wherein the support member further includes a second hole, in which the second protrusion is inserted.

4. The cartridge according to claim 3, wherein, as viewed in the developing axis direction, the second hole is elongated in a second-hole elongated direction so as to guide the second protrusion in the second-hole elongated direction.

5. The cartridge according to claim 3, wherein, as viewed in the developing axis direction, the second protrusion is disposed between the first protrusion and the developing roller.

6. The cartridge according to claim 3, wherein each of the first protrusion and the second protrusion is of a cylindrical shape and extends in the developing axis direction.

7. The cartridge according to claim 1, wherein the cartridge comprises a pair of the support members and a pair of the pivot members, the pair of the support members being disposed further outward of the pair of the pivot members in the developing axis direction, and the pair of the pivot members being disposed further outward of a pair of opposite ends of the developing casing in the developing axis direction.

8. The cartridge according to claim 1, wherein, as viewed in the developing axis direction, the support member has a first end and a second end opposite to the first end in a horizontal direction, and wherein a pivot axis of the pivot member is positioned closer to the second end than both of the developing axis and the first protrusion are to the second end in the horizontal direction.

9. An image forming apparatus comprising:

a housing having an opening;

a photosensitive drum rotatable about a drum axis, the drum axis extending in a drum axis direction; and a developing cartridge attachable to the housing such that the developing cartridge is slidably movable relative to the housing through the opening in a direction parallel to the drum axis direction, the developing cartridge including:

a developing casing configured to accommodate developing material therein and supporting a developing roller, the developing roller being rotatable about a developing axis, the developing axis extending in a developing axis direction, the developing roller being configured to supply the developing material to the photosensitive drum;

a support member supporting the developing casing such that the developing axis is parallel to the drum axis in a state where the developing cartridge is attached to the housing, the developing casing being connected with the support member such that the developing casing is movable relative to the support member; and a pivot member pivotably supported by the support member, the developing casing being provided with a first protrusion, the first protrusion protruding outward from the developing casing in the developing axis direction, the support member including:

a first hole, in which the first protrusion is inserted; and an additional hole, the pivot member including:

a contact part contactable with the first protrusion inserted in the first hole; and an urging member configured to urge the contact part toward the first protrusion, and the pivot member being provided with a pivot-member protrusion, the pivot-member protrusion protruding outward from the pivot member in the developing axis direction and being inserted in the additional hole of the support member.

10. The image forming apparatus according to claim 9, wherein the urging member is configured such that, in the state where the developing cartridge is attached to the housing, the urging member urges the contact part toward the first protrusion in a direction, in which the developing roller moves toward the photosensitive drum.

11. The image forming apparatus according to claim 9, wherein the urging member includes a spring.

12. The image forming apparatus according to claim 9, wherein, as viewed in the developing axis direction, the first hole is elongated in a first-hole elongated direction so as to guide the first protrusion in the first-hole elongated direction.

13. The image forming apparatus according to claim 9, wherein the developing casing is further provided with a second protrusion, the second protrusion protruding outward from the developing casing in the developing axis direction, and wherein the support member further includes a second hole, in which the second protrusion is inserted.

14. The image forming apparatus according to claim 13, wherein, as viewed in the developing axis direction, the second hole is elongated in a second-hole elongated direction so as to guide the second protrusion in the second-hole elongated direction.

15. The image forming apparatus according to claim 13, wherein, as viewed in the developing axis direction, the second protrusion is disposed between the first protrusion and the developing roller.

16. The image forming apparatus according to claim 13, wherein each of the first protrusion and the second protrusion is of a cylindrical shape and extends in the developing axis direction.

17. The image forming apparatus according to claim 9, wherein the developing cartridge comprises a pair of the support members and a pair of the pivot members, the pair of the support members being disposed further outward of the pair of the pivot members in the developing axis direction, and the pair of the pivot members being disposed further outward of a pair of opposite ends of the developing casing in the developing axis direction.

18. The image forming apparatus according to claim 9, wherein, as viewed in the drum axis direction, the housing has a first end and a second end opposite to the first end in a horizontal direction, and wherein, in the state where the developing cartridge is attached to the housing, as viewed in the developing axis direction, both of the drum axis and a pivot axis of the pivot member are positioned closer to the second end than the developing axis is to the second end in the horizontal direction.

* * * * *